US006751945B1

(12) United States Patent
Knight

(10) Patent No.: US 6,751,945 B1
(45) Date of Patent: Jun. 22, 2004

(54) PRESSURIZER FOR A ROCKET ENGINE

(76) Inventor: Andrew F. Knight, 1111 Arlington Blvd. #317, Arlington, VA (US) 22209

( * ) Notice: Subject to any disclaimer, the term of this patent is extended or adjusted under 35 U.S.C. 154(b) by 51 days.

(21) Appl. No.: 10/214,706

(22) Filed: Aug. 9, 2002

Related U.S. Application Data

(63) Continuation-in-part of application No. 09/878,293, filed on Jun. 12, 2001.

(51) Int. Cl.[7] ............................... F02F 9/00; F02F 9/42; F02F 9/72
(52) U.S. Cl. ........................................ 60/259; 60/257
(58) Field of Search ................... 60/259, 257; 417/118, 417/122, 204

(56) References Cited

U.S. PATENT DOCUMENTS

| 2,505,798 A | | 5/1950 | Skinner |
| 2,701,441 A | | 2/1955 | Mitchell |
| 2,753,801 A | * | 7/1956 | Cumming .................. 102/381 |
| 3,213,804 A | | 10/1965 | Sobey |
| 3,945,203 A | | 3/1976 | Kayser |
| 4,880,185 A | | 11/1989 | Apfel |
| 5,205,722 A | | 4/1993 | Hammond |
| 5,471,833 A | | 12/1995 | Pahl |
| 5,755,091 A | * | 5/1998 | Johnson ....................... 60/204 |
| 5,839,463 A | | 11/1998 | Blackmon |
| 6,314,978 B1 | | 11/2001 | Lanning |

OTHER PUBLICATIONS

Steve Harrington, "Pistonless Dual Chamber Rocket Fuel Pump: Testing and Performance," AIAA Paper 2003–4479.

* cited by examiner

Primary Examiner—Justine R. Yu
Assistant Examiner—William H. Rodriguez

(57) ABSTRACT

A pressurizer for pressurizing a fluid includes: a pressurant entrance configured for the introduction of a pressurant; a fluid entrance configured for the introduction of the fluid; a fluid exit configured for the expulsion of the fluid; and at least one transfer chamber movable in a cycle with respect to at least one of the pressurant entrance, the fluid entrance, and the fluid exit, where the pressurizer is configured so that for a portion of a cycle the pressurant exerts a force on the fluid inside the transfer chamber, and where the transfer chamber is configured to receive the pressurant via the pressurant entrance, receive the fluid via the fluid entrance, and expel the fluid via the fluid exit by the force exerted by the pressurant upon the fluid inside the transfer chamber.

33 Claims, 41 Drawing Sheets

$$\Delta P_{exit} = \Delta P_{entrance}\left(\frac{A_{entrance}}{A_{exit}}\right)^2$$

$$\Delta P_{exit} < \Delta P_{entrance}\left(\frac{A_{entrance}}{A_{exit}}\right)^2$$

$$\Delta P_{exit} > \Delta P_{entrance}\left(\frac{A_{entrance}}{A_{exit}}\right)^2$$

PRESSURIZER FOR A ROCKET ENGINE

REFERENCE TO RELATED APPLICATION

This application is a Continuation-in-Part (CIP) of U.S. application Ser. No. 09/878,293, entitled "Pressurizer For a Rocket Engine," filed Jun. 12, 2001.

BACKGROUND

Rocket engines require propellants to be fed to them at very high pressures. This has historically been accomplished in two general ways: first, with the use of a pressurized fluid, such as high pressure helium; and second, with the use of a pump.

In the first way (i.e., a "blowdown" system), a pressurized fluid is added directly to the propellant tank and exerts a force on the propellant. Nitrogen and helium, both inert gases, pressurized to a pressure as high as 50,000 PSI, have been used successfully in the past. As they are inert, there need be no barrier (e.g., membrane or piston) placed between these pressurized fluids and the propellant. The problem with this method, however, is that the pressurized fluid also exerts a force on the propellant tank. Because of the extremely high pressures required of the pressurized fluid, the walls of the propellant tank must be thick enough to withstand the pressure. The propellant tank is therefore very heavy. Rockets employing the pressurized fluid must use a greater proportion of their thrust lifting this extra weight, and therefore they are not as efficient as rockets that do not require this added weight.

Historically, one way to solve the above weight problem is to employ the use of a pump. Pumps (e.g., reciprocating, centrifugal, or radial pumps) are generally very complex and expensive and require their own driving means, such as an engine. Further, the engine driving the pump burns a significant percentage of the total propellant. For small rocket engine systems, since a pump is too complicated, too heavy, and too expensive pressurized fluids are generally used to pressurize the propellant. However, for large rocket engine systems, pumps have the advantage that the walls of the propellant tank need not be thick, since there is little or no pressure in the tank. Therefore, the propellant tank is much lighter, and the added weight of the pump is more than offset by the reduction in propellant tank weight.

Another problem with both the blowdown and pump pressurizing systems is the pressure limitation. Current rocket engine combustion pressures are generally limited to 3,000 PSI or less, because most rocket engine turbopumps cannot create an outlet pressure higher than about 7,000 PSI, and because in most blowdown systems, pressurizing propellant tanks above around 1,000 PSI requires tanks whose wall thicknesses and weights are prohibitive.

U.S. Pat. No. 3,213,804 to Sobey ("Sobey") discloses fluid pressure accumulators that are connected to sources of low and high pressure by means of butterfly valves. Essentially, the pressurized fluid exerts force on the propellant in small, designated containers. While the walls of these containers must be thick in order to withstand the high pressure of the pressurized fluid, the walls of the propellant tank need not be. Therefore, the total weight of the rocket engine system employing Sobey's invention may be less than that of the previously discussed rocket engine system because these containers (fluid pressure accumulators) are small in comparison to the propellant tank.

U.S. Pat. No. 6,314,978 to Lanning, et al. ("Lanning") discloses a reciprocating feed system for fluids having storage tanks 1, 2, 3 that are similar in purpose to the fluid pressure accumulators disclosed in Sobey. Instead of valves 50, 52, 54 disclosed in Sobey, Lanning discloses four valves for each storage tank 1, 2, 3. For example, associated with storage tank 1 are: valve 13 between storage tank 1 and low pressure fluid 5; valve 16 between storage tank 1 and high pressure discharge 7; valve 20 between storage tank 1 and vent manifold 18; and valve 24 between storage tank 1 and pressurized gas supply 8. Each valve must be accurately and reliably controlled by a controller 11. Further, each valve may have associated with it a sensor 11*a*.

SUMMARY OF THE INVENTION

A problem with Sobey's invention, however, is its complicated use of valves. In order to reduce the weight of Sobey's invention further, the sizes of the fluid pressure accumulators must decrease (thus reducing their weight). However, as they decrease, the rotation speed and precision of the butterfly valves must increase in order to accommodate the same propellant flow rate to the rocket engine. This places great stresses on the valves, and eventually a point is reached (in reducing the size of the fluid pressure accumulators) at which the valves cannot reliably rotate fast enough to provide the required timing.

Lanning has problems that are similar to the problems of Sobey. For example, Lanning requires a trade-off between reducing the size and weight of storage tanks 1, 2, 3, and increasing the speed, reliability, and working pressure of the valves. In other words, in order to reduce the size and weight of storage tanks 1, 2, 3, the valves must be able to reliably and accurately open and close at a faster rate. This puts great stresses on the valves. Further, the control system must be more complicated.

In a preferred embodiment, the present invention provides for pressurizer for pressurizing a fluid, comprising: a pressurant entrance configured for the introduction of a pressurant; a fluid entrance configured for the introduction of said fluid; a fluid exit configured for the expulsion of said fluid; and at least one transfer chamber movable in a cycle with respect to at least one of said pressurant entrance, said fluid entrance, and said fluid exit, wherein said pressurizer is configured so that for a portion of a cycle said pressurant exerts a force on said fluid inside said transfer chamber, and wherein said transfer chamber is configured to receive said pressurant via said pressurant entrance, receive said fluid via said fluid entrance, and expel said fluid via said fluid exit by the force exerted by said pressurant upon said fluid inside said transfer chamber.

In a preferred aspect, the pressurizer comprises at least three transfer chambers, configured so that while at least one transfer chamber is in fluid connection with said fluid entrance, at least one other transfer chamber is in fluid connection with said fluid exit and said pressurant entrance. In another preferred aspect, at least one transfer chamber comprises: a movable piston configured to substantially separate said pressurant from said fluid inside said transfer chamber; and a limiter configured to prevent said piston from moving beyond a certain point inside said transfer chamber. In another preferred aspect, the pressurizer further comprises: a motor configured to move said transfer chamber at a cycle speed; a sensor configured to sense a quantity of propellant inside said transfer chamber; and a controller connected to said sensor and said motor, configured to adjust said cycle speed at least as a function of said quantity sensed by said sensor.

In another preferred aspect, a cross sectional area of said transfer chamber is less than 1/10 a cross sectional area of said fluid exit. In another preferred aspect, the pressurizer further comprises a rotatable spindle housing a plurality of transfer chambers, wherein, in a cross section of said spindle, a distance between corresponding points of two transfer chambers is less than ½ a maximum characteristic length of said fluid exit along a direction of rotation of said spindle. In another aspect, in a cross section of said spindle, a dimension of said transfer chamber along a path taken by said transfer chamber is less than a minimum distance between said pressurant entrance and said pressurant exit along a path taken by said transfer chamber. In another aspect, in a cross section of said spindle, a maximum characteristic length of said fluid exit along a direction of rotation of said spindle is less than ½ of a minimum distance between said pressurant entrance and said pressurant exit along a path taken by at least one transfer chamber.

In another preferred aspect, the pressurizer further comprises a pressurant exit configured for the expulsion of a pressurant exhaust, wherein said pressurizer is configured to be able to provide a continuous stream of said fluid from said fluid exit throughout at least one complete cycle at least when $\text{sqrt}(\Delta p_{entrance})*(A_{entrance}) < \text{sqrt}(\Delta p_{exit})*(A_{exit})$, where $\Delta p_{entrance}$ is a pressure drop between said fluid entrance and said pressurant exit, $A_{entrance}$ is a cross sectional area of said fluid entrance, $\Delta p_{exit}$ is a pressure drop between said pressurant entrance and said fluid exit, and $A_{exit}$ is a cross sectional area of said fluid exit.

In another preferred aspect, a cross sectional area of said fluid exit is less than ½ a cross sectional area of said fluid entrance. In another preferred aspect, the pressurizer comprises a plurality of transfer chambers each having a dimension less than 1 mm.

In another preferred aspect, the pressurizer may further comprise a pressurant exit configured for the expulsion of a pressurant exhaust, wherein a cross sectional area of said fluid entrance ($A_{entrance}$) and a cross sectional area of said fluid exit ($A_{exit}$) are chosen so that $\text{sqrt}(\Delta p_{entrance})*(A_{entrance})$ is at least approximately $\text{sqrt}(\Delta p_{exit})*(A_{exit})$, where $\Delta p_{entrance}$ is a pressure drop between said fluid entrance and said pressurant exit, and $\Delta p_{exit}$ is a pressure drop between said pressurant entrance and said fluid exit.

In another preferred aspect, the pressurizer further comprises a rotatable spindle housing a plurality of transfer chambers, wherein said pressurizer is configured so that said spindle is rotated by an expansion of said pressurant. In another preferred aspect, said transfer chamber comprises at least one jet hole configured to provide a substantially continuous flow of said pressurant from said transfer chamber via said jet hole in a direction substantially opposite a direction of motion of said transfer chamber to provide an impulse reaction force to said transfer chamber.

In another preferred aspect, the pressurizer further comprises: a first rotatable spindle housing a plurality of said transfer chambers; a second pressurant entrance configured for the introduction of said pressurant; a second fluid entrance configured for the introduction of said fluid; a second fluid exit configured for the expulsion of said fluid; and a second rotatable spindle housing a plurality of second transfer chambers that are each movable in a cycle with respect to at least one of said second pressurant entrance, said second fluid entrance, and said second fluid exit, wherein each of said second transfer chambers is configured to receive said pressurant via said second pressurant entrance, receive said fluid via said second fluid entrance, and expel said fluid via said second fluid exit, and wherein said fluid entrance is connected to said second fluid exit.

In another preferred aspect, the pressurizer comprises at least one differential transfer chamber having a first region having a first cross sectional area and a second region having a second cross sectional area smaller than said first cross sectional area, wherein said differential transfer chamber further comprises a differential piston having a first piston portion having a first piston cross sectional area approximately equal to said first cross sectional area and a second piston portion having a second piston cross sectional area approximately equal to said second cross sectional area.

In another preferred aspect, the pressurizer further comprises: a pressurant exit configured for the expulsion of a pressurant exhaust; at least one pre-pressurization entrance between said pressurant entrance and said pressurant exit; and at least one depressurization exit, connected to said pre-pressurization entrance, between said pressurant entrance and said pressurant exit, wherein said pressurizer is configured so that, during a cycle, said transfer chamber sequentially receives said pressurant at a medium pressure via said pre-pressurization entrance, receives said pressurant at a high pressure via said pressurant entrance, expels said pressurant at another medium pressure via said depressurization exit, and expels said pressurant at a low pressure via said pressurant exit.

In another preferred aspect, said transfer chamber comprises: a piston configured to separate said pressurant from said propellant inside said transfer chamber; and a spring configured to provide a force on said piston relative to said transfer chamber. In another preferred aspect, the pressurizer further comprises: a rotatable spindle housing a plurality of transfer chambers; and a lubricant injector configured to inject a sealing lubricant between said pressurant entrance and said spindle.

In another preferred embodiment of the present invention, an impulse reaction engine system comprises: a pressurant container configured to contain a pressurant; a propellant container configured to contain a propellant; an impulse reaction engine configured to receive said propellant; and at least one transfer chamber movable in a cycle with respect to at least one of said pressurant container, said propellant container, and said engine, wherein said engine system is configured so that for a portion of a cycle said pressurant exerts a force on said propellant inside said transfer chamber, and wherein said transfer chamber is configured to receive said pressurant from said pressurant container, receive said propellant from said propellant container, and expel said propellant to said engine by the force exerted by said pressurant upon said propellant inside said transfer chamber.

In another preferred aspect, the impulse reaction engine system may further comprise a gas generator configured to generate said pressurant. The impulse reaction engine system may further comprise a heat exchanger configured to transfer heat from said pressurant generated by said gas generator to said propellant.

In another preferred aspect, the impulse reaction engine system may further comprise an engine conduit between said transfer chamber and said engine and a propellant conduit between said transfer chamber and said propellant container, wherein said system is configured to be able to provide a continuous stream of said propellant to said engine throughout at least one complete cycle at least when $\text{sqrt}(\Delta p_{entrance})*(A_{entrance}) < \text{sqrt}(\Delta p_{exit})*(A_{exit})$, where $\Delta p_{entrance}$ is a pressure drop between said propellant container and a pressurant exhaust, $A_{entrance}$ is a cross sectional area of said propellant conduit, $\Delta p_{exit}$ is a pressure drop between said pressurant container and said engine, and $A_{exit}$ is a cross sectional area of said engine conduit.

In another preferred embodiment of the present invention, an impulse reaction engine system comprises: an impulse reaction engine configured to receive a propellant and further configured to generate a pressurant; and at least one transfer chamber connected to and movable in a cycle with respect to said engine, wherein said engine system is configured so that for a portion of a cycle said pressurant exerts a force on said propellant inside said transfer chamber, and wherein said transfer chamber is configured to receive said pressurant from said engine and expel said propellant to said engine by the force exerted by said pressurant upon said propellant inside said transfer chamber.

In another preferred aspect, the engine system comprises at least one differential transfer chamber having a first region having a first cross sectional area and a second region having a second cross sectional area smaller than said first cross sectional area, wherein said differential transfer chamber further comprises a differential piston having a first piston portion having a first piston cross sectional area approximately equal to said first cross sectional area and a second piston portion having a second piston cross sectional area approximately equal to said second cross sectional area. In another preferred aspect, the engine system may further comprise a propellant container configured to contain a propellant, wherein said transfer chamber is configured to receive said propellant from said propellant container. In another preferred aspect, said propellant may be in a gas state.

In another preferred aspect, said transfer chamber may comprise: a piston configured to separate said pressurant from said propellant inside said transfer chamber; and a spring configured to provide a force on said piston relative to said transfer chamber. In another preferred aspect, the engine system may further comprise a heat exchanger configured to transfer heat from said pressurant generated by said engine to said propellant.

In another preferred embodiment of the present invention, a fluid transport system for transferring fluid from a low pressure reservoir to an outlet at high pressure in a continuous stream comprises: a plurality of storage tanks, each of said storage tanks being capable of confining fluid at high pressure; draining means for draining fluid from each of said plurality of storage tanks in sequential order to said outlet, said draining means draining each of said plurality of tanks in sequence such that a continuous stream of fluid is supplied to said outlet at high pressure; and filling means for supplying fluid from said low pressure reservoir to each of said drained storage tanks in sequential order to fill said respective tanks with said fluid; said sequential order of each of said draining means and said filling means being out of phase with each other such that as one storage tank in said plurality is being drained by said draining means, at least another of said storage tanks is being filled by said filling means, wherein said draining means is configured to be able to be draining at least three storage tanks simultaneously.

In another preferred embodiment of the present invention, a fluid transport system for transferring fluid from a low pressure reservoir to an outlet at high pressure in a continuous stream comprises: a plurality of storage tanks, each of said storage tanks being capable of confining fluid at high pressure; draining means for draining fluid from each of said plurality of storage tanks in sequential order to said outlet, said draining means draining each of said plurality of tanks in sequence such that a continuous stream of fluid is supplied to said outlet at high pressure; and filling means for supplying fluid from said low pressure reservoir to each of said drained storage tanks in sequential order to fill said respective tanks with said fluid; said sequential order of each of said draining means and said filling means being out of phase with each other such that as one storage tank in said plurality is being drained by said draining means, at least another of said storage tanks is being filled by said filling means, wherein said system is configured so that a ratio of a number of storage tanks that are being filled by said filling means to a number of storage tanks that are simultaneously being drained by said draining means is at least three. In a preferred aspect, the fluid transport system may further comprise a pressurant having a pressurant pressure, wherein said ratio is set to be at least approximately a square root of a ratio of a pressure difference between said pressurant pressure and said high pressure to a pressure difference between said low pressure and ambient pressure.

In another preferred embodiment of the present invention, a fluid transport system for transferring fluid from a low pressure reservoir to an outlet at high pressure in a continuous stream comprises: a plurality of storage tanks, each of said storage tanks being capable of confining fluid at high pressure; draining means for draining fluid from each of said plurality of storage tanks in sequential order to said outlet, said draining means draining each of said plurality of tanks in sequence such that a continuous stream of fluid is supplied to said outlet at high pressure; and filling means for supplying fluid from said low pressure reservoir to each of said drained storage tanks in sequential order to fill said respective tanks with said fluid; said sequential order of each of said draining means and said filling means being out of phase with each other such that as one storage tank in said plurality is being drained by said draining means, at least another of said storage tanks is being filled by said filling means, wherein said fluid transport system comprises at least one differential differential storage tank having a first region having a first cross sectional area and a second region having a second cross sectional area smaller than said first cross sectional area, wherein said differential storage tank further comprises a differential piston, movable inside said differential storage tank, having a first piston portion having a first piston cross sectional area approximately equal to said first cross sectional area and a second piston portion having a second piston cross sectional area approximately equal to said second cross sectional area.

BRIEF DESCRIPTION OF THE DRAWINGS

FIG. 22b shows an enlargement of the corresponding region depicted in FIG. 22a.

FIG. 26b shows an enlargement of the corresponding region depicted in FIG. 26a.

FIG. 27b shows a top view along section C—C of the spindle shown in FIG. 27a.

FIG. 35b shows an enlargement of the corresponding region depicted in FIG. 35a.

DETAILED DESCRIPTION

The disclosures of Sobey and Lanning are hereby incorporated by reference to the extent necessary to understand the present invention.

In the following description, the use of "a," "an," or "the" can refer to the plural. All examples given are for clarification only, and are not intended to limit the scope of the invention.

Figure 1:
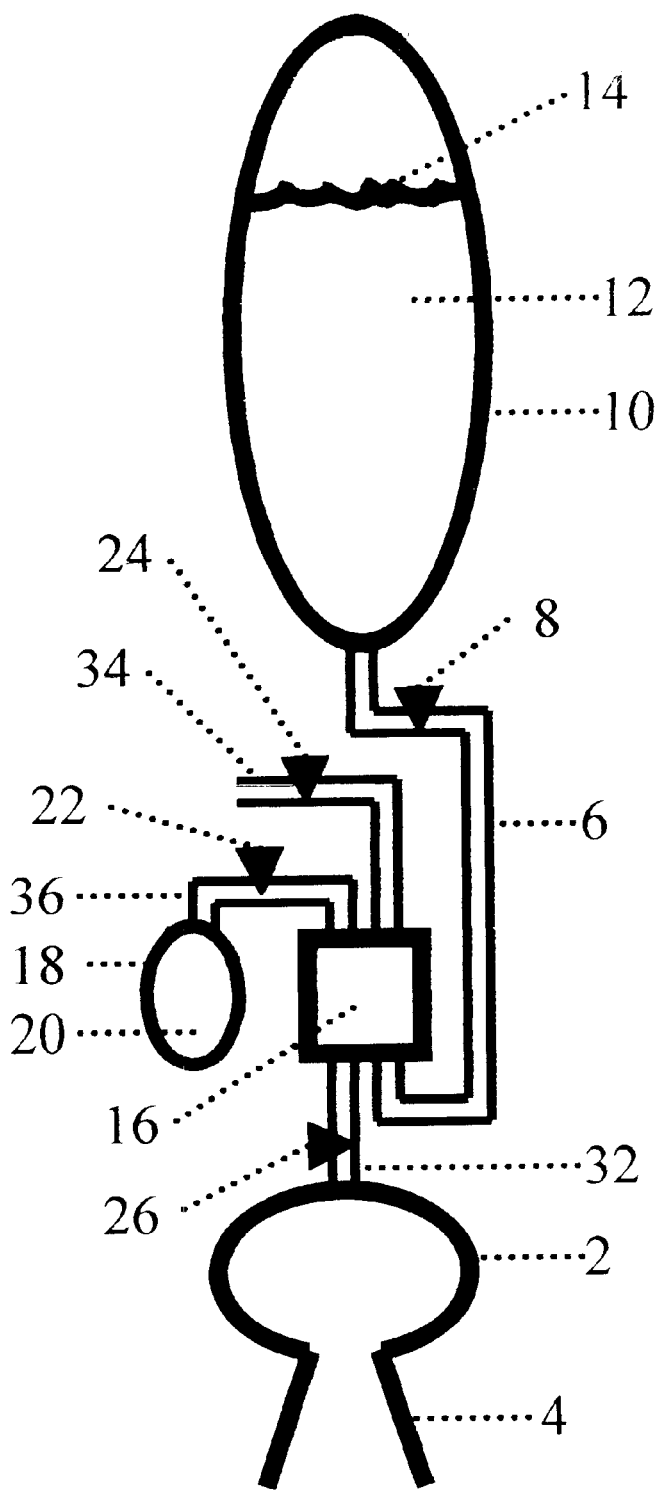
FIG. 1 shows a schematic view of a rocket engine system employing a preferred embodiment of a pressurizer described herein.

Referring to FIG. 1, according to a preferred embodiment, a rocket engine system includes a propellant tank 10 connected by a propellant conduit 6 to a pressurizer 16, a pressurant tank 18 connected by a pressurant conduit 36 to the pressurizer 16, and an impulse reaction engine 2 (also known as a rocket engine 2 or jet engine 2) with a nozzle 4 connected by an engine conduit 32 to the pressurizer 16. The propellant tank 10 contains a propellant 12 with meniscus 14. Flow of the propellant 12 into pressurizer 16 is controlled by propellant valve 8. A pressurant tank 18 contains a pressurant 20. Flow of the pressurant 20 into pressurizer 16 is controlled by pressurant valve 22. Flow of propellant 12 from pressurizer 16 to engine 2 is controlled by engine valve 26. Pressurant exhaust is released from exhaust conduit 34, and its flow is controlled by exhaust valve 24.

Propellant 12 combusts in engine 2 and the resulting gas accelerates through nozzle 4. Propellant 12 can be any monopropellant, such as a substance that decomposes by itself or in the presence of a catalyst. One example is hydrogen peroxide. Propellant 12 can also be a fuel or an oxidizer in a hybrid rocket engine system. For example, propellant 12 could be liquid oxygen and engine 2 could contain a solid resin fuel. Further, propellant 12 need not be a reacting substance at all—it could be a working medium that is heated by an external heat source. For example, propellant 12 could be liquid hydrogen and engine 2 could contain a nuclear reactor that heats the hydrogen to high pressures. Engine 2, as is apparent to one skilled in the art, is simply a device that ejects a propellant or working medium (usually a hot gas) substantially in one direction to provide an impulse reaction force in an opposite direction. The propellant/working medium need not be ejected perfectly in one direction; rather, it simply must not be ejected isotropically, otherwise the engine 2 will experience no impulse reaction force in any particular direction. However, in a preferred embodiment, engine 2 ejects the propellant/working medium in substantially one direction.

Pressurant 20 can be any high-pressure fluid, and the following description is meant as an example and not as a limitation. Pressurant 20, if it comes into direct contact with the propellant 12, should be nonreactive with propellant 12. (An embodiment will be described later in which the pressurant 20 does not come into contact with propellant 12.) Further, it should not react with the walls of the pressurant tank 18 or any of the components of the pressurizer herein described. For example, two fluids that meet this description are inert gases such as helium and nitrogen. However, both of these fluids are gases at room temperature (regardless of their pressure); therefore, a high density may be difficult to obtain. A high density for pressurant 20 is necessary so that a large quantity of pressurant 20 can be held in a small pressurant tank 18. Because pressurant tank 18 is designed to withstand very high pressures, its walls may be very thick, resulting in a large weight. Therefore, the smaller the pressurant tank 18, the better. In a preferred embodiment of the present invention, the pressurant 20 is a liquid with a very high vapor pressure. For example, liquid carbon dioxide at room temperature has a vapor pressure of approximately 750 PSI. However, 750 PSI, while high, may not be high enough. As another example, liquid nitrogen can be heated until its vapor pressure is, for example, 2000 PSI. Because of the very high vapor pressure attainable, and because liquid nitrogen is much denser than gaseous nitrogen, liquid nitrogen may be a good choice for pressurant 20. One skilled in the art will realize that a plethora of other good choices exist for pressurant 20.

Figure 19:
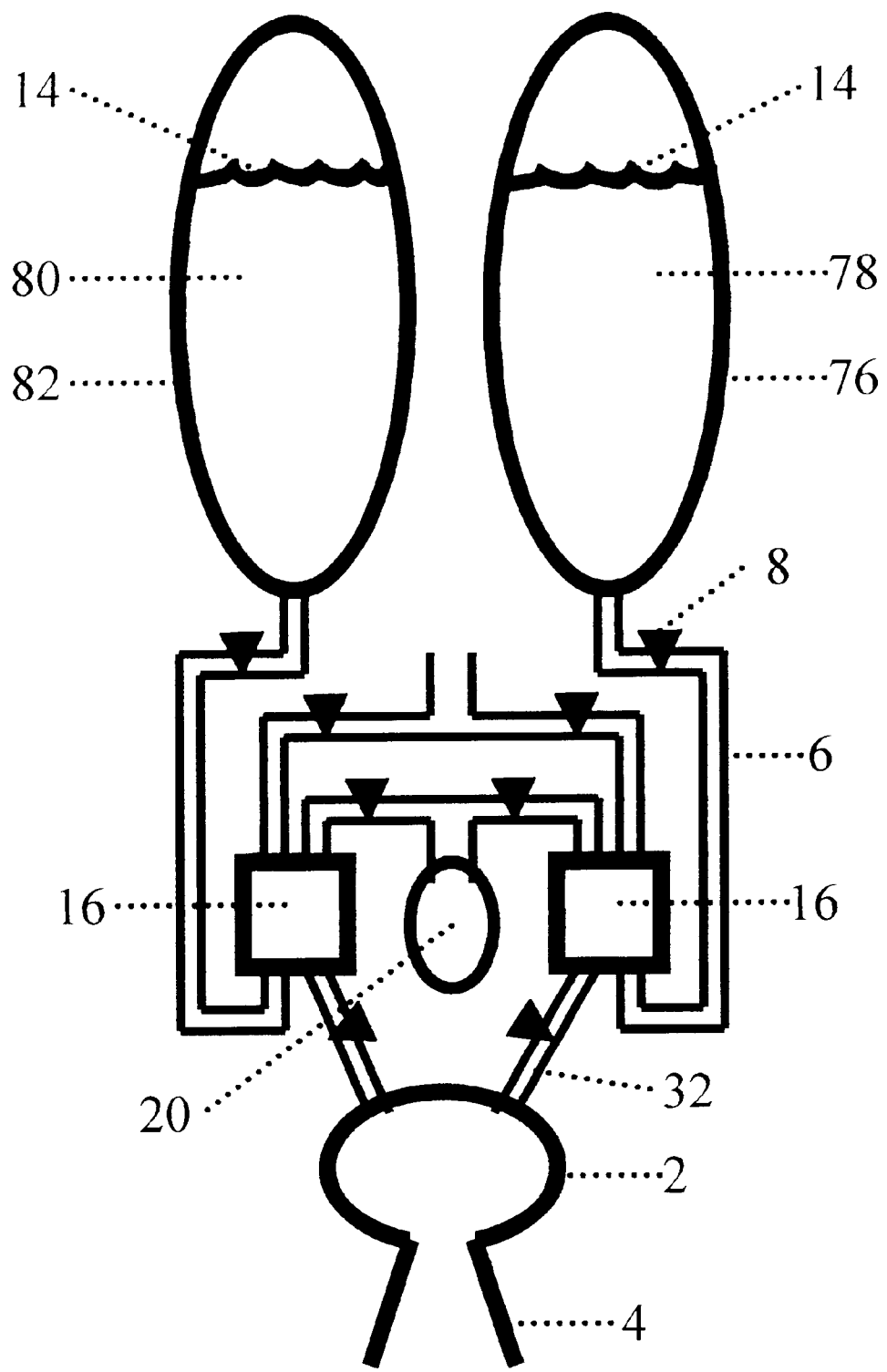
FIG. 19 shows a schematic view of a rocket engine system according to a preferred embodiment employing two propellants.

Referring to FIG. 19, in another preferred embodiment of the present invention, the rocket engine system comprises two propellants, a fuel 78 contained in a fuel tank 76 and an oxidizer 80 contained in an oxidizer tank 82. Each of the fuel and the oxidizer has its own pressurizer 16, and the pressurizers 16 may or may not share a common pressurant 20. In other embodiments, the rocket engine system could comprise more than two propellants, or two propellants other than a fuel and oxidizer. For example, it could comprise a fuel, an oxidizer, and a catalyst, or a decomposing propellant and a catalyst. Many different potential combinations of propellant tanks and pressurizers would be apparent to one skilled in the art.

Figure 2:
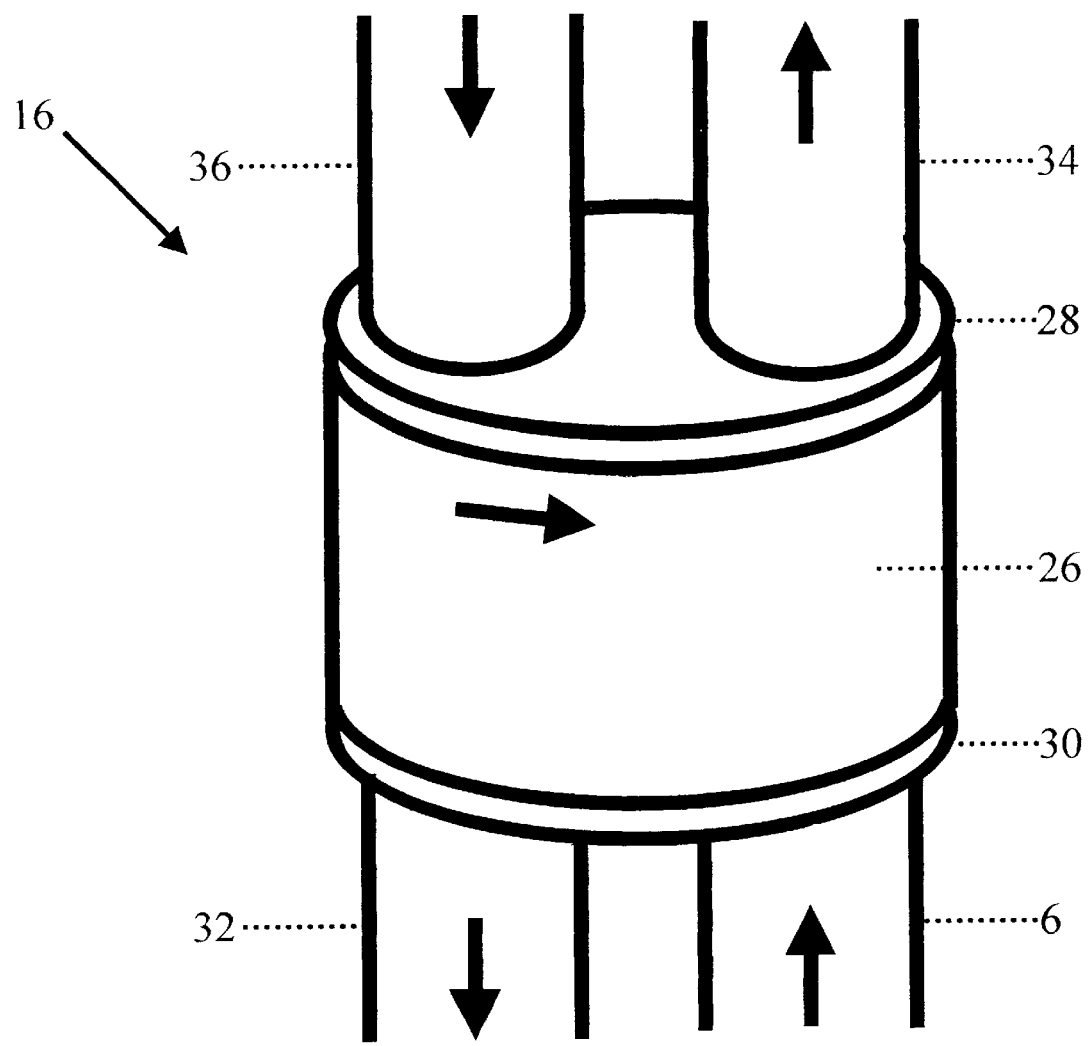
FIG. 2 shows a perspective view of a preferred embodiment of a pressurizer described herein.

Referring now to FIG. 2, a pressurizer according to a preferred embodiment includes: (a) a top chamber separator 28 to which pressurant conduit 36 and exhaust conduit 34 are connected; (b) a bottom chamber separator 30 to which engine conduit 32 and propellant conduit 6 are connected; and (c) a rotatable spindle 26. Propellant 12 flows into the spindle 26 through propellant conduit 6 and out of the spindle 26 through engine conduit 34. Pressurant 20 flows into the spindle 26 through pressurant conduit 36 and out of the spindle through exhaust conduit 34. Propellant 12 and pressurant 20 flow in the direction indicated by the arrow shown in each conduit. The spindle 26 in this embodiment rotates in the direction indicated by the arrow shown on the spindle 26, although it would be obvious that it could spin in the opposite direction.

Figure 3:
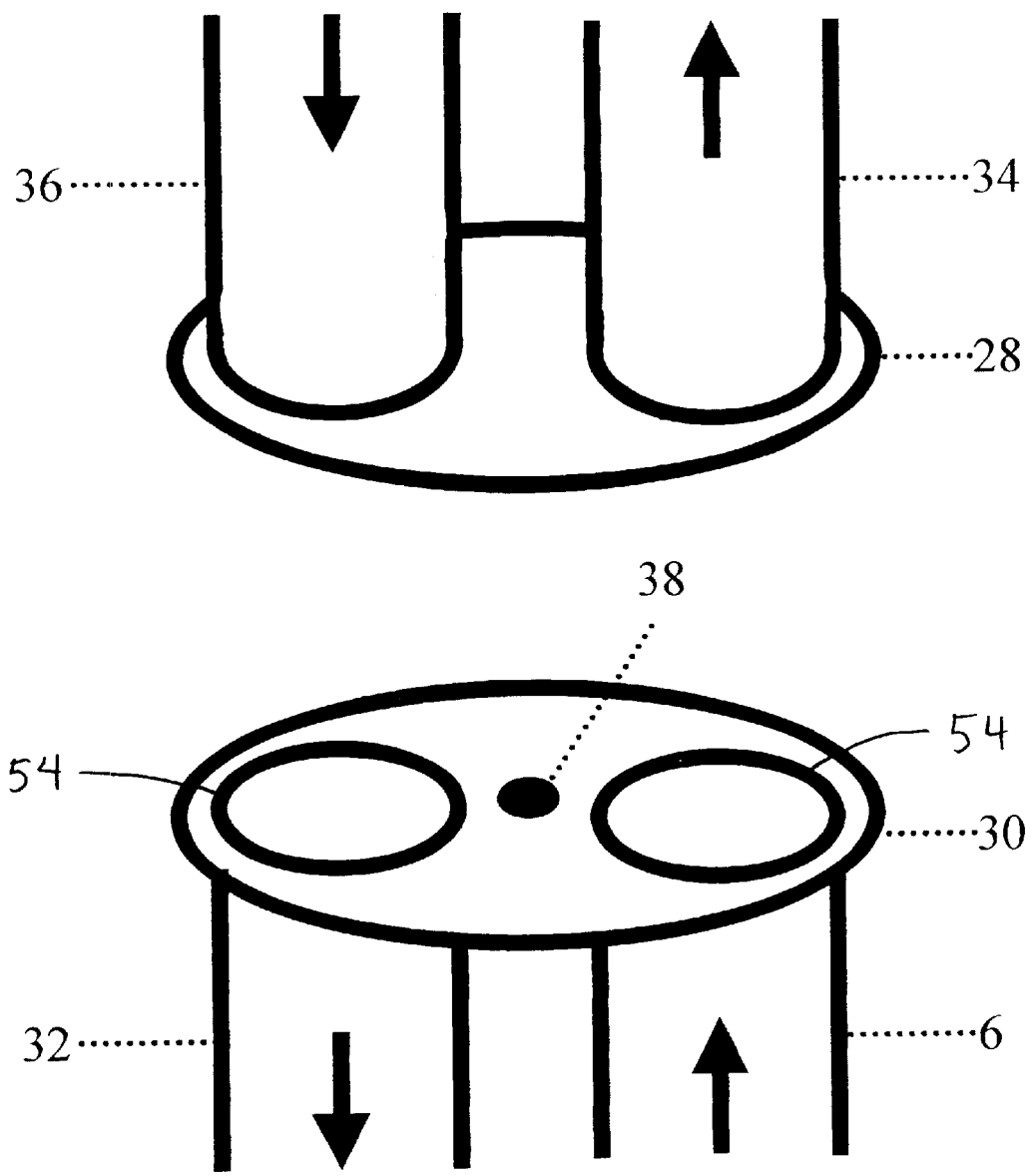
FIG. 3 shows a perspective view of the pressurizer shown in FIG. 2 without the spindle.

Referring to FIG. 3, which shows the pressurizer without the spindle 26, the pressurizer includes a rotatable connector 38 that rotatably connects the bottom chamber separator 30 to the spindle 26. There could also be such a connector connecting the top chamber separator 28 to the spindle 26. The connector could comprise bearings, such as ball bearings or gas bearings. Further, there are seals (not shown) between the moving spindle 26 and selected parts of the top chamber separator 28 and the bottom chamber separator 30. The seals should allow the spindle 26 to spin with minimal friction while preventing propellant 12 and pressurant 20 from flowing into the wrong conduits at the wrong times. By way of example and not of limitation, there could be a circular seal around the circular hole 54 on the left side of the bottom chamber separator 30 in FIG. 3, where the engine conduit 32 connects to the bottom chamber separator 30. There could also be a seal on the top of the bottom chamber separator 30 and around its circumference, with an additional seal to separate the left and right halves of the bottom chamber separator. The placement and material composition of such seals would be obvious to one skilled in the art.

Figure 4:
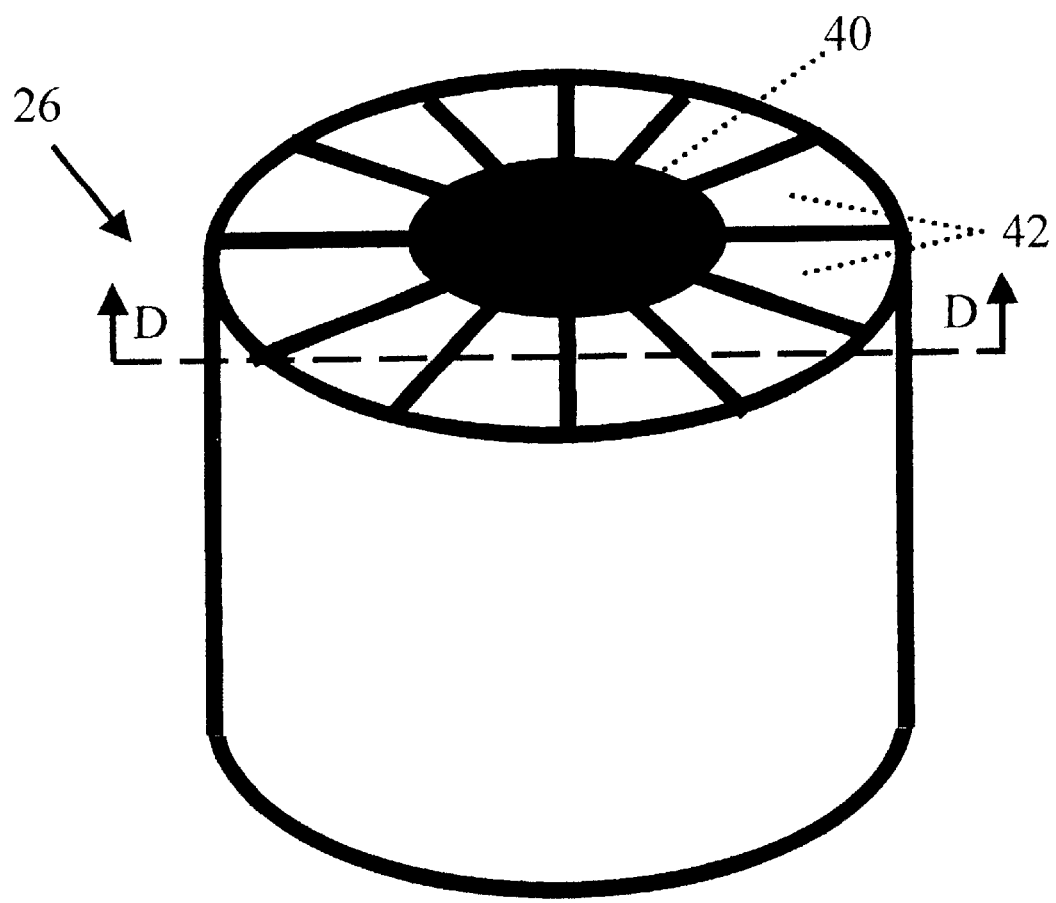
FIG. 4 shows a perspective view of the spindle shown in FIG. 2.
Figure 5:
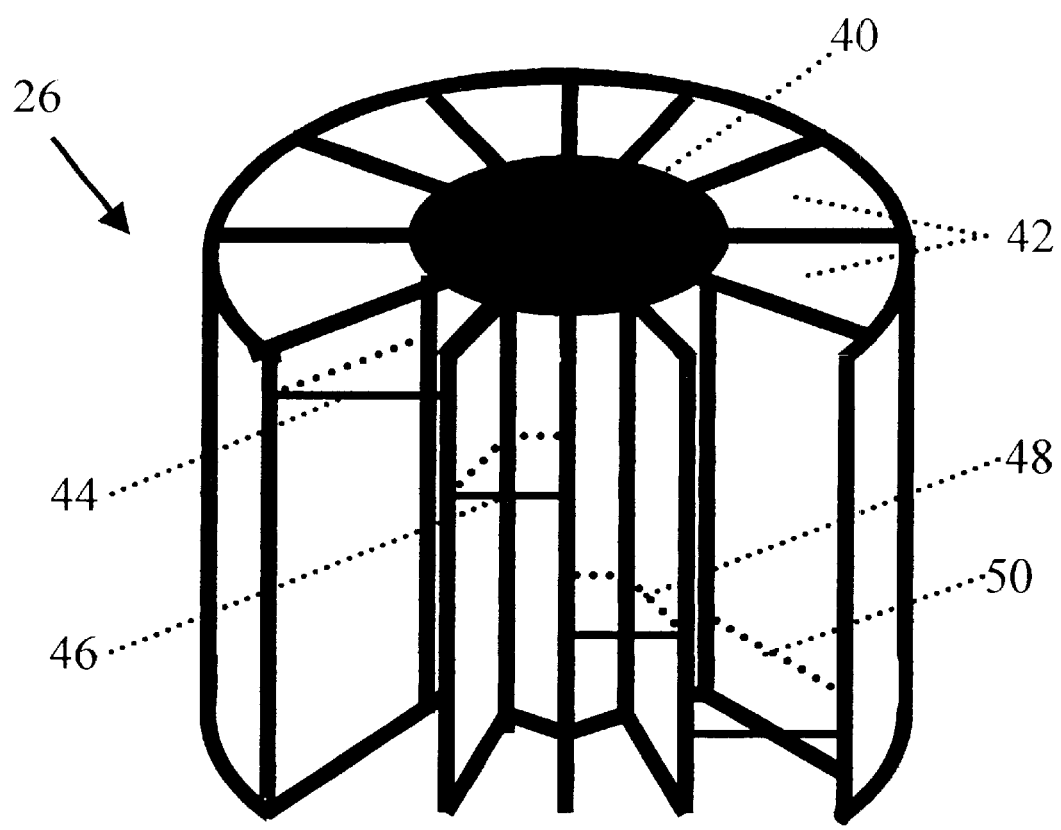
FIG. 5 shows a cut-away perspective view along section D—D of the spindle shown in FIG. 4.

Referring to FIG. 4, spindle 26 includes a plurality of transfer chambers 42 and a center 40. Each complete rotation of the spindle 26 is a complete cycle for each transfer chamber 42. For each transfer chamber 42, for a portion of each cycle, propellant 12 flows inward from propellant conduit 6 (in the direction of the arrow indicated as shown in FIGS. 2 and 3) and pressurant 20 flows outward to exhaust conduit 34; for another portion of the cycle, propellant 12 flows outward to engine conduit 32 and pressurant 20 flows inward from pressurant conduit 36. Now referring to FIG. 5, each transfer chamber 42 is an individual chamber divided from the next, so that the meniscus of propellant 12 in each transfer chamber 42 is potentially different. First meniscus 44 is the meniscus in a transfer chamber that is just beginning the portion of the cycle in which propellant 12 flows outward to engine conduit 32 and pressurant 20 flows inward from pressurant conduit 36. Fourth meniscus 50 is the meniscus in a transfer chamber that is just ending the portion of the cycle in which propellant 12 flows outward to engine conduit 32 and pressurant 20 flows inward from pressurant conduit 36. In this figure, propellant 12 is flowing downward under the force of pressurant 20.

Figure 6:
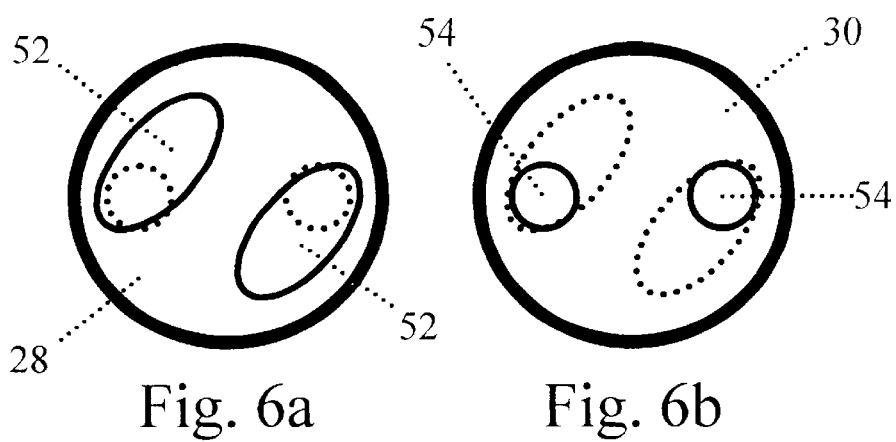
FIG. 6a shows a top view of the top chamber separator.
FIG. 6b shows a bottom view of the bottom chamber separator.

Referring now to FIGS. 6a and 6b, the oblong holes 52 in top chamber separator 28 of the pressurant conduit 36 and the exhaust conduit 34 are larger than the corresponding circular holes 54 in bottom chamber separator 30 of the engine conduit 32 and the propellant conduit 6. Further, oblong holes 52 "cover" as well as "precede" the circular holes 54 in the direction of rotation of the spindle 26, as shown in the figures. The oblong holes 52 must "cover" the circular holes 54 so that the pressurant 20 is acting on the propellant 12 in a given transfer chamber 42 at all times that the propellant 12 in the transfer chamber 42 is in pressure communication with the engine 2 via engine conduit 32. Further, the oblong holes 52 must "precede" the circular holes 54 so that the pressurant 20 has sufficient time to pressurize the transfer chamber and provide the proper force on the propellant 12 before the propellant 12 is placed in pressure communication with the engine 2 via engine conduit 32. There are other ways to achieve the same result and would be obvious to one skilled in the art. For example, oblong holes 52 could be thinner than shown in the figures and still achieve the same result. Further, they need not be oblong, nor need the circular holes 54 be circular.

As the spindle 26 (not shown in FIGS. 6a and 6b) rotates once in the counter-clockwise direction relative to a top view of the top chamber separator 28, each transfer chamber 42 (not shown) completes a cycle. For illustrative purposes, suppose a transfer chamber is currently full with propellant 12. As it moves inside spindle 26, it first comes upon an oblong hole 52 of the pressurant conduit 36. Pressurant 20 then rapidly flows into the transfer chamber 42, due to its high pressure, and soon reaches an equilibrium pressure. Next, the transfer chamber 42 comes upon circular hole 54 of the engine conduit 32. Propellant 12 is now in pressure communication with the engine 2, and propellant flows to the engine 2 via engine conduit 32 under the force of pressurant 20 until most or all of propellant 12 has flowed from the transfer chamber 42. Next, the transfer chamber 42 moves past the circular hole 54, thus ending the pressure communication of propellant 12 with engine 2. Next, the transfer chamber moves past the oblong hole 52 and pressurant 20 is no longer able to flow into transfer chamber 42. The transfer chamber 42 may move past both the circular hole 54 and the oblong hole 52 roughly simultaneously.

Next, the transfer chamber 42 comes upon an oblong hole 52 of the exhaust conduit 34. The pressurant 20 flows out of the transfer chamber into the exhaust conduit 34 until a near equilibrium pressure is reached between the inside of the transfer chamber 42 and the exhaust pressure of the exhaust conduit 34. The exhaust pressure may be atmospheric pressure, or it may be a vacuum if the pressurizer herein described is used in space. Next, the transfer chamber 42 comes upon a circular hole 54 of the propellant conduit 6. The propellant 12, the pressure of which at its entrance into the transfer chamber 42 is higher than the exhaust pressure of the exhaust conduit 34, flows into the transfer chamber 42 as it displaces the remaining pressurant 20, until the propellant 12 completely or mostly fills the transfer chamber 42. Next, the transfer chamber 42 moves past the circular hole 54, thus ending the flow of propellant 12 into transfer chamber 42. Next, the transfer chamber moves past the oblong hole 52 and pressurant 20 is no longer in pressure communication with exhaust conduit 34. The transfer chamber 42 may move past both the circular hole 54 and the oblong hole 52 roughly simultaneously.

One full cycle has been described. After this, the cycle begins again. Because of the plurality of transfer chambers 42 in the spindle 26, the pressurizer 16 is designed so that at any given time at least one transfer chamber 42 is in pressure communication with both the engine 2 via engine conduit 32 and the pressurant 20 via pressurant conduit 36 simultaneously, thus ensuring continuous, uninterrupted flow of propellant 12 to the engine 2.

The propellant 12 at its entrance into the transfer chamber 42 is at a higher pressure than the exhaust pressure of the exhaust conduit 34 because of a pressure head due to the height of meniscus 14 relative to the entrance of the propellant 12 into the transfer chamber 42. However, this pressure may or may not be sufficient. In order to increase this pressure, and thereby increase the flow rate of propellant 12 into transfer chamber 42, the propellant tank 10 may be pressurized. The propellant tank 10 need not be pressurized to a very high pressure, and should be lower than the pressure of the pressurant 20. (If the propellant 12 were pressurized to a pressure at or above the pressure of the pressurant 20, there would be no need for the pressurizer 16, and the walls of the propellant tank 10 would have to be very thick and heavy.) By way of example and not of limitation, the propellant tank 10 could be pressurized to between 10 and 200 PSI, or even more, if the pressurant pressure is exceedingly high.

Generally, the difference between the pressure of the pressurant 20 and the working (combusting) pressure of the engine 2 is significantly greater than the difference between the pressure of the propellant 12 at its entrance into the transfer chamber 42 and the exhaust pressure of the exhaust conduit 34. The flow rate of a fluid (e.g. propellant 12) through a conduit (e.g. propellant conduit 6) generally depends on several factors, including the difference in pressure at each end of the conduit, as well as the minimum cross sectional area of the conduit. Therefore, the flow rate per cross sectional area is generally proportional to the square root of the difference in pressure at each end of the conduit. A flow rate between the propellant tank 10 and the transfer chamber 42 should be equal to a flow rate between the transfer chamber 42 and the engine 2. Otherwise, at the end of each cycle, each transfer chamber 42 would have significantly more or less propellant 12 than it did at the end of the previous cycle. If this trend continued, it would eventually result in one of two undesirable consequences: either propellant 12 would be lost directly through the exhaust conduit 34, or else pressurant 20 would be fed directly into the engine conduit 32. In order to set the flow rate between the propellant tank 10 and the transfer chamber 42 equal to the flow rate between the transfer chamber 42 and the engine 2, the minimum cross sectional area of the path between the propellant tank 10 and the transfer chamber 42 (e.g., propellant conduit 6) should be greater than the minimum cross sectional area of the path between the transfer chamber 42 and the engine 2 (e.g., engine conduit 32). This is necessary to counteract the effect resulting from a difference in pressure between the pressurant 20 and the engine 2 that is higher than the difference in pressure between the propellant 12 at its entrance into the transfer chamber 42 and the exhaust pressure of the exhaust conduit 34.

Therefore, one of the circular holes 54 (FIG. 6b) could be larger than the other, the larger one corresponding to the point of connection between the engine conduit 32 and the bottom chamber separator 30. Further, the engine conduit 32 could have a smaller cross section than the propellant conduit 6. It would be obvious to one skilled in the art how to adjust the dimensions of the various elements of the pressurizer described herein in order to assure proper flow rates of propellant 12 into and out of transfer chamber 42.

Figure 7:
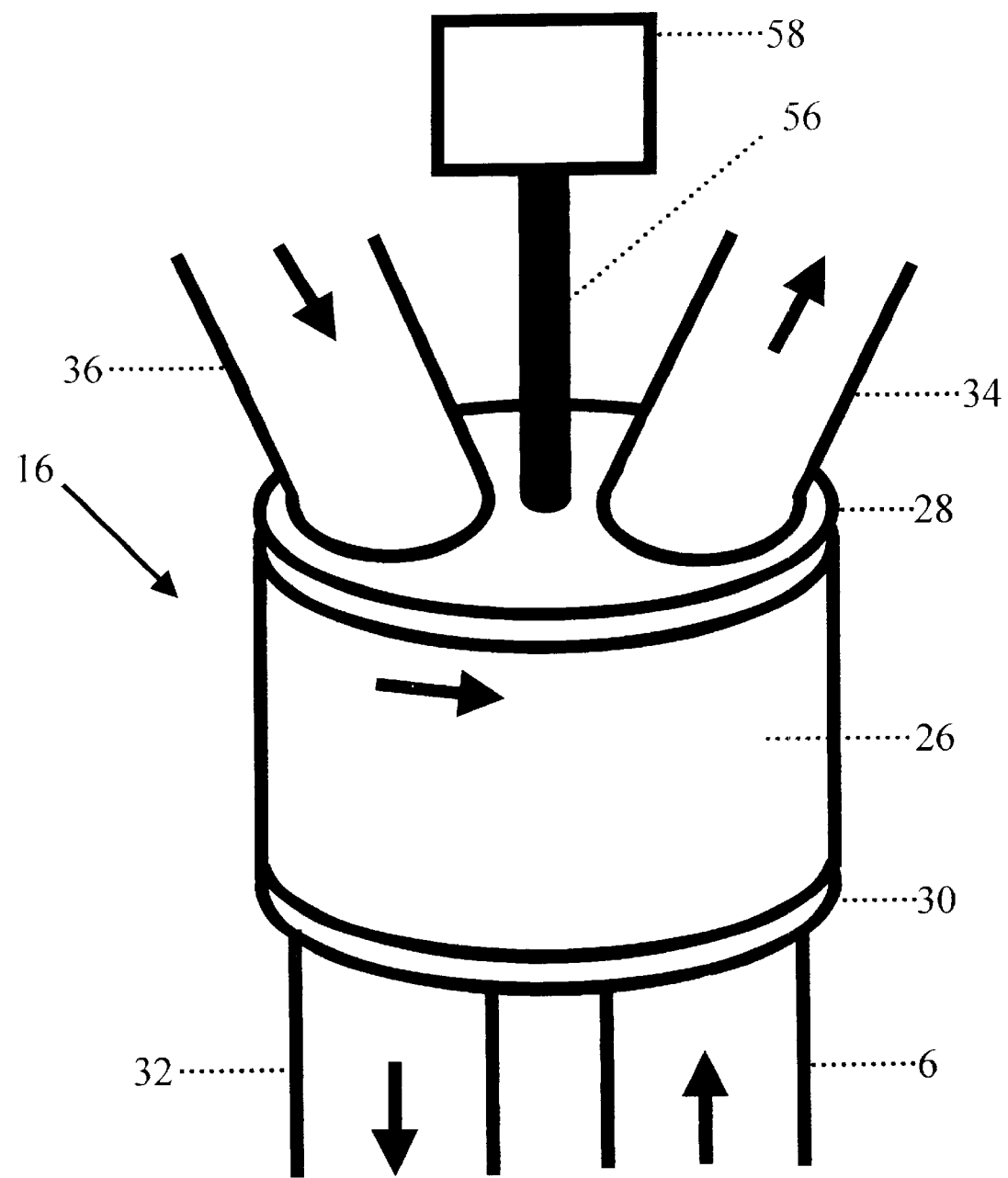
FIG. 7 shows a perspective view of the pressurizer in FIG. 2 with a motor.

Referring now to FIG. 7, the spindle 26, housing a plurality of transfer chambers 42, can be rotated by an external means of rotation, such as a motor 58 connected to the spindle 26 via motor shaft 56. As the motor 58 spins, the spindle 26 rotates. In each rotation of the spindle 26, each transfer chamber 42 inside is subject to a full cycle as previously described. The motor 58 could be an electric motor, powered by a battery or some other electric power supply. The motor 58 could also be a piston engine or a turbine, powered, for example, by the combustion/decomposition of propellant 12 or the expansion of the pressurant 20. However, the motor 58 does not need to be large or to consume much energy. It needs only to overcome the friction resulting from the contact between the moving spindle 26 and the stationary chamber separators 28, 30 via the seal. The greater the friction and the faster the spinning of the spindle 26, the more work the motor 58 needs to do.

Figure 8:
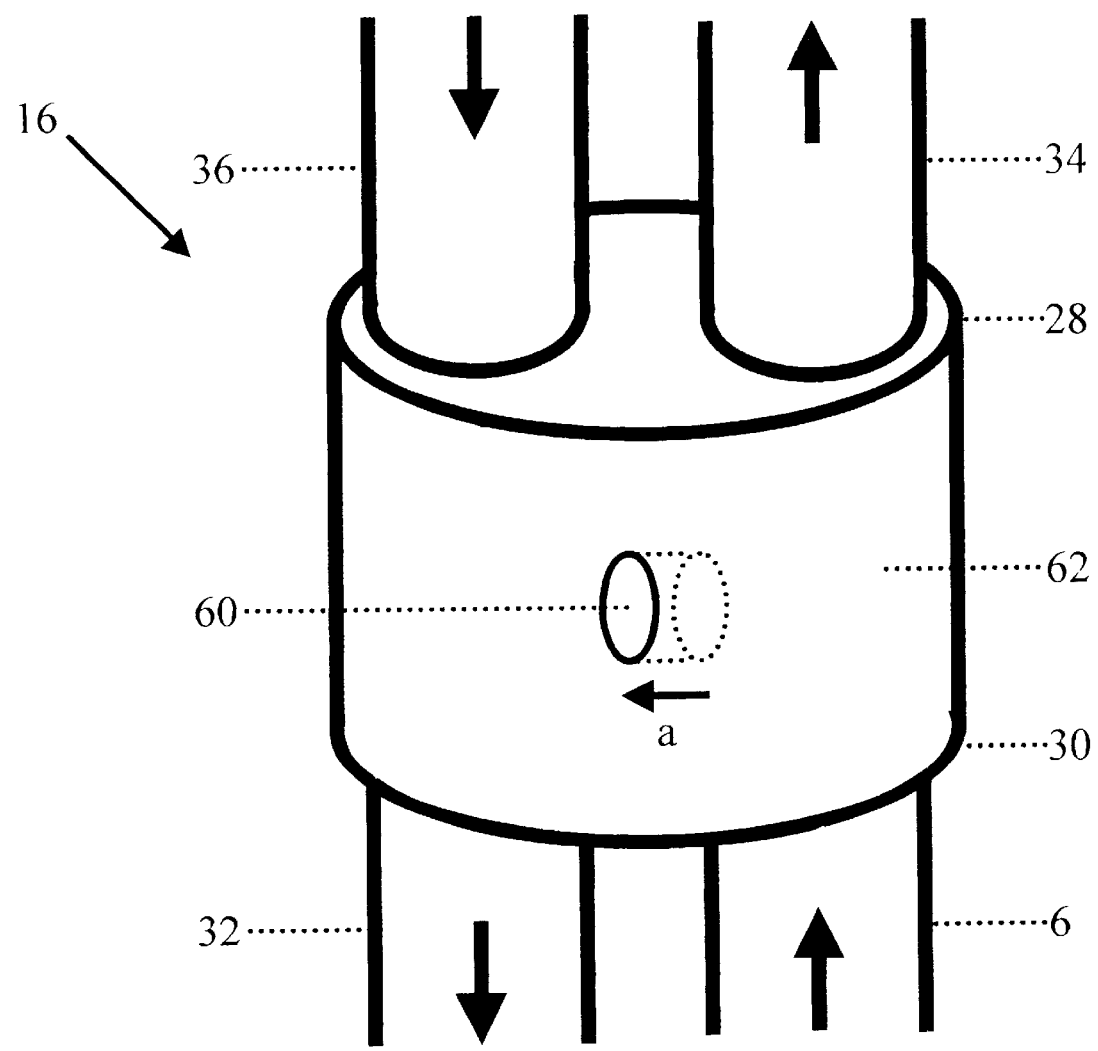
FIG. 8 shows a perspective view of another preferred embodiment of the pressurizer described herein.
Figure 9:
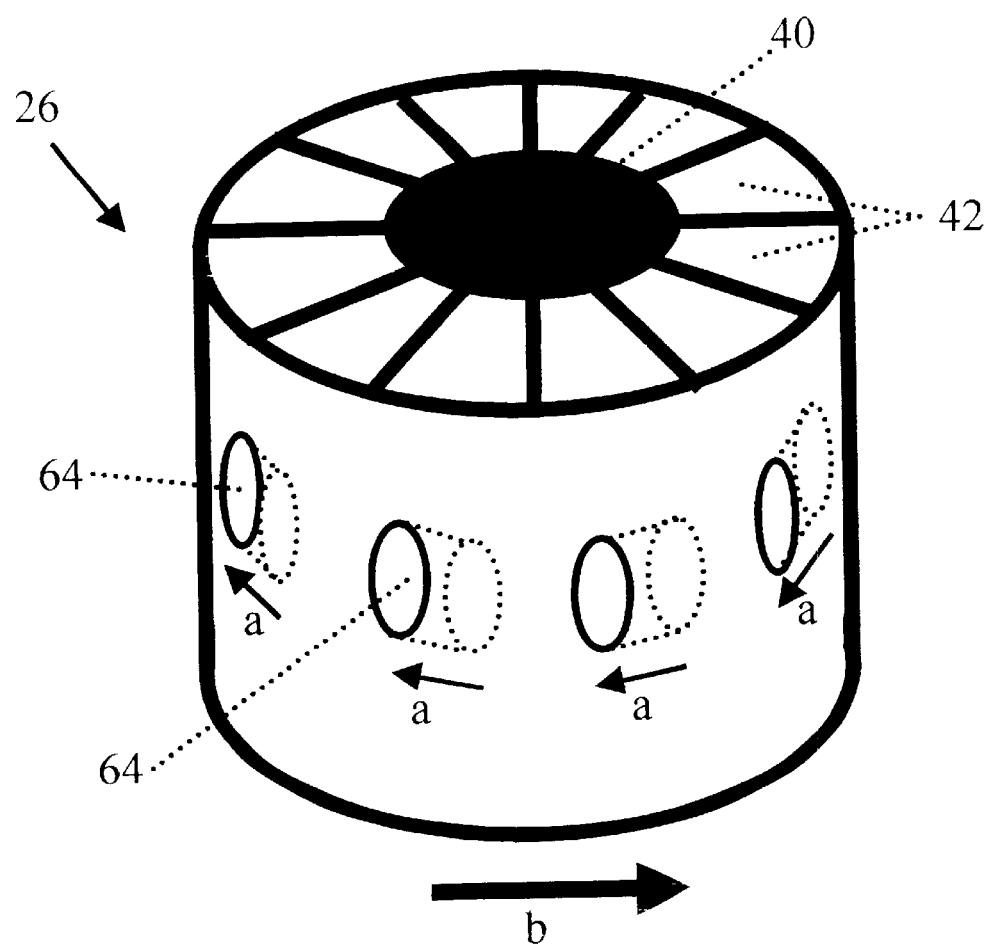
FIG. 9 shows a perspective view of a spindle associated with the pressurizer in FIG. 8.

Referring now to FIG. 8, in another preferred embodiment of the present invention, pressurizer 16 has a spindle housing 62 with a housing jet hole 60. In this embodiment, the spindle 26 as shown in FIG. 9 is placed inside the spindle housing 62. The housing jet hole 60 is a hole that penetrates the wall of the spindle housing 60 in a direction that is not perpendicular to the wall. Rather, the housing jet hole 60 is pointed in a direction shown by arrow "a" that is opposite the direction of rotation "b" of the spindle 26. Of course, these directions could be reversed. Further, spindle 26 contains spindle jet holes 64 corresponding to transfer chambers 42 (i.e. one spindle jet hole 64 per transfer chamber 42) that are cut similarly to housing jet hole 60 in that they are not perpendicular to the wall of spindle 26. Rather, they point in a direction shown by the arrow "a." There is further a seal (not shown) between the outer wall of the spindle 26 and the inner wall of the spindle housing 62 so that fluid inside a transfer chamber 42 can only escape via its corresponding spindle jet hole 64 when its spindle jet hole 64 is aligned with the housing jet hole 60.

Housing jet hole 60 should be located in the wall of the spindle housing 62 "after" the pressurant conduit 36/engine conduit 32 pair in the direction of rotation of the spindle 26. The function of the holes will now be explained. After a transfer chamber 42 has just completed the part of the cycle in which it is in pressure communication with the pressurant conduit 36, the transfer chamber now contains some, if any, propellant 12, and is mostly or completely full will pressurant 20. The housing jet hole 60 is located after this part of the cycle. As the transfer chamber 42 continues in its cycle, its then comes to the housing jet hole 60, so that its corresponding spindle jet hole 64 and housing jet hole 60 line up (or approximately line up). At this point, the high-pressure pressurant flows out of the jet holes 60, 64 in the direction shown by the arrow "a." This flow of gas results in an impulse reaction acting on the spindle 26, thus pushing it in the direction shown by the arrow "b." The size and diameter of the jet holes 60, 64 has been exaggerated in the drawings, but it would be obvious to one skilled in the art how to adjust the size, shape, dimensions, direction, and location of the holes in order to effect the spinning of spindle 26 by the exhausting of jets of pressurant 20 through the holes. In this embodiment, an external driving means, such as a motor 58, is replaced or supplemented by the impulse reaction provided by the expulsion of pressurant 20 through the jet holes 60, 64.

Figure 10:
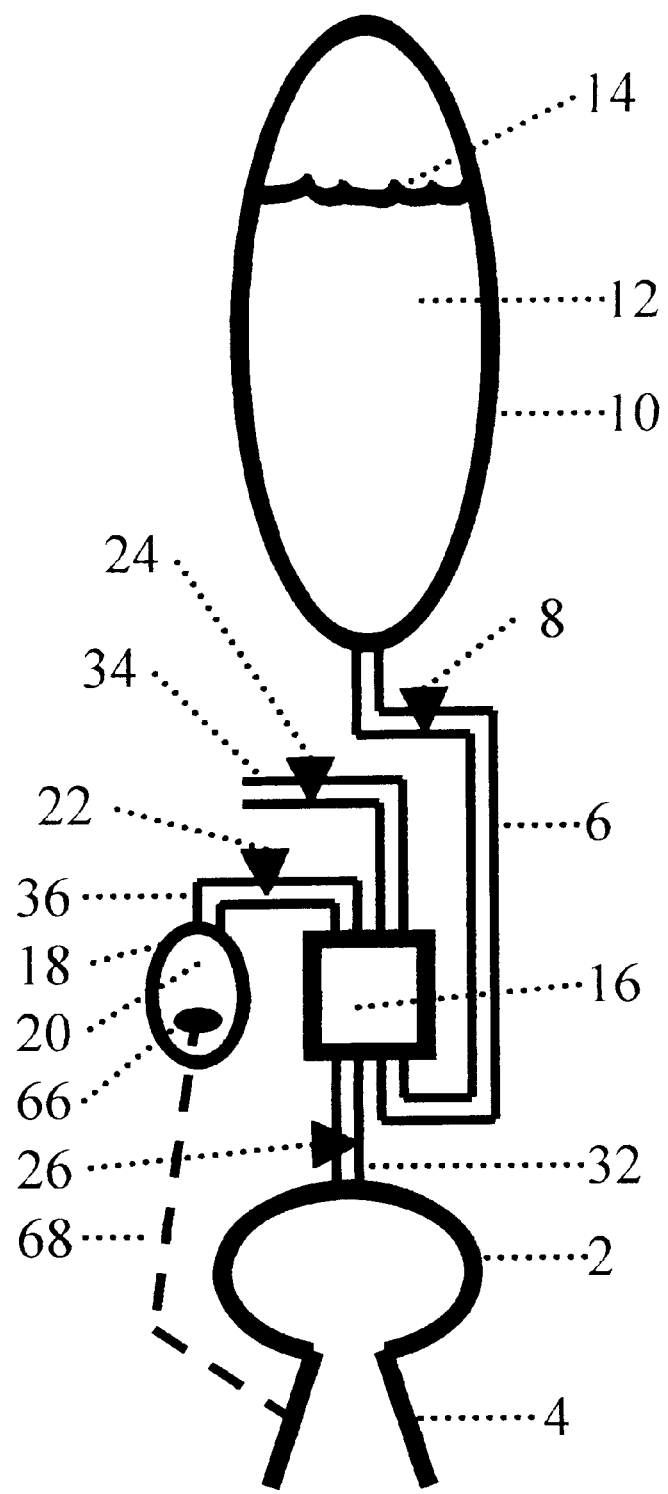
FIG. 10 shows a schematic view of a rocket engine system with a heater for the pressurant.

Referring now to FIG. 10, in another preferred embodiment, pressurant tank 18 contains a heating element 66 to heat the pressurant 20. If pressurant 20 is a liquid with a high vapor pressure, then as the vapor expands (corresponding with the pressurizing of the transfer chambers 42 according to the cycle previously explained), the liquid evaporates to replenish the vapor, causing the temperature of the liquid to drop, resulting in a corresponding drop in the vapor pressure. In order to assure a constant vapor pressure of the pressurant 20, heating element 66 applies heat to pressurant 20, keeping it at a constant temperature. The heating element 66 can be an electric resistance element or combustor in which a small quantity of propellant 12 combusts/decomposes. Further, a heat conductive lead 68 could connect the heating element 66 with the engine 2 or the nozzle 4, thus conducting some of the heat of combustion in the rocket engine 2 to the pressurant 20. Further, heat conductive lead 68 could consist of conduit, thus directing a small stream of combustion gases directly from the engine 2 to the heating element 66, and then back to the engine 2. One skilled in the art would realize the many ways possible to provide heat to pressurant 20 to keep it at a constant temperature and vapor pressure.

Figure 11:
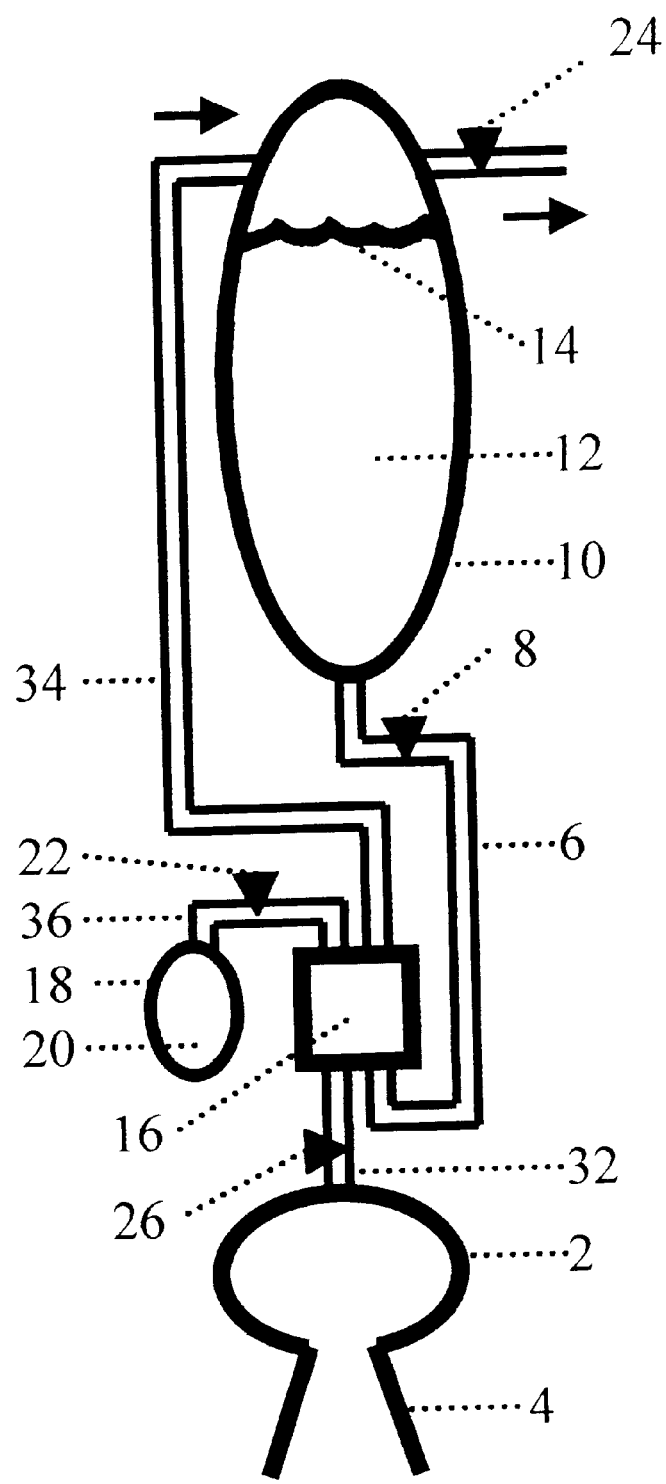
FIG. 11 shows a schematic view of a rocket engine system with the propellant tank pressurized by the pressurant exhaust.

Referring now to FIG. 11, in another preferred embodiment, exhaust conduit 34 consists of two parts, only one of which is shown in FIG. 11. The first part, shown in FIG. 11, is connected directly to propellant tank 10 in order to provide pressure to propellant tank 10. Propellant tank 10 should be pressurized by gas, as discussed previously, if the pressure head provided by the weight of the propellant (by way of the height of meniscus 14 relative to the pressurizer 16) is insufficient to cause sufficient propellant flow. Propellant tank 10 can be pressurized by the unused pressurant 20 remaining in the transfer chambers 42 just before it is exhausted. So the first part of exhaust conduit 34 directs the flow of the unused pressurant 20 to propellant tank 10, thus pressurizing the propellant 12. The second part of the exhaust conduit 34 (not shown in FIG. 11) is similar to the exhaust conduit 34 shown in FIG. 10, in that it is not connected to the propellant tank 10. In the cycle of a transfer chamber 42, the transfer chamber 42 first comes upon the first part of the exhaust conduit 34, thus pressurizing the propellant tank 10. Next, the transfer chamber 42 moves past and ends pressure communication with the first part of the exhaust conduit 34, and comes upon the second part of the exhaust conduit 34, where propellant 12 can displace the remaining pressurant 20 in the transfer chamber 42 as the remaining pressurant 20 is exhausted via the second part of exhaust conduit 34. As would be obvious to one skilled in the art, there are many ways to modify the rocket engine system described herein to make use of the unused pressurant 20 to pressurize the propellant tank 10. Further, FIG. 11 shows an exhaust valve 24 that regulates the pressure in propellant tank 10. Because the pressure of pressurant 20 is so high in relation to the needed pressure in propellant tank 10, it may be necessary to evenly vent propellant tank 10 via exhaust valve 24 in order to keep the pressure in propellant tank 10 constant.

Figure 12:
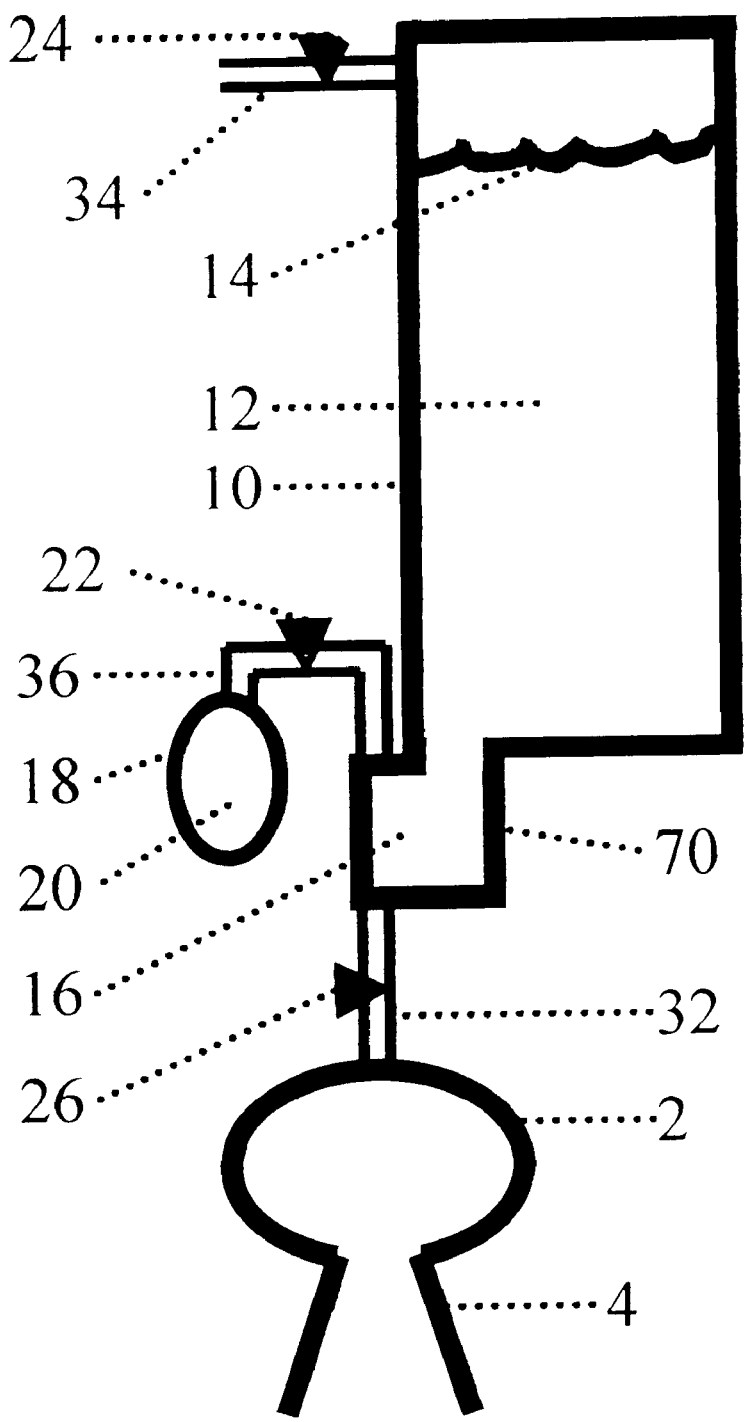
FIG. 12 shows a schematic view of a rocket engine system employing another preferred embodiment of the pressurizer described herein.
Figure 13:
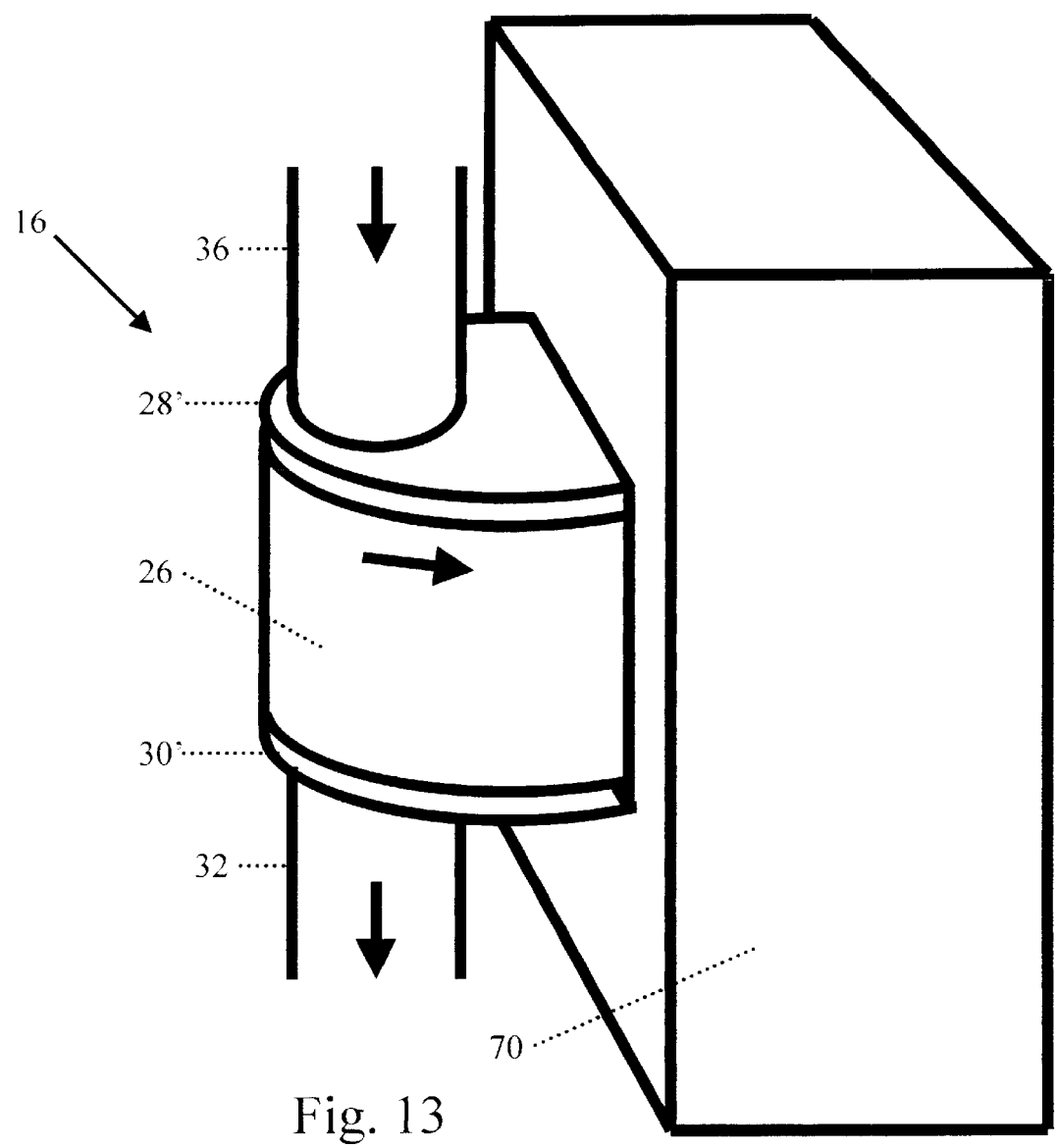
FIG. 13 shows a perspective view of the pressurizer shown in FIG. 12.
Figure 14:
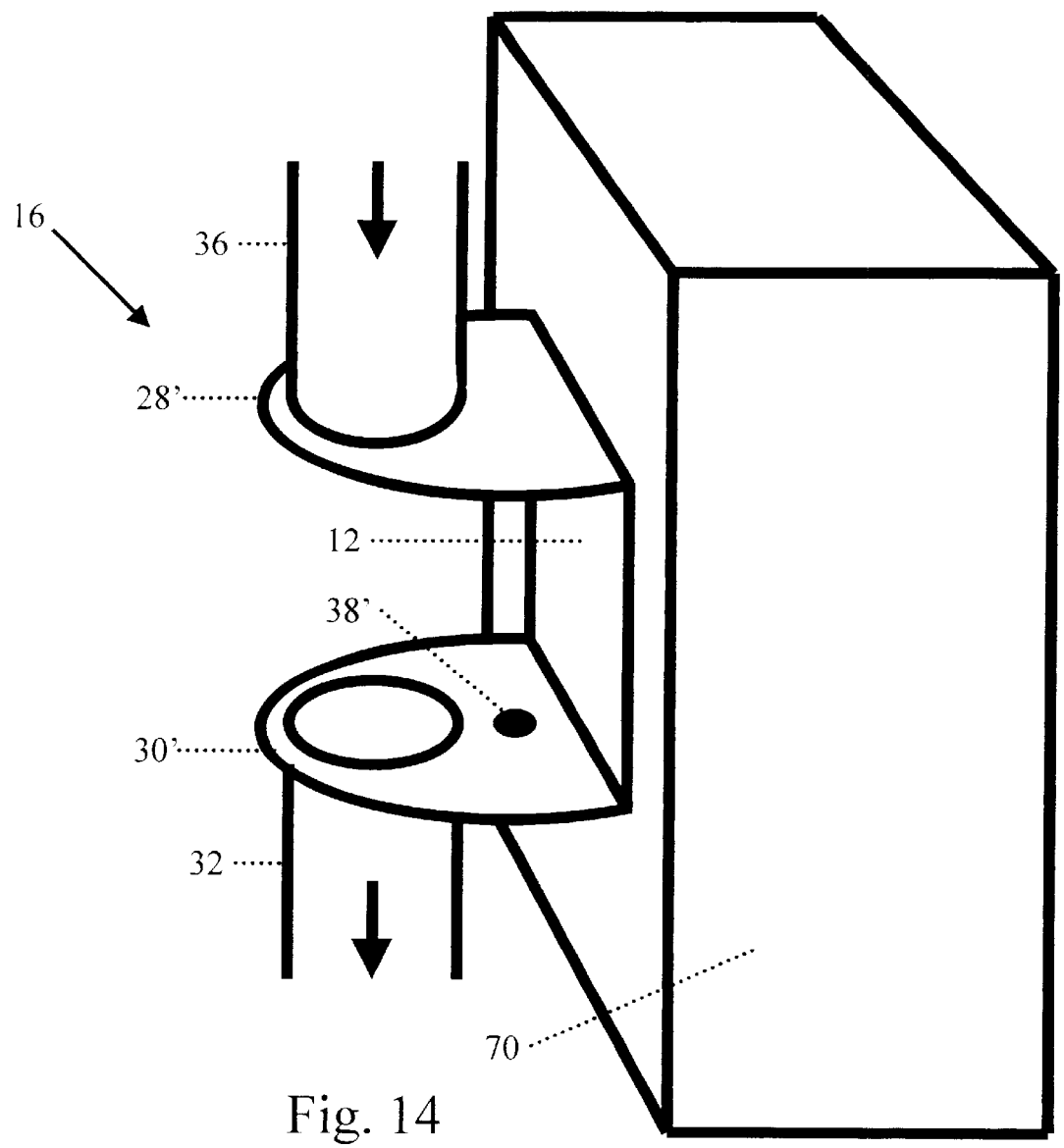
FIG. 14 shows a perspective view of the pressurizer in FIG. 13 without the spindle.

Referring now to FIG. 12, in another preferred embodiment of the present invention, the pressurizer 16 is built into the propellant tank bottom portion 70 of the propellant tank 10 as shown. FIG. 13 shows a close-up of the pressurizer portion of the rocket engine system shown in FIG. 12. A top chamber separator 28', which is approximately half the size of the top chamber separator 28 shown in FIG. 2 and is connected on one side to pressurant conduit 36, is connected on the other side to the propellant tank bottom portion 70. A bottom chamber separator 30', which is approximately half the size of the bottom chamber separator 30 shown in FIG. 2 and is connected on one side to engine conduit 32, is connected on the other side to the propellant tank bottom portion 70 (as shown in FIG. 13). The propellant conduit 6 and exhaust conduit 34 have been replaced in this embodiment by the propellant tank bottom portion 70. Besides these modifications, other aspects of this embodiment (e.g. the use of a seal, the use of a spindle 26, etc.) are similar to that described previously. Referring now to FIG. 14, a rotatable connector 38' is located on the bottom chamber separator 30', and a similar connector could be located on the top chamber separator 28'.

Now a portion of the cycle of a spindle 26 will be described. The portion of the cycle involving pressurant conduit 36 and engine conduit 32 is similar to that described previously with regard to FIGS. 6a and 6b, and will not be repeated. After a transfer chamber 42 has moved past conduits 32, 36, it then comes upon the entrance to propellant tank bottom portion 70. At this point, both the top and bottom of the transfer chamber 42 are open to—and in pressure communication with—the propellant tank 10 and the propellant 12 that it contains. The high-pressure unused pressurant 20 remaining in the transfer chamber 42 then expands against the propellant 12 located in the propellant tank bottom portion 70, resulting in a bubble that rises due to a buoyant force of the propellant 12 acting on the pressurant 20. As the bubble of pressurant 20 rises, it is displaced in the transfer chamber 42 by propellant 12, until the transfer chamber 42 is completely filled with propellant 12 and no pressurant 20 remains. The bubble of pressurant 20 continues rising until it breaks meniscus 14. Pressurant 20, because of its high pressure, serves to pressurize propellant tank 10, and exhaust valve 24 is used to regulate the pressure inside propellant tank 10, as previously discussed. As the transfer chamber continues in its cycle, it then comes upon the exit of propellant tank bottom portion 70, where its pressure communication with propellant tank 10 ends. Then, the cycle ends, and a new cycle begins, the beginning of which has been described before in regard to FIGS. 6a and 6b.

In another embodiment, not shown, the spindle 26 is rotated by an external rotation means, such as a motor, engine, or turbine, as discussed. Further, in another embodiment, the embodiment shown in FIGS. 13 and 14 is modified with jet holes 60, 64 shown in FIGS. 8 and 9 in order to rotate spindle 26 by means of impulse reaction. Further, in order to address the issue of flow rate discussed previously, the cross section of the engine conduit 32 may be smaller than shown in the drawings, and/or the chamber separators 28', 30' may be smaller so that each transfer chamber spends a greater portion of its cycle inside propellant tank bottom portion 70. Similar modifications to achieve similar ends would be obvious to one skilled in the art.

Figure 15:
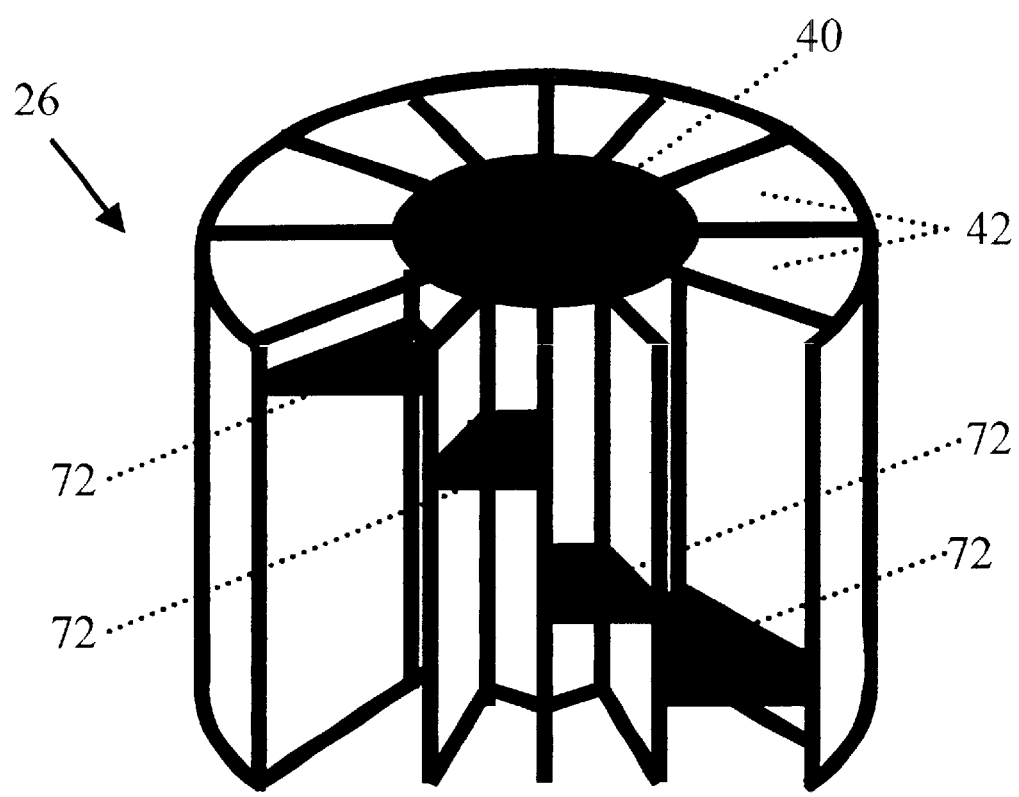
FIG. 15 shows a cut-away perspective view along section D—D of the spindle shown in FIG. 4 with a movable piston in each transfer chamber.

Referring now to FIG. 15, each transfer chamber 42 contains a movable means for separating the pressurant 20 from the propellant 12, such as a piston 72. Piston 72 can move up and down inside the transfer chamber 42 while maintaining a seal with the inside walls of the transfer chamber 42, to prevent the leak of propellant 12 into the region above the piston 72 or the leak of pressurant 20 into the region below the piston 72. The cycle proceeds as previously described with regard to FIGS. 6a and 6b, the only difference being that the pressurant 20 acts indirectly on propellant 12 via piston 72. Piston 72 could have the added feature that it cannot move any higher than the top of the transfer chamber 42 or any lower the than the bottom of the transfer chamber 42. This has the benefit that there would be no worry about "overfilling" each transfer chamber 42 with propellant 12, and no propellant 12 would be directly lost through exhaust conduit 34. It further has the benefit that there would be no worry about feeding pressurant 20 directly to the engine 2 via engine conduit 32. Any pressurant 20 that made it to the engine 2 could interrupt combustion and possibly fail the engine.

Figure 16:
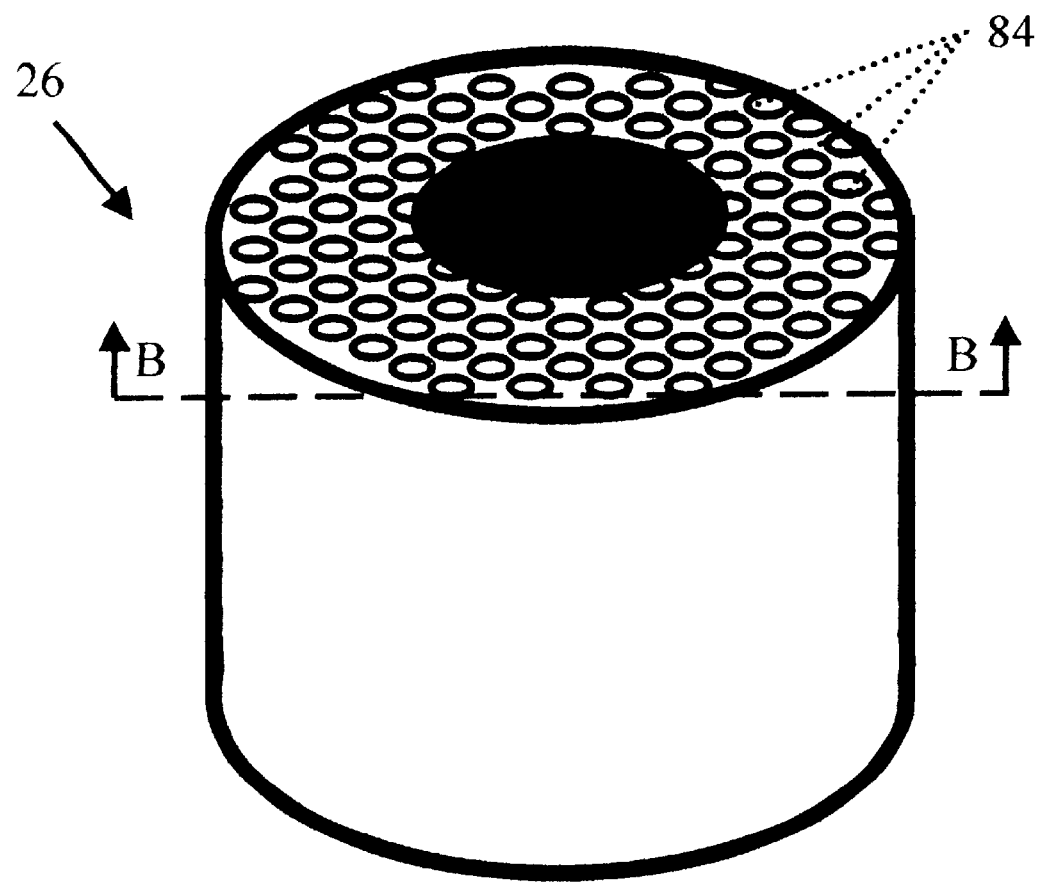
FIG. 16 shows a perspective view of a spindle with very thin transfer chambers.

Referring now to FIG. 16, in another preferred embodiment, spindle 26 contains a plurality of very thin transfer chambers 84. It is the same as the spindle 26 described previously, except for the existence of thin transfer chambers 84. The thinner the thin transfer chambers 84, the fewer the instabilities—e.g. splashing of propellant 12, bubbles of pressurant 20 in propellant 12, unevenness of the meniscus of propellant 12, etc. One might conceive of a thin transfer chamber 84 so thin that propellant 12 is fed into it by means of a capillary effect. In another embodiment, the thin transfer chambers 84 are "nano-chambers," having dimensions or diameters that on the order of a millimeter or less (e.g., a micrometer). A large quantity of such nano-chambers, coupled with a very fast rotation speed of the spindle 26, may allow very high fluid transfer rates, in spite of the very small mass of the pressurizer. This is all within the scope of the present invention.

Figure 17:
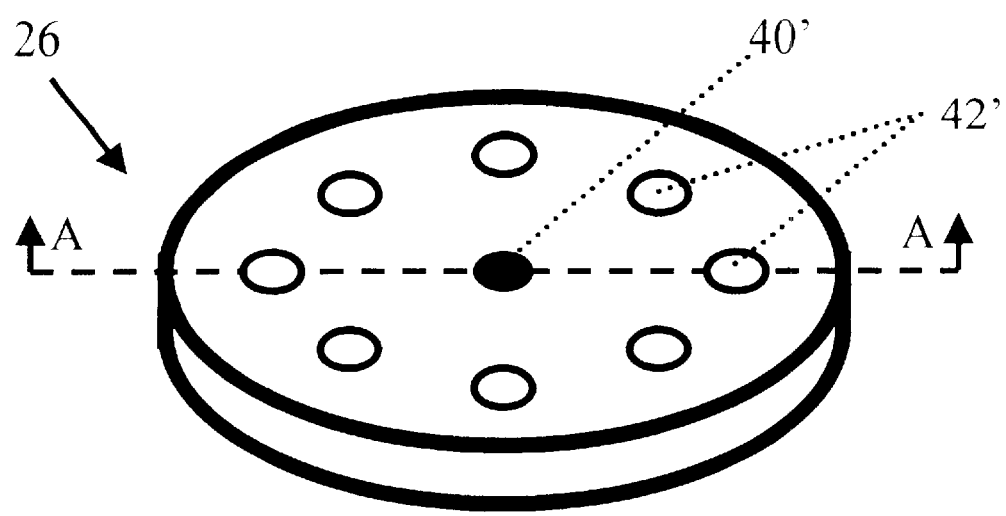
FIG. 17 shows a perspective view of a spindle with a flexible membrane in each transfer chamber.
Figure 18:
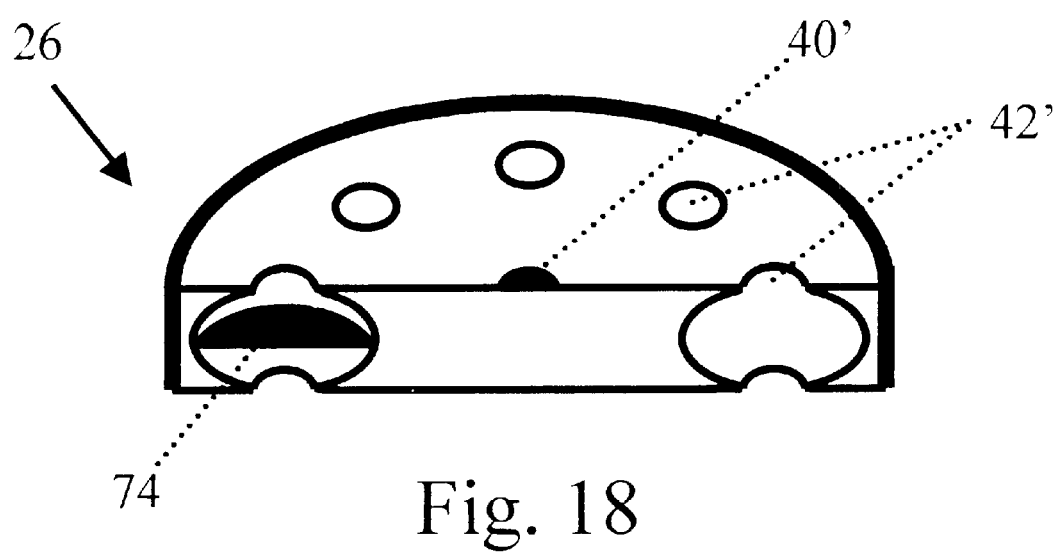
FIG. 18 shows a cut-away perspective view along section A—A of the spindle shown in FIG. 17.

Referring now to FIGS. 17 and 18, in another preferred embodiment, spindle 26 houses several transfer chambers 42', each of which contains a movable membrane 74 that is capable of separating a region above it from a region below it. The membrane 74 serves a similar purpose as piston 72 shown in FIG. 15, except that the edges of membrane 74 are permanently attached to the walls of transfer chamber 42', so that there is no need to provide a moving seal between the membrane 74 and the walls of transfer chamber 42'. Rather, while the edges of membrane 74 stay fixed in relation to the transfer chamber 42', the remainder of the membrane 74 (particularly near the center) moves up and down in the transfer chamber 42' in response to the filling and draining of propellant 12 per the cycle previously described. This embodiment, like the embodiment involving piston 72, has the advantage that membrane 74 would prevent the direct feeding of propellant 12 to exhaust conduit 34 and the direct feeding of pressurant 20 to engine conduit 32.

It will be apparent to one skilled in the art that the transfer chamber 42 need not be housed in a spindle 26, need not rotate with the spindle 26, and need not be in a cycle of rotation at all—it could move in many other cyclical ways relative to the conduits 6, 32, 34, 36 and chamber separators 28, 30. By way of example and not of limitation, a transfer chamber could reciprocate between the pressurant conduit 36/engine conduit 32 pair and the exhaust conduit 34/propellant conduit 6 pair. In order to provide constant, uninterrupted flow to the engine 2 via engine conduit 32, several such reciprocating transfer chambers 42 could be used in parallel, each one corresponding to a different stage in the cycle. In all cases, however, at least one transfer chamber 42 moves in a cycle to transfer a propellant/fluid from a filling stage to a pressurizing/emptying stage.

Figure 20A:
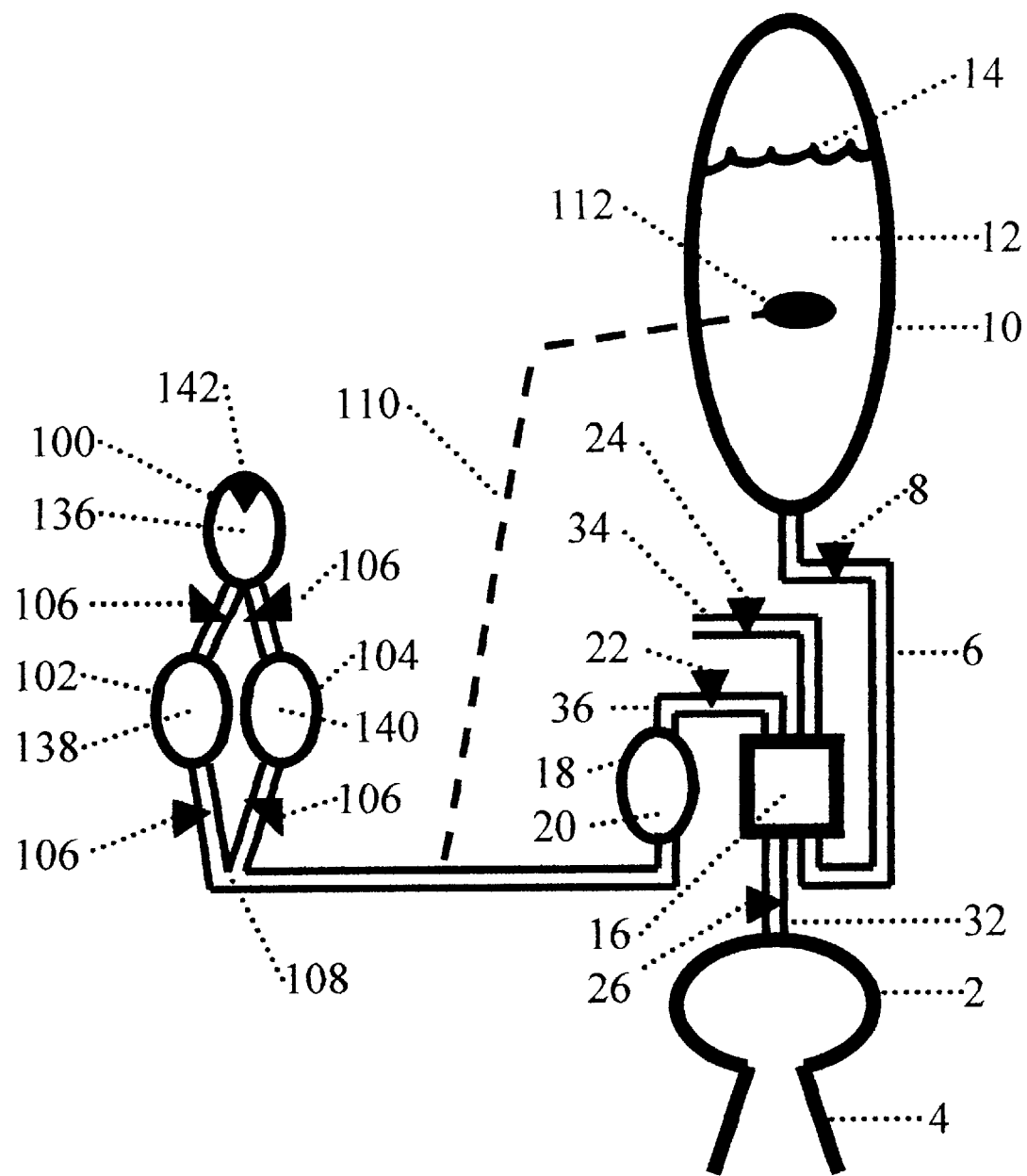
FIG. 20a shows a schematic view of a rocket engine according to a preferred embodiment employing a gas generator for the pressurant.

Referring now to FIG. 20, the pressurant 20 may be generated in whole or in part by a gas generator system, comprising a high-pressure gas 136 in pressurized gas tank 100, a fuel 138 in fuel tank 102, an oxidizer 140 in oxidizer tank 104, optional valves and/or regulators 106, and an optional igniter and/or catalyst 108, 142. The pressurized gas tank 100 may be filled with a high-pressure gas 136 that is inert with respect to the fuel 138 and oxidizer 140 inside the fuel tank 102 and oxidizer tank 104, respectively. Alternatively, the system may comprise a membrane, piston, or other divider between the high-pressure gas 136 and the fuel 138 and/or oxidizer 140, in which case the high-pressure gas 136 need not be inert with respect to the fuel 138 and/or oxidizer 140. The high-pressure gas 136, like the pressurant 20 described with regard to FIG. 1, may comprise high-pressure nitrogen, helium, or other gas (e.g., noble gas). Because the rocket engine system is designed to be able to pressurize a propellant 12 to a high pressure without having to pressurize the propellant tank 10 to the same pressure, the high-pressure gas 136 in the pressurized gas tank 100 may be extremely high—e.g., 50,000 PSI or more.

The same is true of the pressurant 20 as discussed with regard to FIG. 1. However, a problem with using a pressurant 20 in the rocket engine system of FIG. 1 having a pressure of 50,000 PSI is that the walls of the pressurant tank 18 must be very thick, which means only a very small volume of pressurant 20 may be stored without substantially increasing the weight of the rocket engine system. If only a very small volume of the pressurant 20 is used, its pressure will drop very quickly as it expands during the pressurizing process performed by the pressurizer 16. Therefore, a benefit of using a gas generator to create the pressurant 20 (instead of using merely a pre-pressurized) is that the pressurant 20 can be quickly re-generated as it is used up by the pressurizer 16. Further, a far lower volume of high-pressure gas 136 (in pressurized gas tank 100), fuel (in fuel tank 102), and oxidizer (in oxidizer tank 104), pressurized to 50,000 PSI, is needed to generate a corresponding volume of pressurant 20 pressurized to 50,000 PSI. The far lower volume manifests itself in a far lower total rocket engine system mass, because the total mass of tanks associated with pressurant 20 is less for a system using a gas generator.

The high-pressure gas 136 in pressurized gas tank 100 may be placed in the tank 100 mechanically (e.g., with powerful pumps), or by igniting a mixture of fuel and oxidizer (or decomposing a decomposable compound) inside the tank 100. For example, the tank 100 may initially be filled with a separated mixture of nitric acid (oxidizer) and ethanol (fuel). Then, when it is time to pressurize the gas generator system (to thus pressurize the pressurant tank 18 with pressurant 20), the nitric acid and ethanol may be mixed while in contact with an igniter (or catalyst) 142, thus combusting the two into hot, high-pressure reaction gases that serve as high-pressure gas 136. Preferably, the nitric acid and ethanol are mixed slowly enough that the resulting heat may be dissipated by convection or radiation from the walls of the pressurized gas tank 100, and the resulting high-pressure gas 136 is relatively cool. Igniter/catalyst 142 may, e.g., be an electrical resistor or a pyrotechnic igniter, or a catalyzing substance. Many other alternative means for creating the high-pressure gas 136 will be apparent to one skilled in the art. For example, pressurized gas tank 100 may be filled with hydrogen peroxide; when it is time to pressurize the gas generator system, the catalyst 142 may be used to catalyze hydrogen peroxide into steam and high-pressure oxygen. The steam may be condensed by letting it cool off, with the resulting high-pressure gas 136 consisting primarily of high-pressure oxygen. As another example, a stable, decomposable compound, such as TNT, may be deflagrated (not detonated) inside the pressurized gas tank 100 using the igniter/catalyst 142, resulting in product gases that serve as the high-pressure gas 136. The pressurized gas tank 100, the fuel tank 102, and the oxidizer tank 104 should each have a wall thickness sufficient to withstand the very high pressure of the high-pressure gas 136. Further, the fuel and oxidizer used to generate the high-pressure gas 136 (if such are used) may be the same as the fuel 138 and oxidizer 140 used to generate the pressurant 20, which may be the same as the fuel 78 and oxidizer 80 shown in FIG. 19. Alternatively, there may only be a single tank 138, 140 in the case of a decomposable monopropellant, such as hydrogen peroxide.

Reference number 106 may designate either a valve or a pressure regulator or both. For example, 106 may simply be a valve having two positions (open and close). In such an embodiment, after the tank 100 is pressurized with high-pressure gas 136, the valves 106 (between tank 100 and tanks 102, 104) may be opened to pressurize the fuel tank 102 and oxidizer tank 104 with the high-pressure gas 136, thus placing a pressure force on fuel 138 and oxidizer 140. If the valves 106 between the tanks 138, 140 and pressurant tank 18 are then opened, the fuel 138 and oxidizer 140 will flow in the direction of the pressurant tank 18. The fuel 138 and oxidizer 140 will then mix at a point of intersection, where the mixture comes into contact with an igniter/catalyst 108, which serves to combust the mixture. The resulting combustion gases are plumbed to the pressurant tank 18 as pressurant 20. In this embodiment, the pressurant 20 in the pressurant tank 18 is approximately in pressure equilibrium with the fuel 138, oxidizer 140, and high-pressure gas 136 (neglecting pressure differentials due to flow, which is relatively slow); thus, the pressure of pressurant 20 is approximately equal to or slightly less than the pressure of high-pressure gas 136. This is because the flow rate from tanks 102, 104 to pressurant tank 18 depends on the pressure differential between the tanks. When the pressure in pressurant tank 18 is slightly lower than in the tanks 102, 104, fuel 138 and oxidizer 140 flow from their respective tanks 102, 104 past igniter/catalyst 108, where they combust to create more pressurant 20, thus increasing the pressure in pressurant tank 18. The flow from tanks 102, 104 effectively stops when the pressures in tanks 102, 104 and pressurant tank 18 are equal. A benefit to this embodiment is that the pressurant 20 is always at its maximum possible pressure; a detriment is that the pressure of the pressurant 20 will vary (decrease) with the decrease in pressure of the high-pressure gas 136, which results from the expansion of high-pressure gas 136 into fuel tank 138 and oxidizer tank 140.

In another embodiment, valves 106 may be adjustable (i.e., closed, 10% open, 50% open, etc.) according to a desired flow rate of fuel 138 and oxidizer 140, or a desired pressure of pressurant 20. For example, the valves 106 may be adjusted by a controller which opens and closes the valves 106 based on feedback information received from a pressure sensor 144 (to be discussed later with respect to FIG. 20b). If the pressure of pressurant 20 is too high during operation of the rocket engine system, as determined by a sensor 144, the valves 106 between tank 100 and tanks 102, 104 (alternatively, the valves 106 between tanks 102, 104 and pressurant tank 18, or both sets of valves 106) may be slightly closed (e.g., closed from 50% open to 40% open) to reduce the flow of fuel 138 and oxidizer 140, thus reducing the rate of generation of pressurant 20 in pressurant tank 18.

In another embodiment, the valves 106 between tank 100 and tanks 102, 104 (alternatively, the valves 106 between tanks 102, 104 and pressurant tank 18, or both sets of valves 106) may be pressure regulators, designed to adjust flow rate based on a desired pressure. For example, high-pressure gas 136 may have a pressure of 100,000 PSI and the regulators 106 between tank 100 and tanks 102, 104 may be designed to regulate the pressure inside tanks 102, 104 to 50,000 PSI. Then, the pressure inside tanks 102, 104 will stay approximately constant (thus resulting in an approximately constant pressure of pressurant 20) for as long as the pressure of high-pressure gas 136 exceeds 50,000 PSI. In this embodiment, the pressurant 20 is in approximate equilibrium with the fuel 138 and oxidizer 140; therefore, the pressure of the pressurant 20 remains approximately 50,000 PSI (neglecting pressure differentials due to flow).

In another embodiment, heat transfer devices 110, 112 are arranged between the igniter/catalyst 108 and the propellant 12 for cooling off the pressurant 20 immediately after it is formed by combustion of the fuel 138 and oxidizer 140. Device 110 may be conduit for transferring the pressurant 20 to and from a heat transfer coil 112 inside the propellant tank 10, thus transferring the heat of combustion of the fuel 138 and oxidizer 140 to the propellant 12 (which may help to further pressurize the propellant 12, if necessary). Alternatively, devices 110, 112 may simply be fins or other heat exchange devices for cooling off the pressurant 20. Alternatively, the gas generating system may be arranged inside the propellant tank 10, so that the pressurant 20 is cooled immediately after it is formed by combustion of the fuel 138 and oxidizer 140.

Figure 20B:
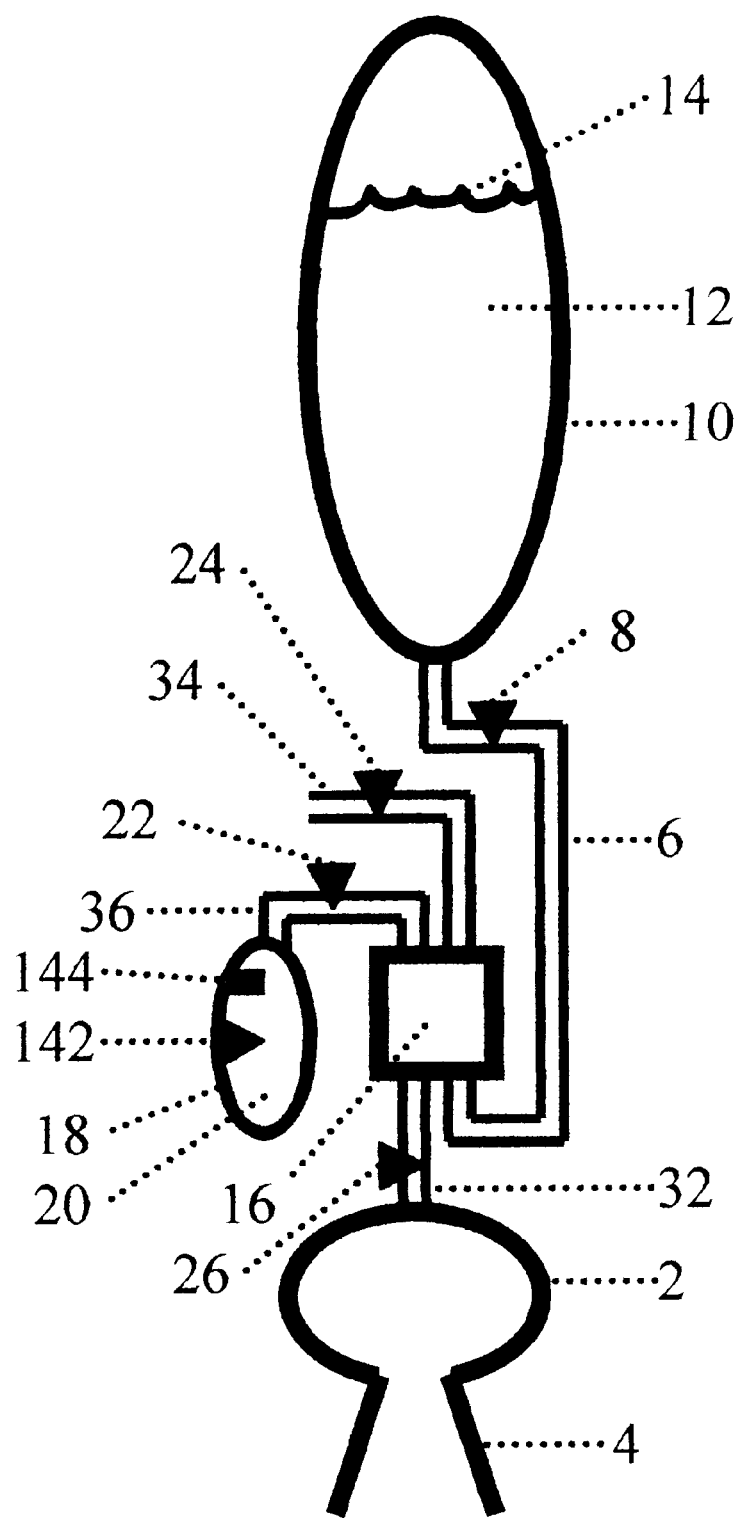
FIG. 20b shows a schematic view of a rocket engine according to another preferred embodiment employing a gas generator for the pressurant.

Referring now to FIG. 20b, tanks 100, 102, and 104 may be omitted entirely if a controlled combustion or decomposition, spread out in time over the expected burn time of the rocket engine 4, can be made to occur inside the pressurant tank 18, as discussed previously with regard to pressurized gas tank 100. For example, pressurant tank 18 may include an igniter/catalyst 142 and a pressure sensor 144 configured to control the igniter/catalyst (via a controller, for example). The pressurant tank 18 may be filled with a decomposable monopropellant, or a separated mixture of a fuel and oxidizer, or the like. The gas generator system may then be programmed to control the igniter/catalyst 142 in response to pressure signals from the sensor 144 so that the pressure of the pressurant 20 inside pressurant tank 18 remains constant (or at a desired pressure). For example, in a pressurant tank 18 containing hydrogen peroxide, the igniter/catalyst 142 may be controlled to catalyze the hydrogen peroxide (to form pressurant 20) at a rate such that the sensor 144 measures a pressure of 50,000 PSI. A benefit to such an embodiment is its simplicity and that the pressure of pressurant 20 is readily adjustable (by controlling the igniter/catalyst 142 as a function of the pressure measured by the sensor 144).

Figure 21:
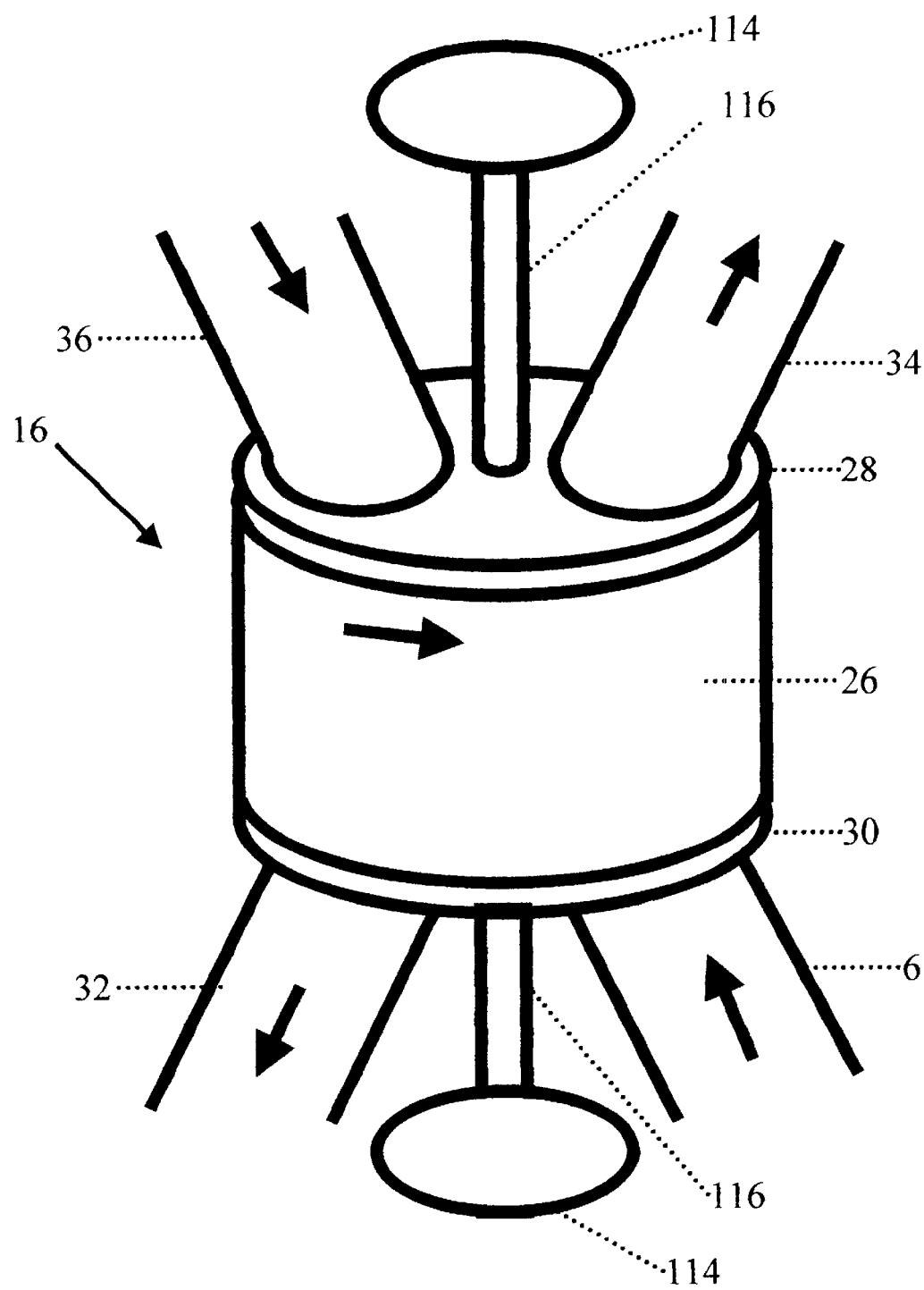
FIG. 21 shows a perspective view of a pressurizer according to the present invention having lubricant injectors.

Referring now to FIG. 21, the pressurizer 16 may also include a lubricant source 114 and a lubricant injector 116, one pair for each of the top chamber separator 28 and the bottom chamber separator 30. As discussed with regard to a previous embodiment, there are preferably seals between the spindle 26 and the top and bottom chamber separators 28, 30 (e.g., a dry seal such as a layer of Teflon). However, such a seal may not be able to entirely prevent leakage of propellant 12 and/or pressurant 20 from the pressurizer 16, particularly when the pressurant 20 has a very high pressure, like 50,000 PSI. To further reduce or eliminate leakage, a fluid lubricant (e.g., oil) may be pumped from lubricant source 114 to the space between the spindle 26 and the top chamber separator 28 (alternatively to the space between the spindle 26 and the bottom chamber separator 30) via the lubricant injector 116. Because the lubricant is fluid, it is better able to fill small gaps and other potential leakage paths, thereby reducing leakage. The lubricant may be pushed into the appropriate space using either a pump or pressurized gas, as would be apparent to one skilled in the art. Preferably, the lubricant is chemically nonreactive with the propellant 12 and the pressurant 20. As another alternative, the pressurizer 16 could be configured to allow an acceptable, controlled rate of leakage. In such an embodiment, the pressurizer 16 may include some kind of leaked propellant 12 recovery system (not shown in the drawings), such as a shroud or container around the pressurizer 16 configured to collect the leaked propellant 12 and (optionally) to feed the leaked propellant 12 back into the propellant tank 10 and/or pressurizer 16.

Figure 22A:
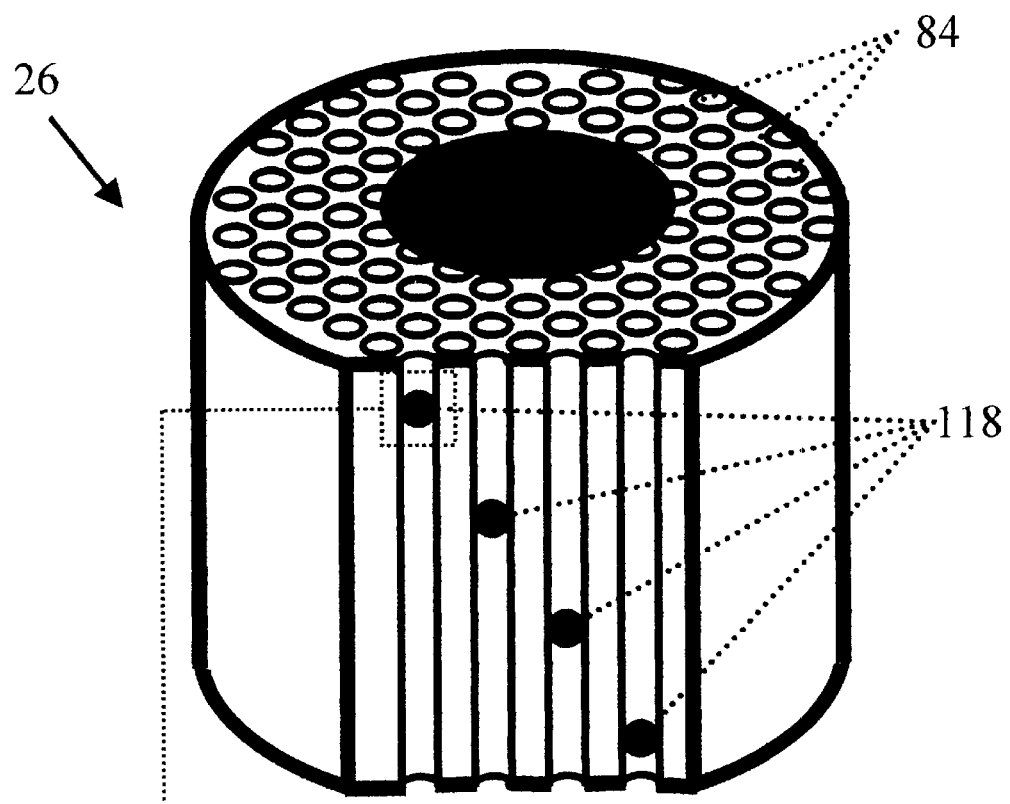
FIG. 22a shows a cut-away perspective view along section B—B of the pressurizer shown in FIG. 16 having a spherical ball in each transfer chamber.
Figure 22B:
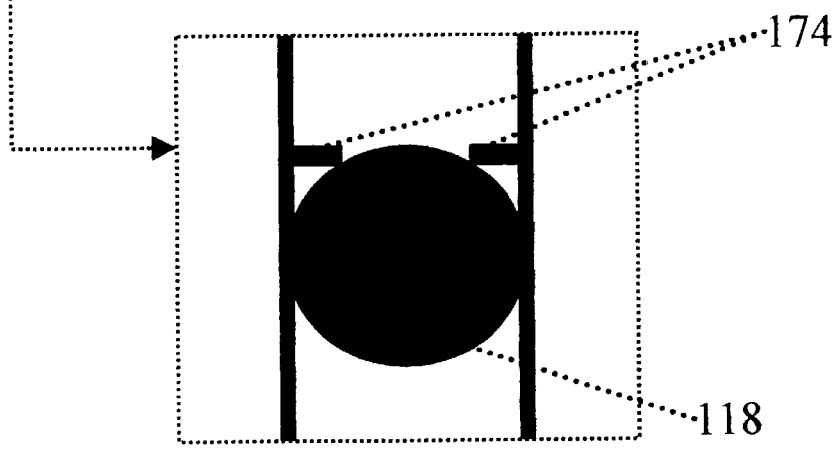

Referring now to FIG. 22a, the pistons 72 shown in FIG. 15 may be ball bearings (or approximately spherical balls) 118. A bearing 118 in use as shown in FIG. 22a is a special kind of piston 72. An advantage to using ball bearings 118 in place of pistons 72 is greater simplicity and reduced cost, because ball bearings 118 are very inexpensive. Further, because they are spherical, their rotational orientation need not remain constant about any axis (whereas a piston 72 must maintain its rotational orientation about a lengthwise axis of its corresponding transfer chamber 84). The ball bearings 118 may be made of stainless steel or a ceramic or other strong material, and have a diameter approximately equal to a diameter of transfer chambers 84, so that each bearing 118 snugly fits into its corresponding transfer chamber 84 to substantially prevent leakage from an upper portion of the transfer chamber 84 to a lower portion of the transfer chamber 84 (and vice versa). Further, each bearing 118 may be coated with a sealing substance, such as rubber, plastic, or Teflon, to further improve leak resistance around the bearing 118. Further, as shown in FIG. 22b, each transfer chamber 84 may include an upper limiter 174 and a lower limiter (not shown in the drawings) configured to contain the bearing 118 inside the transfer chamber 84. For example, the top and bottom of each transfer chamber 84 may have a ring-shaped protrusion from an inner surface of the transfer chamber 84, allowing fluid to pass through but preventing the bearing 118 from passing through. A similar type limiter 174 may be used for any other embodiment discussed in this application, such as to limit the axial motion of the pistons 72 shown in FIG. 15.

FIG. 22a shows a cross sectional view showing four transfer chambers 84 and their corresponding bearings 118. Like the four transfer chambers 42 shown in FIG. 15, the four transfer chambers 84 shown in FIG. 22a show four different states of draining of the transfer chambers 84. In other words, assuming that the spindle 26 is rotating counterclockwise as seen from the top, the far right transfer chamber 84 is completely or almost completely drained of propellant 20, as shown by the low position of bearing 118. Moving leftward, each transfer chamber 84 is less drained. The transfer chamber 84 on the far left is completely full, as its bearing 118 is positioned at the top and in direct contact with the upper limiter 174, as shown in FIG. 22b.

Figure 23:
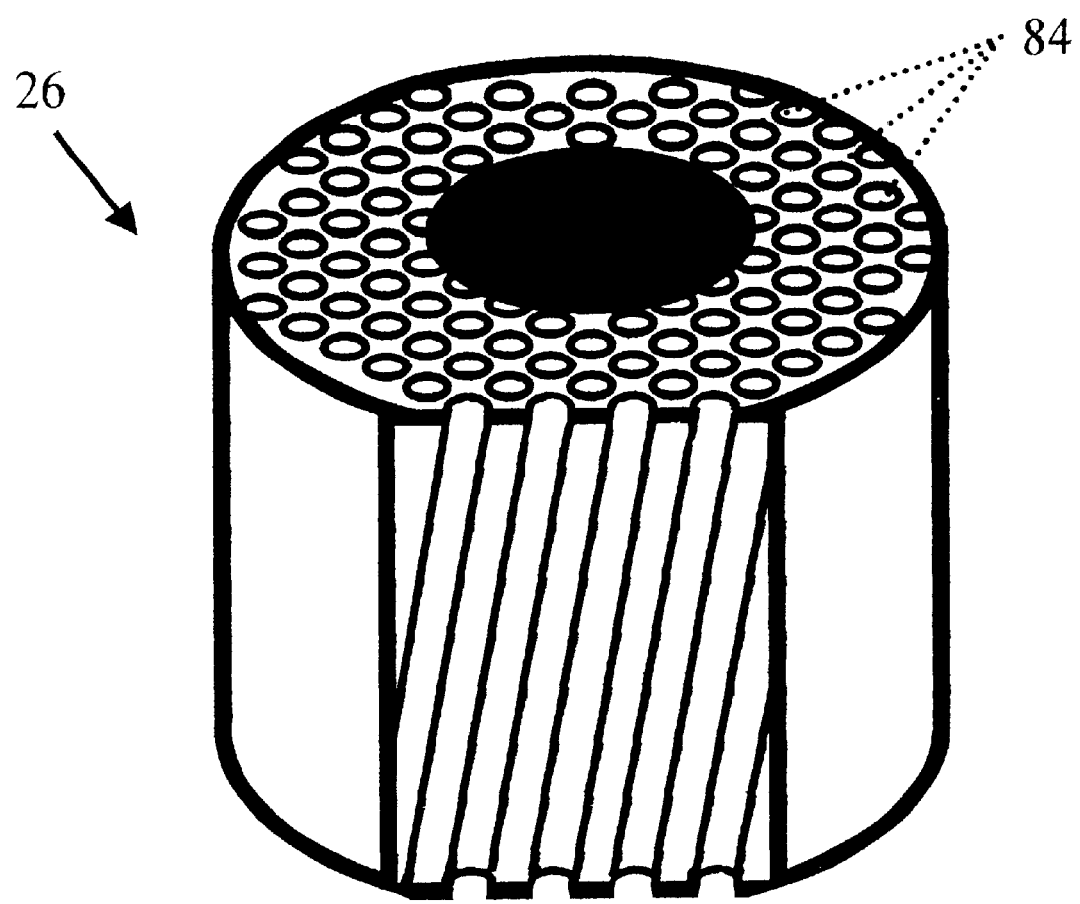
FIG. 23 shows a cut-away perspective view along section B—B of the pressurizer shown in FIG. 16 having slanted transfer chambers.

Referring now to FIG. 23, transfer chambers 84 may be slanted with respect to a lengthwise or center axis of the spindle 26. This embodiment has an advantage that, when the propellant 12 is pushed into the engine 2 upon the force of the pressurant 20, a horizontal component of the propellant's trajectory provides an impulse reaction force to the spindle 26 in a direction opposite the propellant's trajectory, thus spinning the spindle 26. As shown in FIG. 23, when propellant 12 is pushed downward by the pressurant 20, the propellant flow induces a counterclockwise rotation of the spindle 26 as seen from the top. Such an embodiment may be used by itself or in conjunction with one or more of the other means of rotating the spindle 26, as disclosed herein (such as those disclosed in FIGS. 7–9).

Figure 24:
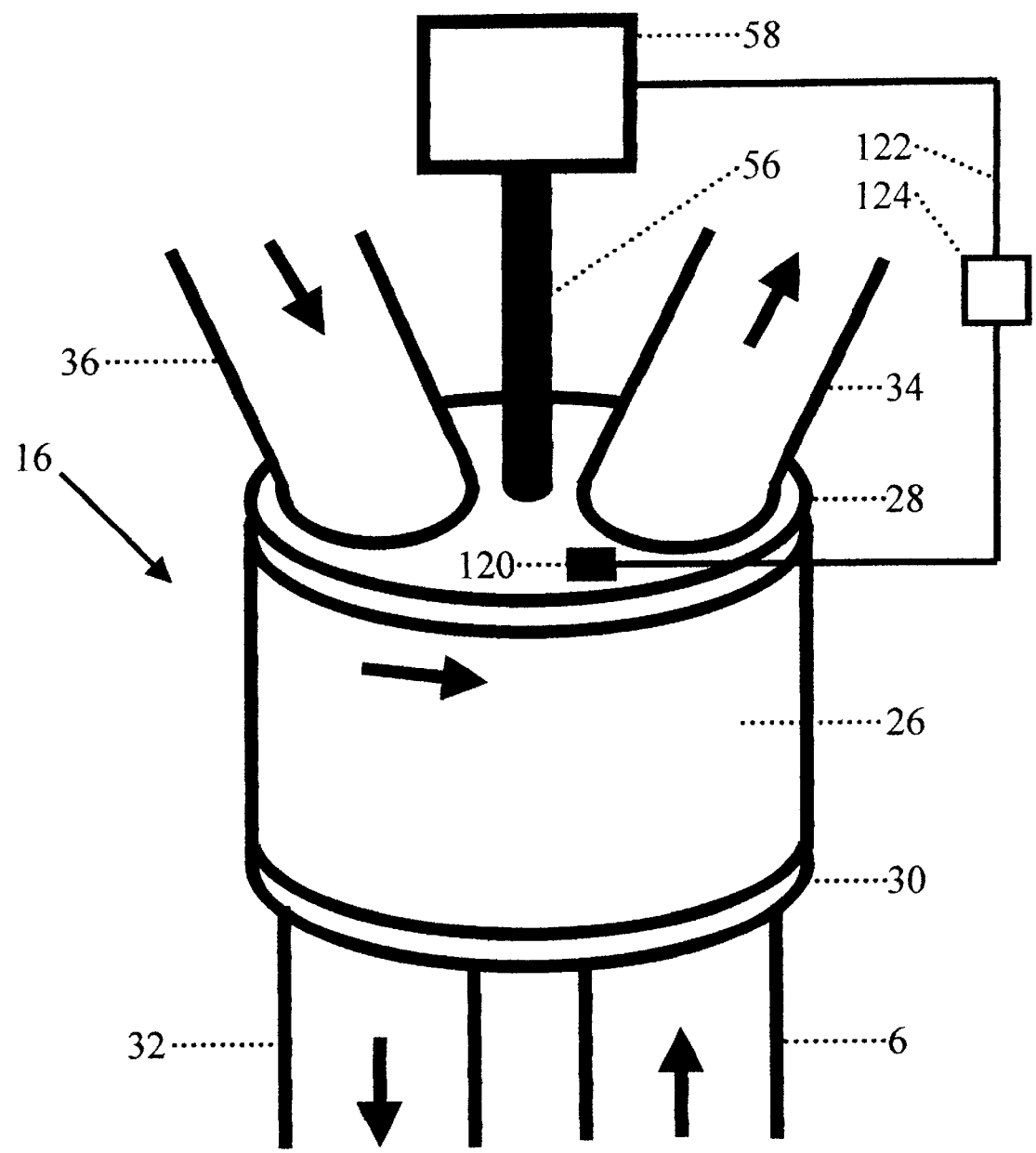
FIG. 24 shows a perspective view of the pressurizer shown in FIG. 7 having a sensor and controller for the motor.

Referring now to FIG. 24, the pressurizer 16 may include a depth sensor 120, a controller 124, and a signal connection 122 between the sensor 120, the controller 124, and the motor 58. In this embodiment, the rotation speed of the spindle 26, as imparted by the motor 58, depends at least in part on a depth of the propellant 12 remaining in a transfer chamber 42 (or 84), as measured by sensor 120. For an example of "depth," refer to FIG. 22a, in which the propellant 12 in the far right transfer chamber 84 has a very low depth and the propellant 12 in the far left transfer chamber 84 has a very high depth. Referring back to FIG. 24, if the depth of the transfer chamber 84 directly below (and sensed by) sensor 120 is too high, it may indicate that each transfer chamber 84 is not exposed to the engine conduit 32 long enough to sufficiently drain the propellant 12 in the transfer chamber 84 into the engine 2. Therefore, in such a case, the controller 124 may be programmed to reduce the rotation speed of the spindle 26. Conversely, if the depth of the transfer chamber 84 directly below (and sensed by) sensor 120 is too low, it may indicate that each transfer chamber 84 is exposed to the engine conduit 32 for too long, indicating that the rotation speed of the spindle 26 is too slow. Therefore, in such a case, the controller 124 may be programmed to increase the rotation speed of the spindle 26. The sensor 120 may be, e.g., a SONAR- or RADAR-based depth sensor. Other means of sensing the depth of a transfer chamber 42, 84 will be apparent to one skilled in the art. Further, the sensor 120 may be designed to sense the depth of every transfer chamber 84 that passes below the sensor 120, or the sensor 120 may only sense the depth of a small fraction of transfer chambers 42, 84. For example, because the depth of the propellant 12 in each transfer chamber 42, 84 at a particular point in the rotation cycle is unlikely to change much during a small number of rotations of the spindle 26 (particularly during a steady-state operation of the pressurizer 16), the sensor 120 may need to sense the depth of a single transfer chamber 42, 84 only once in, say, 10 rotations of the spindle 26. The controller 124 may be a mechanical controller, an electric controller, or a computer, or any other device capable of adjusting a speed of the motor 58 based on information received from the sensor 120.

Figure 25:
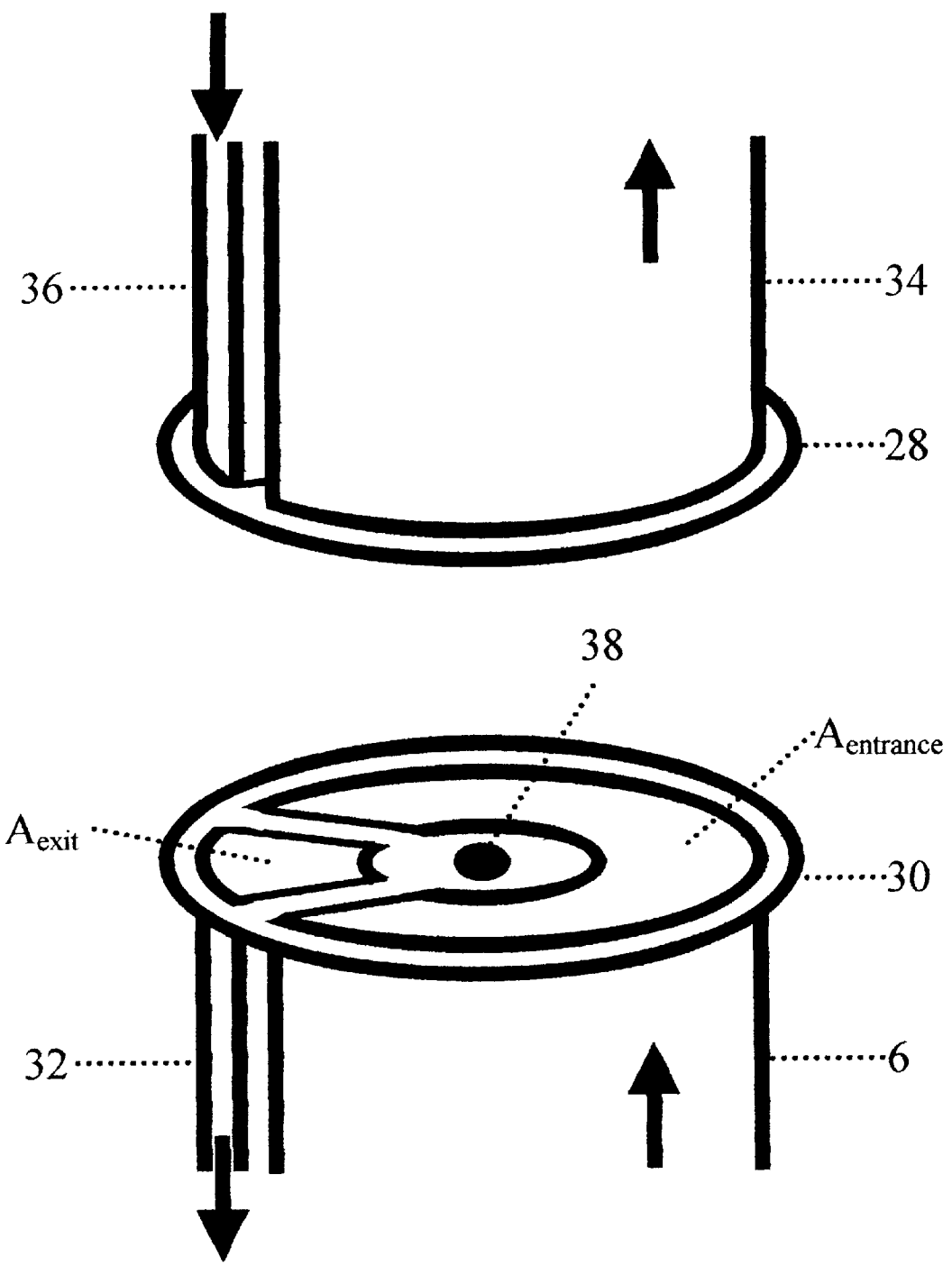
FIG. 25 shows a perspective view of a pressurizer according to another preferred embodiment without the spindle.

Referring now to FIG. 25, the holes 52, 54 in top and bottom chamber separators 28, 30 shown in FIGS. 6a and 6b may be modified to have different shapes and sizes. For example, the hole in the bottom chamber separator 30 through which propellant 12 flows into the transfer chambers 42, 84 from the propellant tank 10 may have an entrance area equal to $A_{entrance}$. Further, the hole in the bottom chamber separator 30 through which propellant 12 flows from the transfer chambers 42, 84 into the engine 2 may have an exit area equal to $A_{exit}$. According to a simplified fluid flow equation, the propellant flow rate from a point A to a point B will be approximately proportional to a square root of the pressure drop ($\Delta p$) between the points and the minimum cross sectional area of a conduit connecting those points. Therefore, the flow rate of propellant 12 into the transfer chambers 42, 84 from the propellant tank 10 ($Flow_{entrance}$) may be proportional to a product of sqrt ($\Delta p_{entrance}$) (i.e., a square root of $\Delta p_{entrance}$) and $A_{entrance}$, where $\Delta p_{entrance}$ is the pressure difference between propellant 12 (at the propellant's entrance via bottom chamber separator 30, which may be a sum of a weight head due to the propellant's weight in the propellant tank 10 and a pressure head due to a gas pressure inside the propellant tank 10) and the exhaust via exhaust conduit 34. For example, the propellant 12 may have a pressure at the propellant's entrance via bottom chamber separator 30 of 50 PSI, which may be due to a 40 PSI gas pressure inside the propellant tank 10 and a 10 PSI weight head due to the weight of the propellant 12. The exhaust conduit 34, if it exhausts to atmospheric pressure, may have a pressure of 0 PSI (i.e., 0 PSIG). Therefore, $\Delta p_{entrance}$ may be 50 PSI–0 PSI=50 PSI. Further, the flow rate of propellant 12 from the transfer chambers 42, 84 into the engine 2 ($Flow_{exit}$) may be proportional to a product of sqrt($\Delta p_{exit}$) and $A_{exit}$, where $\Delta p_{exit}$ is the pressure difference between pressurant 20 (at the pressurant's entrance via top chamber separator 28) and the combustion pressure inside the engine 2. For example, the pressurant 20 may have a pressure at the pressurant's entrance via top chamber separator 28 of 50,000 PSI and the engine 2 may have a combustion pressure of 30,000 PSI. Therefore, $\Delta p_{exit}$ may be 50,000 PSI–30,000 PSI=20,000 PSI. In a steady-state, normal operation of the pressurizer 16, ($Flow_{entrance}$)=($Flow_{exit}$), so sqrt($\Delta p_{entrance}$)*($A_{entrance}$)= sqrt($\Delta p_{exit}$)*($A_{exit}$), so ($A_{entrance}$)/($A_{exit}$)=sqrt($\Delta p_{exit}$)/sqrt ($\Delta p_{entrance}$). Because, in the above example, sqrt($\Delta p_{exit}$)/sqrt ($\Delta p_{entrance}$)=sqrt(20,000 PSI)/sqrt(50 PSI)=20, ($A_{entrance}$)/ ($A_{exit}$) should also be at least about 20 to ensure the most efficient, lightest, and least expensive design of the pressurizer 16.

FIG. 25 shows a bottom chamber separator 30 having an entrance hole with an area $A_{entrance}$ that is much larger than an area $A_{exit}$ of the exit hole. Because the flow rate of the propellant 12 from propellant tank 10 to the transfer chambers 42, 84 is proportional to the minimum cross sectional area between them, the propellant conduit 6 should (for the best design) have a minimum cross section area at least as large as $A_{entrance}$. Similarly, the engine conduit 32 should have a minimum cross section area at least as large as $A_{exit}$.

Figure 26A:
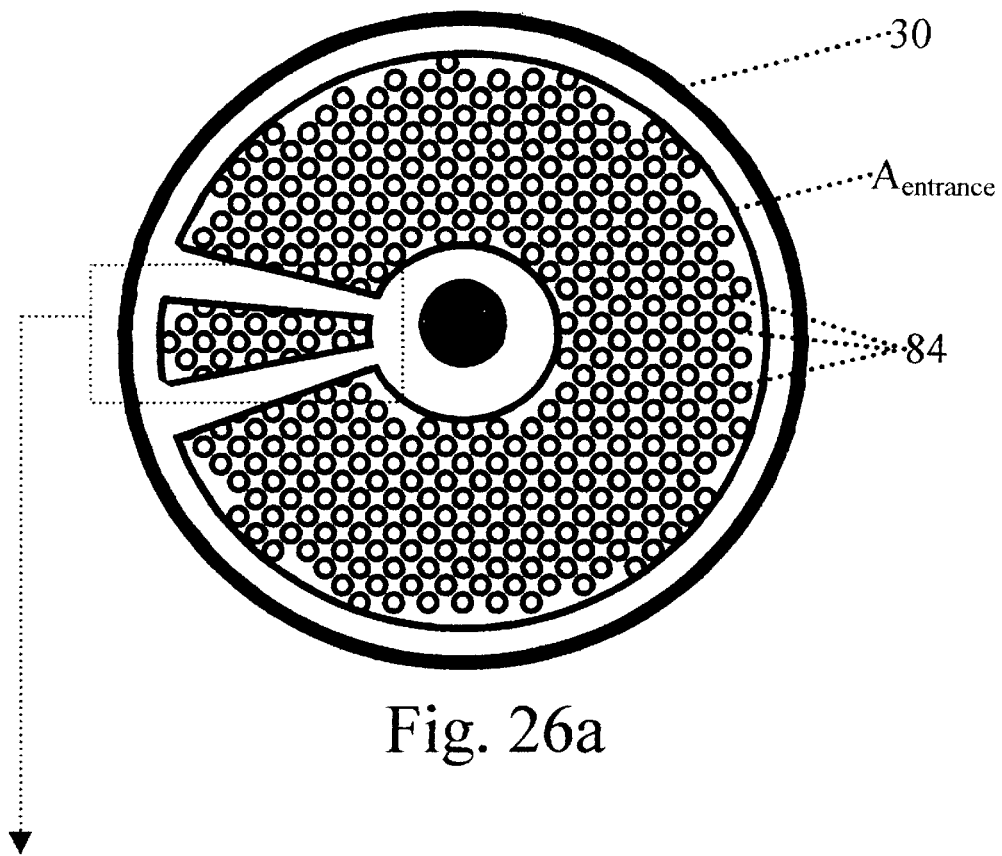
FIG. 26a shows a bottom view of the bottom chamber separator shown in FIG. 25, with the spindle shown in FIG. 16 above the bottom chamber separator, so that the spindle can only be seen through the holes in the bottom chamber separator.

FIG. 26a shows a bottom view of the bottom chamber separator 30 shown in FIG. 25, but with a spindle 26 shown in FIG. 16 on its other side, so that the spindle 26 can be seen through the holes ($A_{entrance}$, $A_{exit}$) in the bottom chamber separator 30. As in FIG. 25, the bottom chamber separator 30 shown in FIG. 26a has $A_{entrance}$>>$A_{exit}$, because (in the previously given example, as well as most industrial applications of the present invention) $\Delta p_{entrance}$<<$\Delta p_{exit}$. Needless to say, the holes defined by $A_{entrance}$ and $A_{exit}$ may be of any shape and size.

Figure 26B:
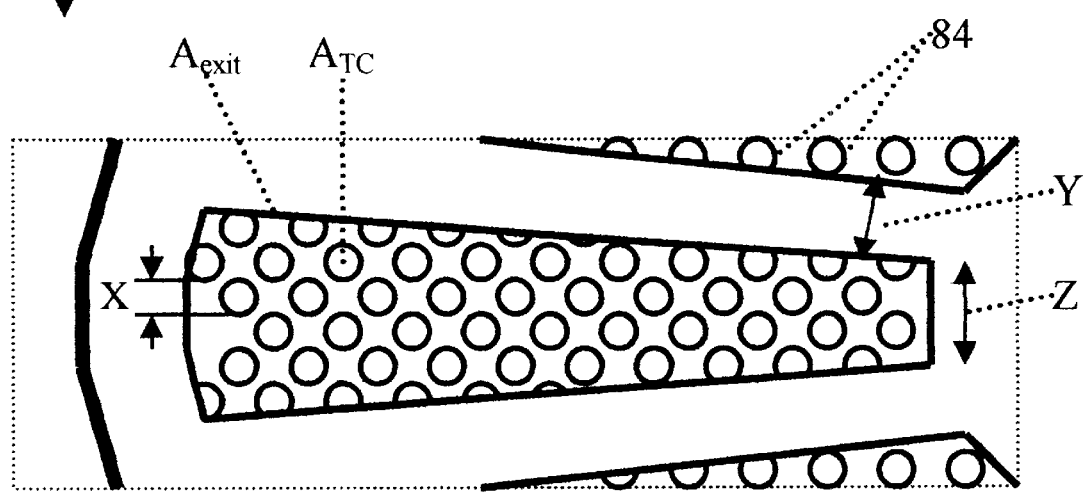

Referring now to FIG. 26b, a diameter of each of the holes 84 should be smaller than dimension Y, which may be a minimum distance between the filling region ($A_{entrance}$) and the draining region ($A_{exit}$) along a path taken by at least one transfer chamber 84. In FIG. 26b, the actual chamber separation function of each of the top and bottom chamber separators 28, 30 is performed by a reasonably small or thin region which is just large enough to separate transfer chambers 84 that are in the propellant filling region ($A_{entrance}$) from the transfer chambers 84 that are in the propellant draining region ($A_{exit}$). Therefore, to ensure that a single transfer chamber 84 cannot be exposed to both the filling and draining regions simultaneously, a dimension of the transfer chamber 84 along a direction of rotation of the spindle 26 (in the embodiment shown in FIG. 26b, such a dimension is simply the diameter of the transfer chamber 84 because the transfer chambers 84 are circular in cross section) should be less than the corresponding dimension Y of the chamber separating portion of each chamber separator 28, 30.

In FIG. 26b, a characteristic length Z along a direction of rotation of the spindle 26 should be greater (and, preferably, much greater) than a distance X (again, along a direction of rotation of the spindle 26) between corresponding points of adjacent transfer chambers 84. (Characteristic length Z may also be a maximum such length.) This feature ensures a continuous mass flow of propellant 12 from pressurizer 16 (as long as $\Delta p_{exit}$ is not so great as to completely drain a given transfer chamber 84 in the time it takes that transfer chamber 84 to move a distance X), because even if some transfer chambers 84 have completely drained before leaving the draining region defined by $A_{exit}$, there are many more transfer chambers 84 available within the draining region that are not yet completely drained. For example, X<Z/2 or X<Z/10. Also, in a preferred embodiment, distance X is less than a dimension of each transfer chamber 84 along a direction of rotation of the spindle 26 (in the embodiment shown in FIG. 26b, such a dimension is simply the diameter of the transfer chamber 84). In another preferred embodiment, the cross sectional area $A_{TC}$ of each transfer chamber 84 is much smaller than $A_{exit}$. For example, $A_{TC}$<$A_{exit}$/100.

Figure 36A:
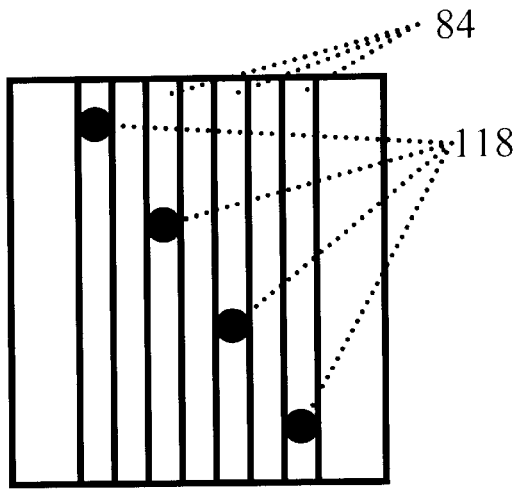
FIGS. 36a–c show a front portion of the cross sectional view of the spindle as shown in FIG. 22a, each drawing showing a different positional relationship of the bearings.
Figure 36B:
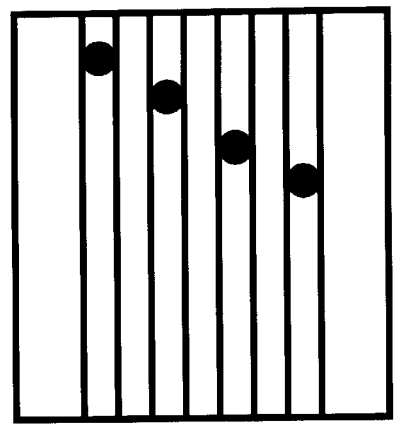
Figure 36C:
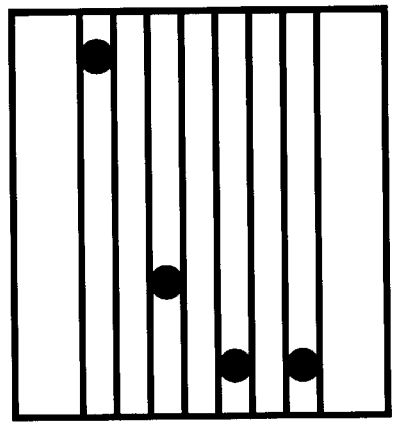

A benefit of this embodiment is shown with reference to FIGS. 36a–c and FIG. 37. FIGS. 36a–c show relative positions of bearings 118 inside transfer chambers 84 that are currently within the draining region defined by $A_{exit}$, where the transfer chamber 84 on the far left has just entered the draining region and the transfer chamber 84 on the far right is just about to leave the draining region. FIG. 36a shows the relative positions of bearings 118 in a preferred, steady-state operation of the pressurizer 16, where ($\Delta p_{exit}$)= ($\Delta p_{entrance}$)*($A_{entrance}$)²/($A_{exit}$)². FIG. 36b shows the relative positions of bearings 118 in a steady-state operation of the pressurizer 16 where ($\Delta p_{exit}$)<($\Delta p_{entrance}$)*($A_{entrance}$)²/ ($A_{exit}$)². In this operation, because $\Delta p_{exit}$ is too low to provide sufficient force to push out all of the propellant 12 that has been filled in the filling region (defined by $A_{entrance}$) of the pressurizer 16, the transfer chambers 84 do not fully drain in the draining region defined by $A_{exit}$. A pressurizer 16 designed to produce the relative bearing positions shown in FIG. 36b during normal, steady-state operation will work; however, it may not be as efficient regarding weight, cost, and energy dissipation (e.g., the energy required to rotate the spindle 26 against the resisting force of friction due to a seal between the spindle 26 and the top and bottom chamber separators 28, 30). FIG. 36c shows the relative positions of bearings 118 in a steady-state operation of the pressurizer 16 where $(\Delta p_{exit}) > (\Delta p_{entrance})*(A_{entrance})^2/(A_{exit})^2$. In this operation, because $\Delta p_{exit}$ is too high, each transfer chamber 84 completely drains in the draining region long before leaving the draining region. Nevertheless, even in the operation shown in FIG. 36c, the pressurizer 16 will provide a continuous, non-intermittent propellant flow to the engine 2 because, even though the two transfer chambers 84 on the right are completely drained, the two transfer chambers 84 on the left are not. Again, a pressurizer 16 designed to produce the relative bearing positions shown in FIG. 36c during normal, steady-state operation will work; however, it may not be as efficient regarding weight, cost, and energy dissipation. However, it may be advantageous for a pressurizer 16, whose normal, steady-state operation is shown in FIG. 36a, to be able to operate as shown in FIGS. 36b and 36c. For example, such a pressurizer 16 may be able to provide an adjustable propellant mass flow and/or an adjustable combustion chamber pressure in the engine 2, by adjusting one or more of the pressure of the pressurant 20, the pressure inside the propellant tank 10, and the rotation speed of the spindle 26.

Figure 37:
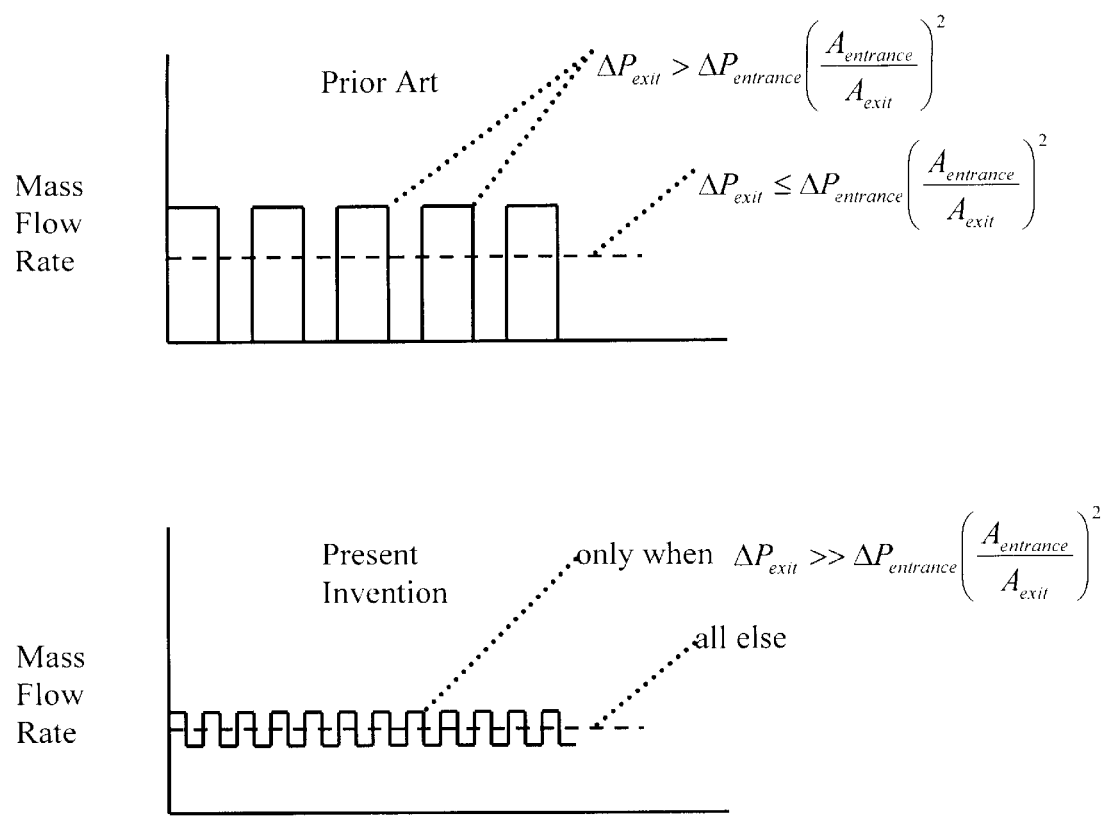
FIG. 37 shows a plot comparison of the mass flow rates as generated by a device according to the prior art and as generated by a device according to the present invention.

FIG. 37 shows a plot comparison of the mass flow rates provided by the prior art (e.g., Lanning) and the present invention. In both the prior art and the present invention, the mass flow rate may be constant and/or continuous when $(\Delta p_{exit}) \leq (\Delta p_{entrance})*(A_{entrance})^2/(A_{exit})^2$. (In Lanning, e.g., another limiting factor is the maximum reliable open-close speed of the valves, among other limiting factors.) However, once $(\Delta p_{exit}) > (\Delta p_{entrance})*(A_{entrance})^2/(A_{exit})^2$, each tank 1, 2, 3 (as in Lanning) or accumulator 26, 28, 30, 32 (as in Sobey) is completely drained faster than it can be filled, thereby resulting in a gap of time in each cycle in which either nothing at all flows to the engine or else the high-pressure gas/pressurant flows to the engine, both of which are devastating consequences. Thus, the propellant flow in the devices of the prior art under these conditions is intermittent and widely varying. In sharp contrast, in the present invention, once $(\Delta p_{exit}) > (\Delta p_{entrance})*(A_{entrance})^2/(A_{exit})^2$, only some of the transfer chambers 84 exposed to the draining region at any given time are fully drained, leaving other transfer chambers 84 that are still available for draining, thus ensuring a continuous propellant flow. Further, if X is significantly less than Z, such as X<Z/5 or X<Z/10, the effect of a single transfer chamber 84 draining prematurely (i.e., before leaving the draining region defined by $A_{exit}$) is minimized, so that the propellant flow remains constant or almost constant. In such an embodiment, the propellant flow may vary (albeit remain continuous) even when $(\Delta p_{exit}) >> (\Delta p_{entrance})*(A_{entrance})^2/(A_{exit})^2$.

In other words, in both the present invention and the prior art, the maximum possible continuous (or average) propellant flow rate in a steady-state operation is limited (at least) by the minimum of $\sqrt{(\Delta p_{exit})}*(A_{exit})$ and $\sqrt{(\Delta p_{entrance})}*(A_{entrance})$. However, in the prior art, when $(\Delta p_{exit}) > (\Delta p_{entrance})*(A_{entrance})^2/(A_{exit})^2$, the mass flow rate will be noncontinuous, intermittent, and widely varying as the propellant flow effectively turns on and off successively. In sharp contrast, in the present invention, when $(\Delta p_{exit}) > (\Delta p_{entrance})*(A_{entrance})^2/(A_{exit})^2$, the propellant flow can remain continuous. In fact, depending on the relationship between X and Z (as in FIG. 26b), such as if X<Z/10, the propellant flow rate may remain almost constant even when $(\Delta p_{exit}) > (\Delta p_{entrance})*(A_{entrance})^2/(A_{exit})^2$, and may vary (albeit remain continuous) only when $(\Delta p_{exit})$ is much greater than $(>>) (\Delta p_{entrance})*(A_{entrance})^2/(A_{exit})^2$.

Figure 27A:
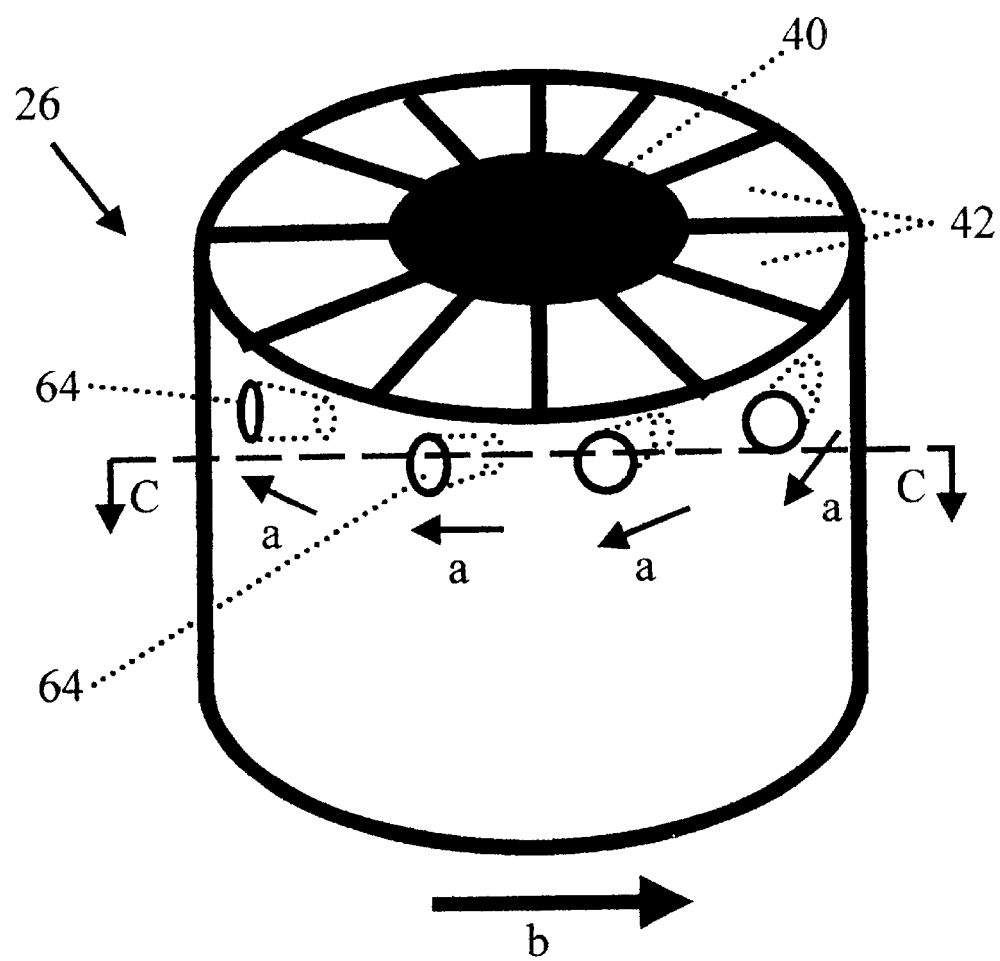
FIG. 27a shows a perspective view of a spindle according to another preferred embodiment.
Figure 27B:
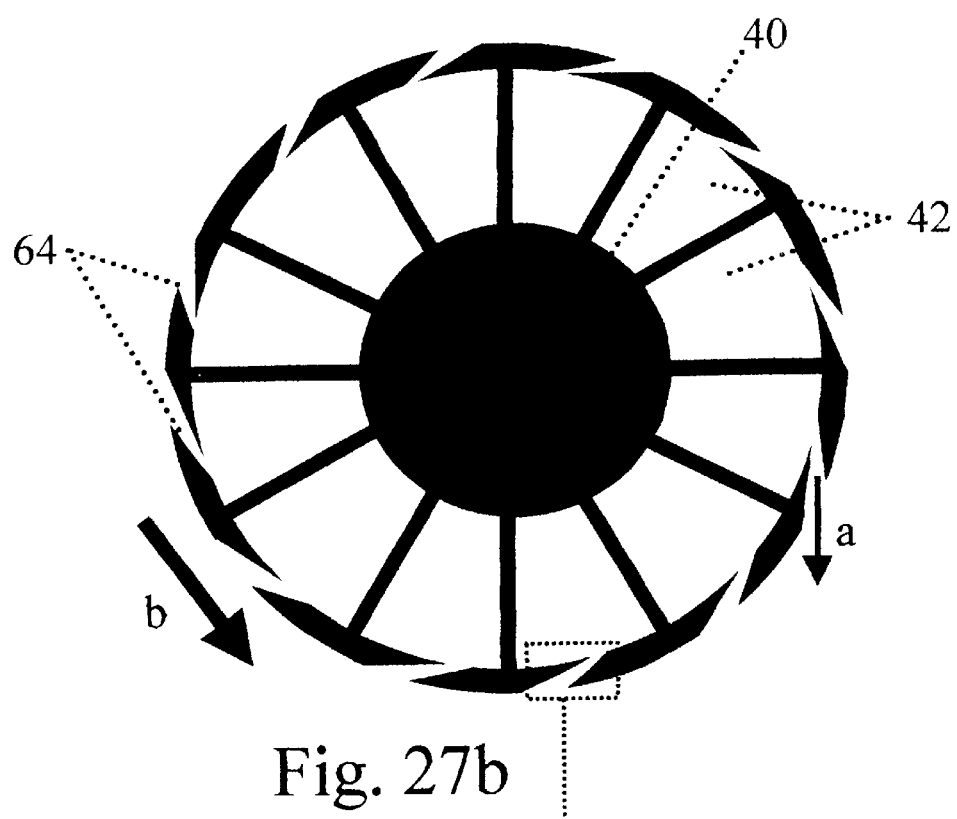
Figure 27C:
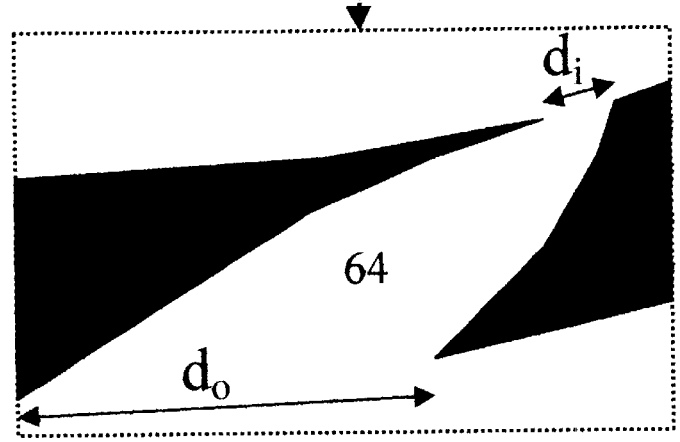
FIG. 27c shows an enlargement of the corresponding region depicted in FIG. 27b.

Referring now to FIGS. 27a–c, another embodiment of the present invention is similar to the embodiment shown in FIGS. 8 and 9, in that an impulse reaction force due to the expulsion of high pressure gas from the transfer chambers 42 spins the spindle 26. A difference is that in FIGS. 27a–c, no spindle housing 62 is required, because spindle jet holes 64 are always open to the outside. Because they are always open, in order to ensure expulsion of only pressurant 20 from the jet holes 64 (and thereby prevent expulsion of propellant 12 from the jet holes 64), the jet holes 64 are preferably at or near the top of the spindle 26. In fact, the top surface of the spindle 26 could be grooved in such a way that a bottom portion of each jet hole 64 is defined by the top surface of the spindle 26 and a top portion of each jet hole 64 is defined by a bottom surface of the top chamber separator 28 (when the spindle 26 is assembled with the top chamber separator 28). Preferably, the jet holes 64 are located above a maximum propellant fluid level to insure that no propellant 12 is expelled through the jet holes 64. For example, a jet hole 64 may be located above the upper limiter 174 as shown in FIG. 22b. As shown in FIG. 27a, as pressurant 20 is expelled from the jet holes 64 in the direction indicated by the arrows "a," the spindle rotates in the direction "b" due to the impulse reaction force of the expelled pressurant 20. The jet holes 64 preferably have a nozzle shape (such as an approximately parabolic cross section) having an inside end (closer to the center 40) with a smaller diameter $d_i$, and an outside end (further from the center 40) with a larger diameter $d_0$. Preferably, $d_i$ is small enough that only the minimum expulsion of pressurant 20 necessary for rotating the spindle 26 is achieved. Also, preferably, the ratio between $d_i$ and $d_0$ is such that the nozzle 64 expands the pressurant 20 so that the pressure of the pressurant 20 at the outer end of the nozzle 64 is at or near the ambient pressure. At least one jet hole 64 may appear in every transfer chamber 42, as shown, or only some transfer chambers 42.

Figure 27D:
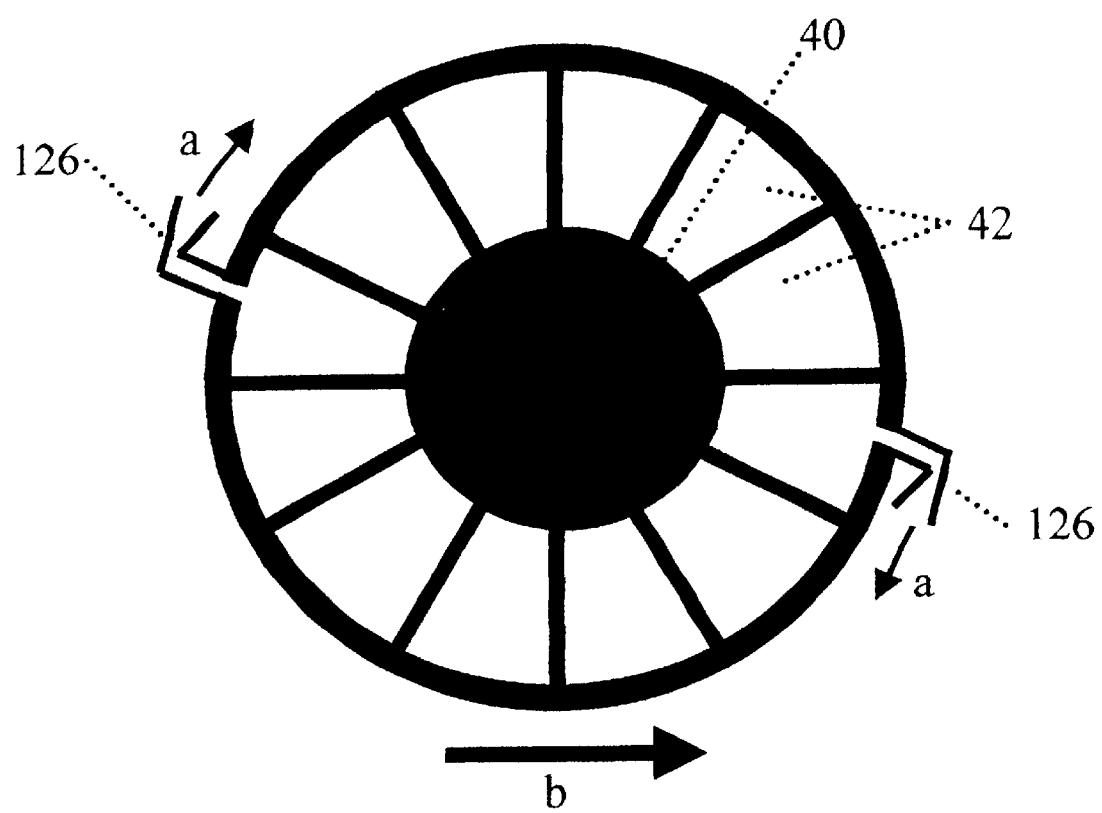
FIG. 27d shows a top cross-sectional view of a spindle according to another preferred embodiment.

FIG. 27d shows an alternative embodiment to the embodiment shown in FIGS. 27a–c. In FIG. 27d, jets 126 extend outward from the outer surface of the spindle 26 and their nozzles are aimed perfectly tangent to the outer surface of the spindle 26. Jets 126 expand the pressurant 20 in much the same way as jet holes 64, resulting in an exhaust whose expulsion causes an impulse reaction on the spindle 26, except that the resulting exhaust is directed almost perfectly tangent to the outer surface of the spindle 26 at the location of the jets 126. Of course, all or only some of the transfer chambers 42 may have such a jet 126.

Figure 27E:
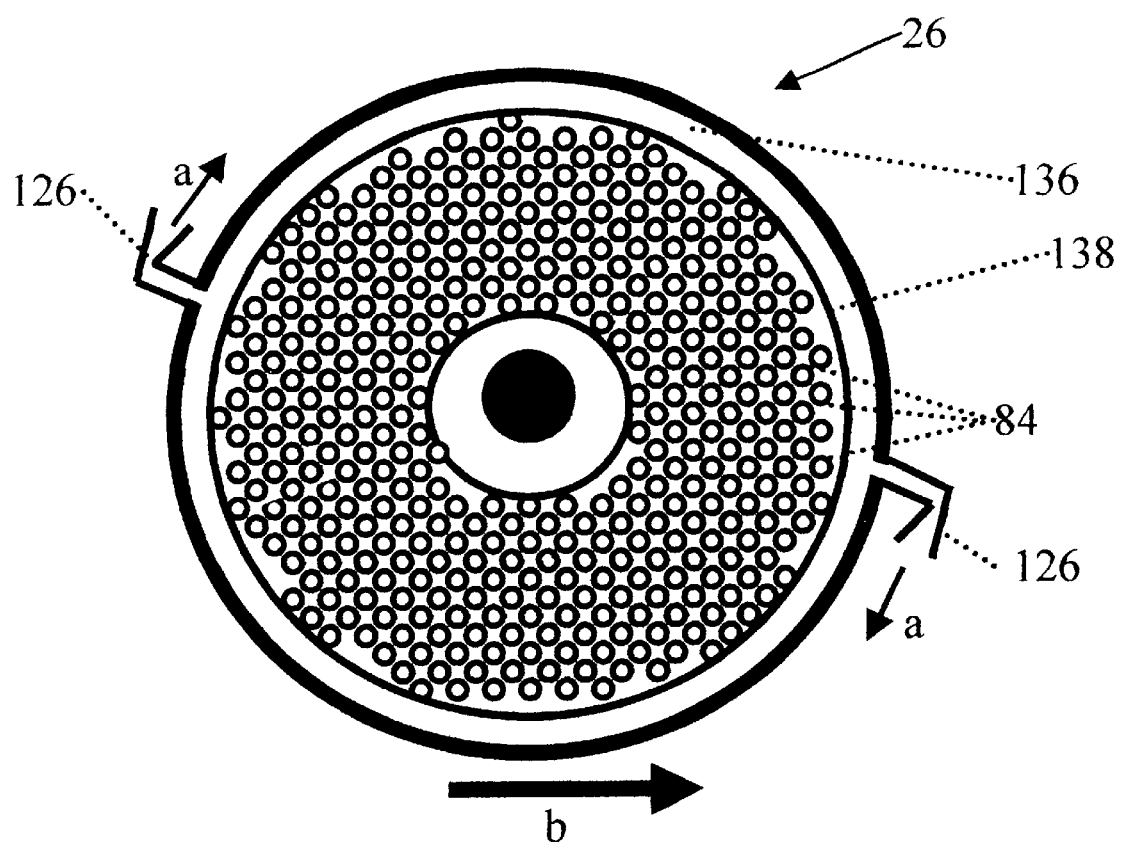
FIG. 27e shows a top cross-sectional view of a spindle according to another preferred embodiment.

FIG. 27e shows an alternative embodiment to the embodiment shown in FIGS. 27a–d. The spindle 26 includes an outer space 136 separated from an inner space having transfer chambers 84 by a barrier 138. In this embodiment, only the pressurant 20 that accumulates in the outer space 136 will be expelled through the jets 126. Therefore, the pressure inside each transfer chamber 84 may remain reasonably independent of the rate of expulsion of pressurant 20 from the jets 126. Further, if the top and bottom chamber separators 28, 30 are constructed so that a hole corresponding to the outer space 136 (to let in the pressurant 20) is separate from the hole corresponding to the inner space with the transfer chambers 84, and separately valved or regulated, then the pressure inside the outer space 136 can be independently regulated. Because the rotation speed of the spindle 26 depends on the exhaust mass flow rate and velocity from the jets 126, which depend on the pressure of pressurant 20 inside the outer space 136, the rotation speed of the spindle 26 may be controlled by controlling the fluid flow of pressurant 20 into the outer space 136.

Figure 28:
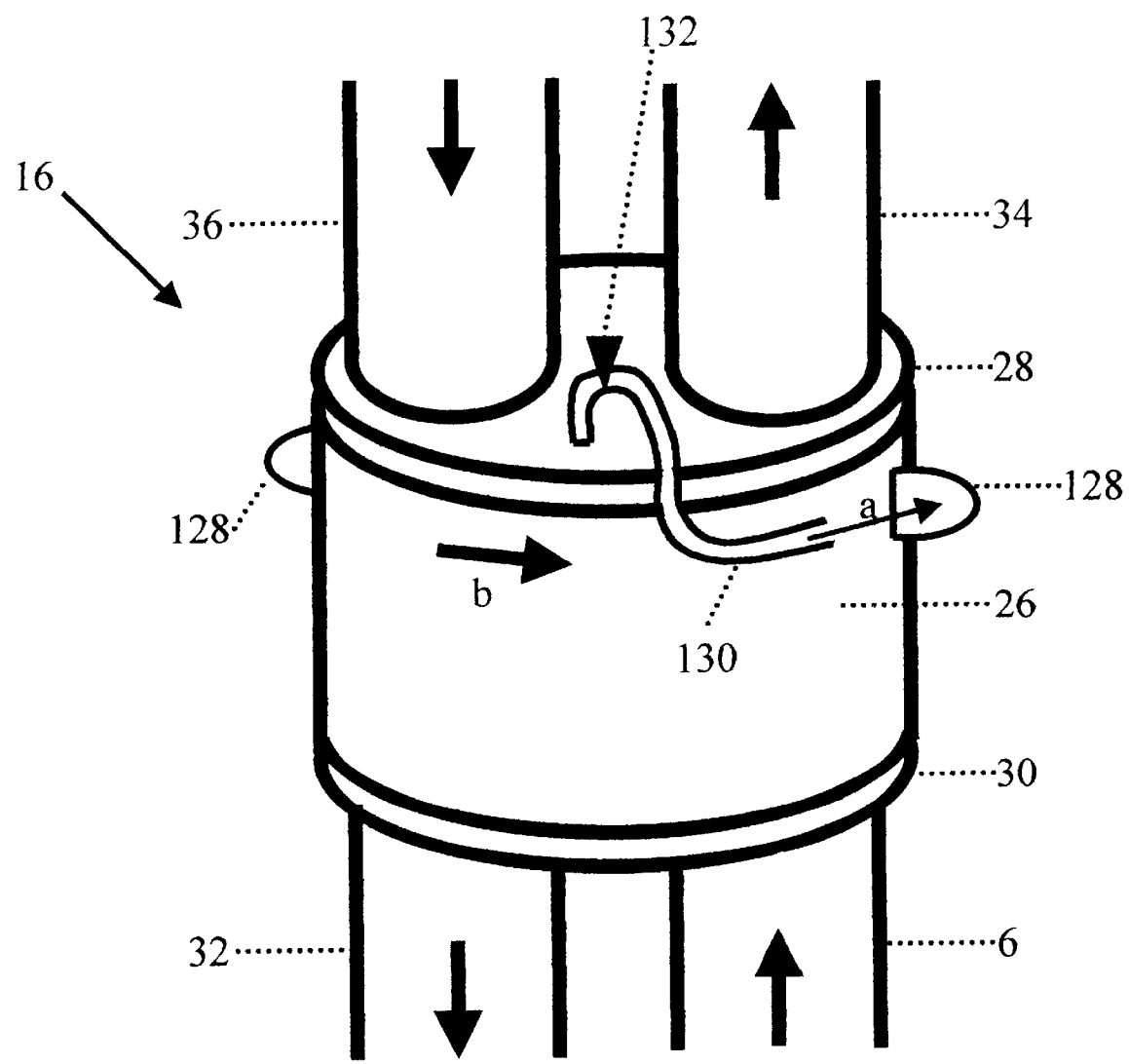
FIG. 28 shows a perspective view of a pressurizer according to another preferred embodiment.

FIG. 28 shows an alternative embodiment to the embodiment shown in FIGS. 27*a*–*e*. In FIG. 28, the pressurizer 16 includes a pre-exhaust conduit 130, having a valve 132, and ears 128. The pre-exhaust conduit 130 is connected to a hole in the top (or bottom) chamber separator 28 between the pressurant conduit 36 and the exhaust conduit 34. The pre-exhaust conduit 130 is configured and aimed so that pressurant 20 expelled from the conduit 130 hits (and reflects off) ears 128. Ears 128 are cup-shaped protrusions connected to and protruding from the spindle 26. An operation of this embodiment is now explained. After a transfer chamber 42, 84 passes past the draining region of the pressurizer 16 (between the pressurant conduit 36 and engine conduit 32, as shown in FIG. 28), the transfer chamber 42, 84 contains high-pressure pressurant 20. As the spindle 26 rotates, the transfer chamber 42, 84 moves past the pre-exhaust conduit 132, through which some or all of the pressurant 20 passes, the flow of which is controlled at least in part by the valve 132. The pressurant 20 then expands into a high-velocity jet which is aimed in the direction "a" (i.e., in the general direction of the ears 128, which are rotating with the spindle 26). The jet reflects off the ears 128 as they pass by, causing an impulse reaction force on the ears 128 in the direction "b" which further accelerates (or sustains) the rotation of the spindle 26. The end of the pre-exhaust conduit 130 may be nozzle-shaped to further improve the expansion of the pressurant 20. By adjusting the valve 132, the rotation speed of the spindle 26 may be adjusted. Instead of ears 128, such a pre-exhaust conduit 130 and valve 132 may be used with a motor 58 (e.g., piston engine) shown in FIG. 7, allowing for similar controllability.

Figure 29:
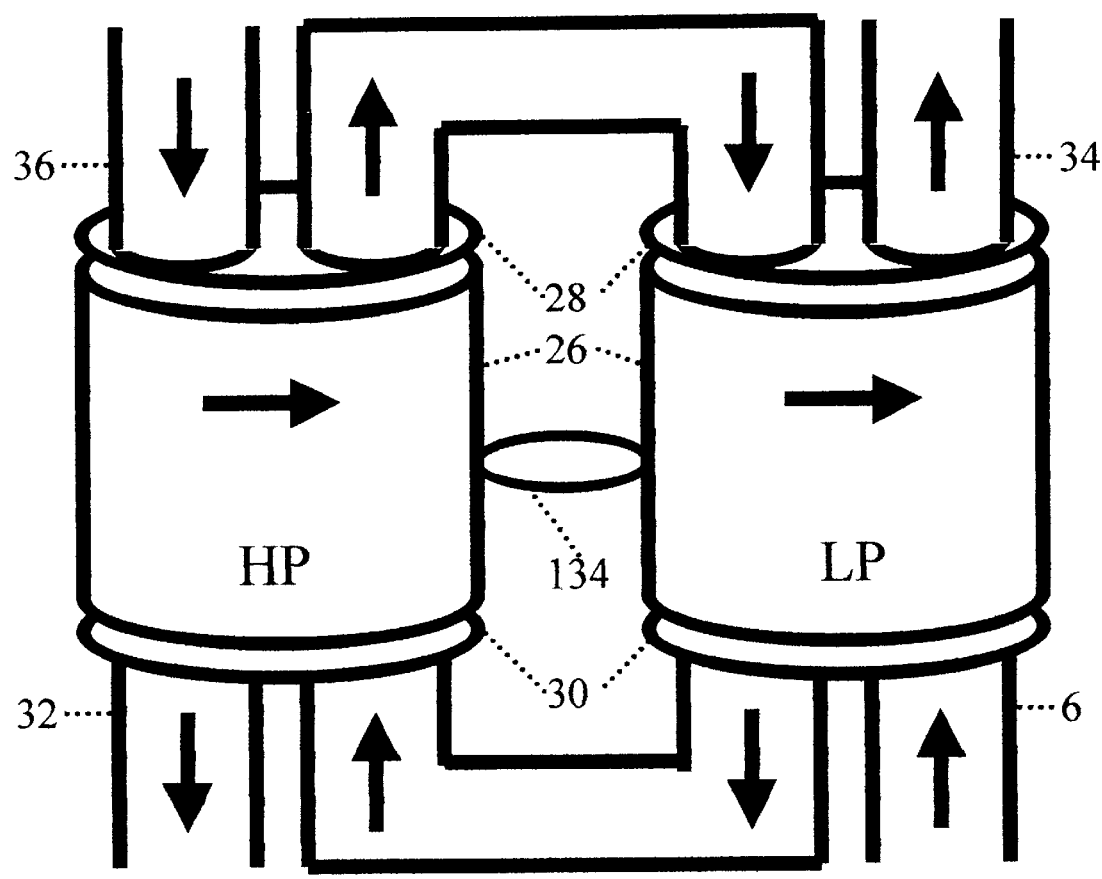
FIG. 29 shows a perspective view of a pressurizer according to another preferred embodiment.

FIG. 29 shows an embodiment allowing for very high pressurant pressures. With regard to FIGS. 26*a*–*b*, it was discussed that $(A_{entrance})^2/(A_{exit})^2=(\Delta p_{exit})/(\Delta p_{entrance})$ for a steady-state operation of a preferred embodiment of the present invention. However, for very high pressurant pressures, $\Delta p_{exit}$ may be very high, which requires that $A_{exit}$ be very small in relation to $A_{entrance}$. However, it may not be practical or cost effective to design a single pressurizer having such a ratio of $A_{exit}$ to $A_{entrance}$. FIG. 29 shows a two-stage pressurizer in which the pressurizer 16 on the right is a low-pressure (LP) pressurizer and the pressurizer 16 on the left is a high-pressure (HP) pressurizer. The pressurizer is configured so that the "engine conduit 32" of the LP pressurizer is connected to the "propellant conduit 6" of the HP pressurizer, and the "exhaust conduit 34" of the HP pressurizer is connected to the "pressurant conduit 36" of the LP pressurizer. For example, the LP and HP pressurizers may each achieve a compression ratio $(\Delta p_{exit}/\Delta p_{entrance})$ of around 30, resulting in a total compression ratio of the whole pressurizer of 30*30=900. Because the propellant mass flow rates must, in a steady state, be equal in the LP and HP pressurizers, and because $\Delta p_{exit}$ is probably much greater for the HP pressurizer than the LP pressurizer, the spindle 26 of the LP pressurizer must be rotated proportionately much faster than the spindle 26 of the HP pressurizer. Therefore, the embodiment shown in FIG. 29 also includes a gear 134 configured to rotate the LP spindle 26 with and proportionately faster than the HP spindle 26.

Figure 30:
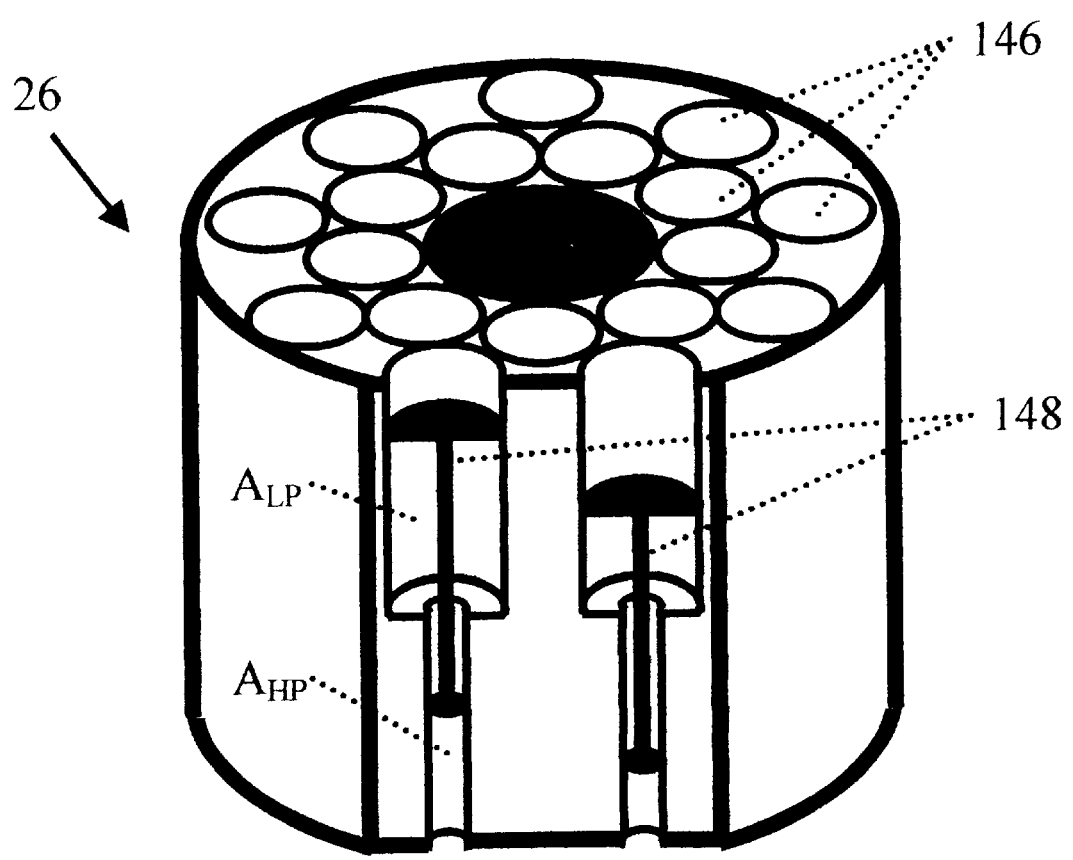
FIG. 30 shows a perspective sectional view of a spindle according to another preferred embodiment.

Referring now to FIG. 30, a spindle 26 may have differential pistons 148 inside differential transfer chambers 146. An upper portion of each transfer chamber 146 is configured to accommodate a pressurant 20 having a low pressure and a lower portion of each transfer chamber 146 is configured to accommodate a propellant 12 at a high pressure. Therefore, the upper low-pressure portion of each transfer chamber 146 has a cross sectional area of $A_{LP}$ which is greater than a cross sectional area $A_{HP}$ of the lower high-pressure portion of the transfer chamber 146. Each differential piston 148 is configured to fit snugly into its corresponding transfer chamber 146 to prevent passage of gas or fluid between the upper and lower portions of the transfer chamber 146. For example, an upper portion of a piston 148 may have a diameter (or other dimension, if the transfer chambers 146 and pistons 148 are not cylindrical in shape) approximately equal to a diameter of the upper portion of the transfer chamber 146 (and similarly for the lower portions of the transfer chamber 146 and piston 148). Further, an outer rim of the upper portion of the piston 148 (as well as an outer rim of the lower portion of the piston 148) may be coated with a sealing substance, such as rubber, plastic, Teflon, or other material. A benefit to the differential transfer chamber 146 with corresponding differential piston 148 is that a fluid in the lower high-pressure portion (in this case, the propellant 12) may be pressurized to an effective pressure that is higher (even significantly higher) than a pressure of a pressurizing gas in the upper low-pressure portion (in this case, the pressurant 20). For example, if the spindle 26 was used in the pressurizer 16 of the rocket engine system shown in FIG. 1, and the combustion pressure of the engine 2 was 30,000 PSI, then the pressure of the pressurant 20 at its entrance into the pressurizer 16 via the pressurant conduit 36 could be 30,000 PSI or less (e.g., 15,000 PSI). Another benefit to such an embodiment is that the combustion gases themselves could be used as the pressurant 20.

Figure 31:
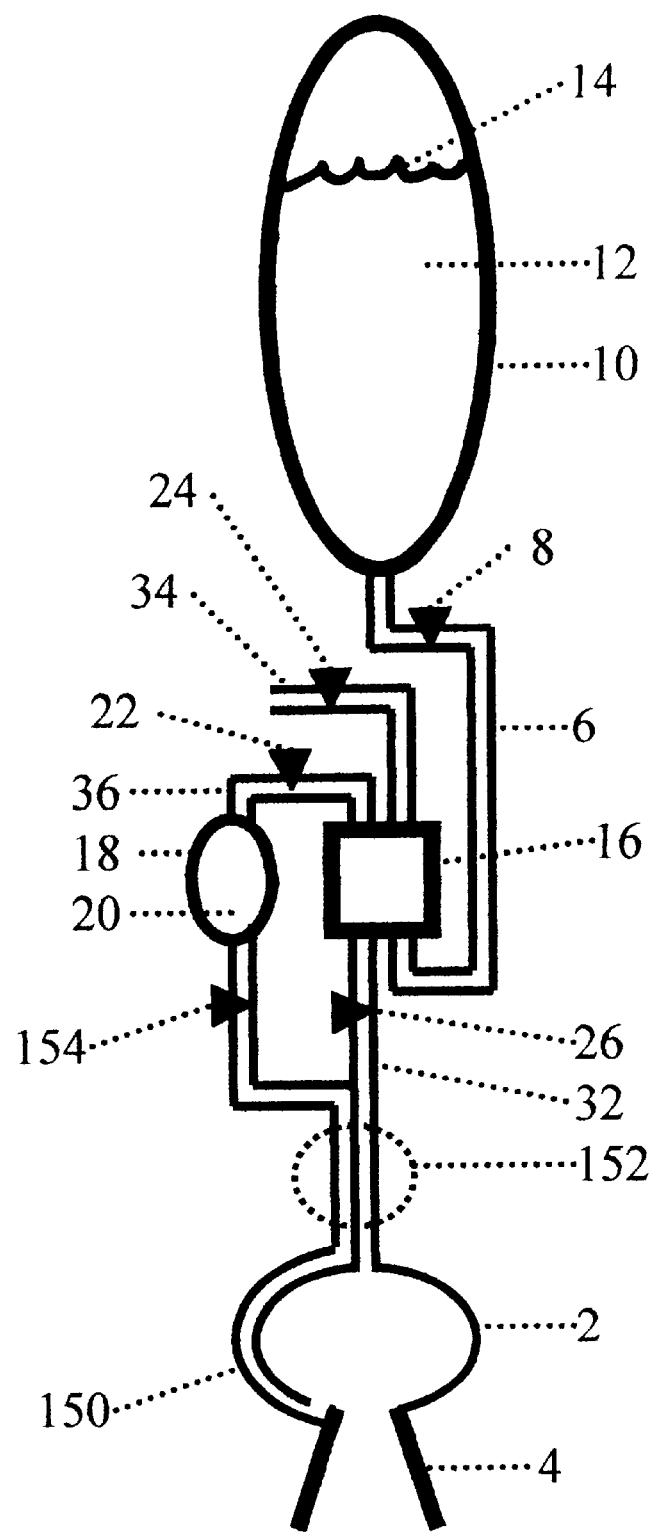
FIG. 31 shows a schematic view of a rocket engine according to another preferred embodiment.

FIG. 31 shows an embodiment in which the combustion gases are used as the pressurant 20. The rocket engine system shown in FIG. 31 includes a combustion gas conduit 150 that may run along the outside of the combustion chamber of the engine 2. The conduit 150 is configured to flow hot, high-pressure combustion gases from the combustion chamber to the pressurant tank 18 via an optional heat transfer area 152, regulated by valve 154. The heat transfer area 152 is an area in which the conduit 50 comes into heat contact with the engine conduit 32. Because the propellant 12 flowing from the pressurizer 16 to the engine 2 is much, much cooler than the hot combustion gases inside the combustion chamber of the engine 2 (particularly where the propellant 12 is a cryogenic propellant), the propellant 12 will absorb much of the heat of the hot combustion gases in the heat transfer area 152. As the propellant 12 flows from the pressurizer 16 to the engine 2, it heats up inside the heat transfer area 152 by absorbing heat from the hot combustion gases flowing through the combustion gas conduit 150. Conversely, as the hot combustion gases flow from the engine 2 to the pressurant tank 18 via the heat transfer area 152, they cool down by transferring heat to the propellant 12 flowing through the engine conduit 32. Because the combustion gases, even after cooling, have a very high pressure, they can be used as the pressurant 20 where the spindle 26 shown in FIG. 30 is implemented (because their pressure is less than or about equal to the combustion pressure inside the engine 2). The pressure inside the pressurant tank 18 may be adjusted by adjusting the flow rate of combustion gases into the tank 18 by adjusting the valve 154. An advantage to this embodiment is that a large tank of pressurant 20 is not necessary; in fact, the pressurant tank 18 itself is optional. In another embodiment, a small pressurant tank 18 is filled with a small quantity of high-pressure pressurant 20, sufficient to provide enough propellant 12 to the engine 2 to start and sustain combustion inside the engine 2. Once the combustion has started and the combustion pressure has built up to a sufficient level, the valve 154 (which was closed during start-up) may be opened, allowing the combustion gases to pressurize the pressurant tank 18.

Figure 32:
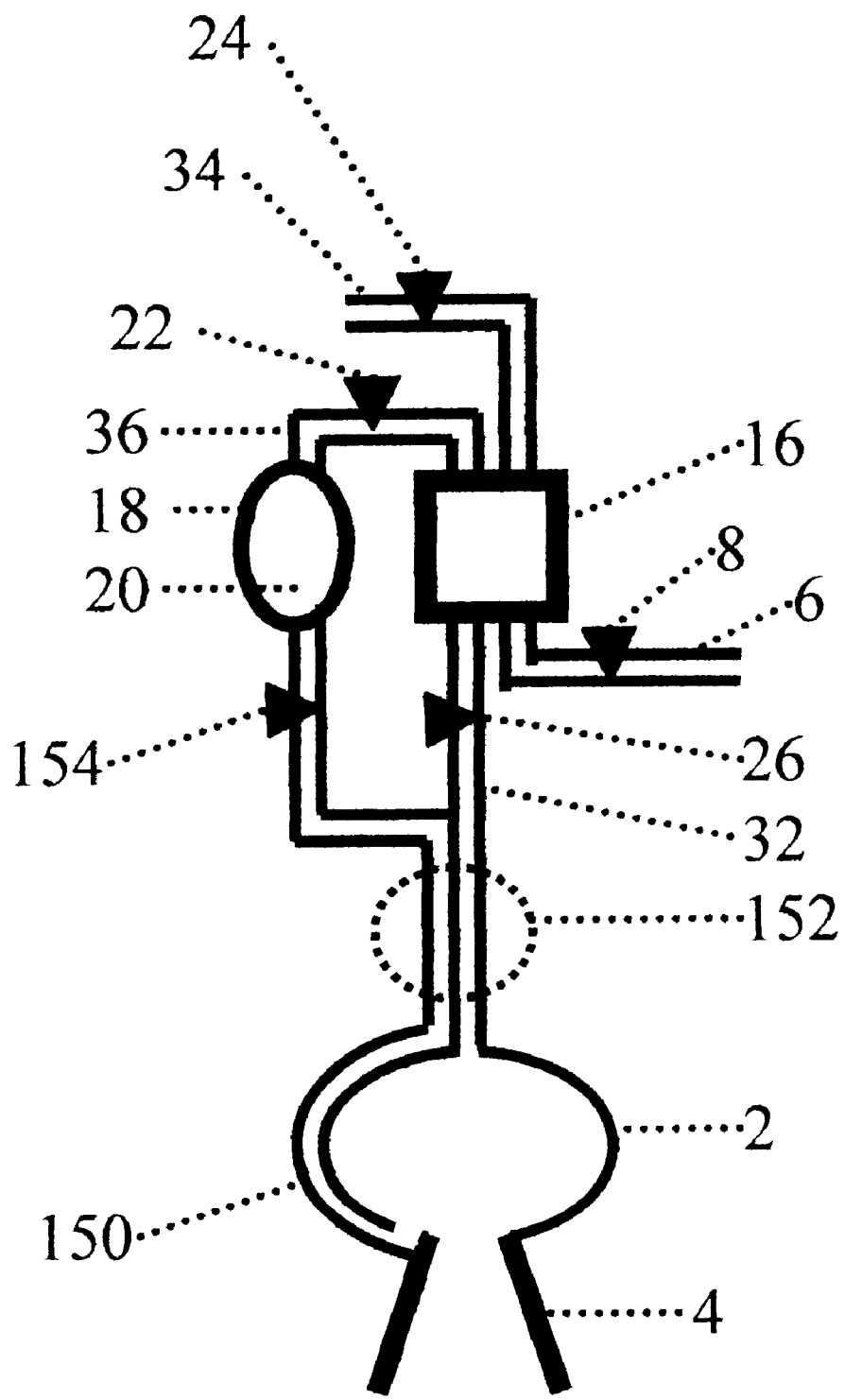
FIG. 32 shows a schematic view of a rocket engine according to another preferred embodiment.
Figure 33:
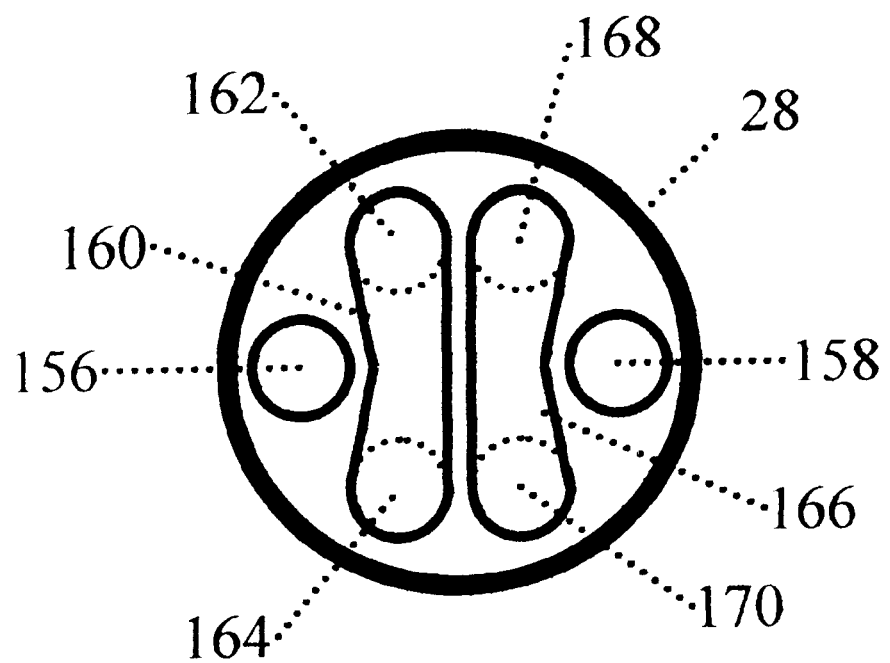
FIG. 33 shows a top view of a top chamber separator for a pressurizer according to another preferred embodiment.
Figure 34:
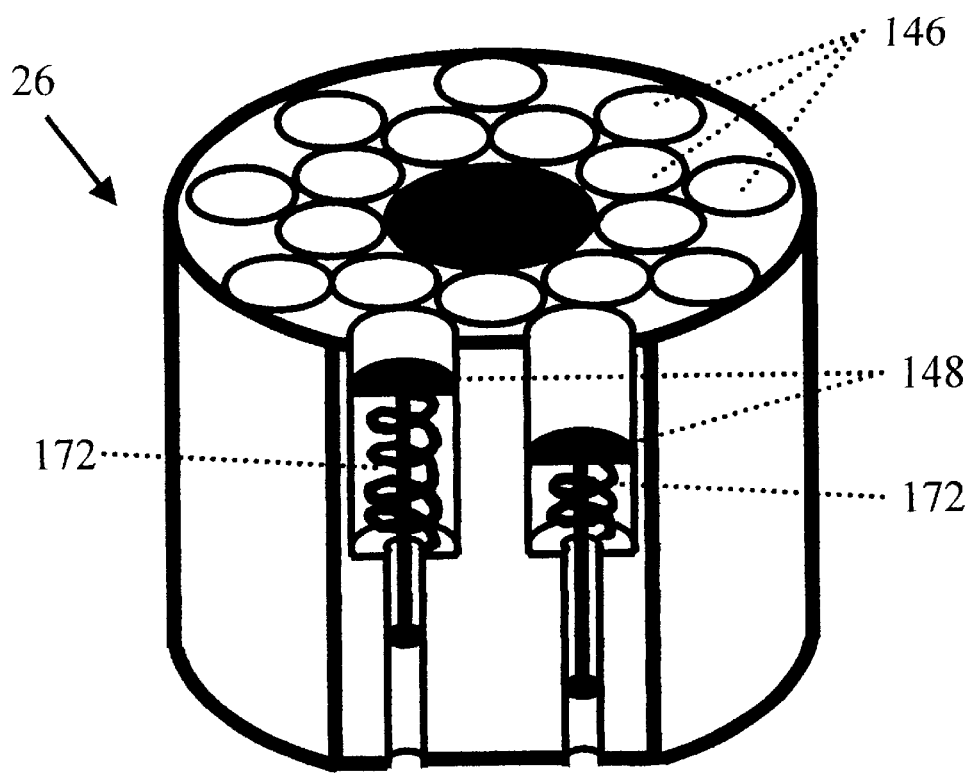
FIG. 34 shows a perspective sectional view of a spindle according to another preferred embodiment.

Referring now to FIGS. 32–34, the present invention may also be applied to an air-breathing rocket engine (e.g., a jet engine). FIG. 32 is similar to 31, except that the propellant tank 10 and corresponding propellant 12 have been removed. In FIG. 32, the propellant is air, and propellant conduit 6 is open to the atmosphere. Not shown in FIG. 32 is, of course, a second propellant (such as gasoline or kerosene) and a corresponding propellant tank and pressurizer system to provide the second propellant for the air to burn. FIG. 32 could, instead, be designed as an air-breathing hybrid rocket engine, in which case a propellant tank and pressurization system for the second propellant is not necessary.

In an air-breathing rocket engine, because the propellant (or at least one of the propellants) exists in a gaseous state, the propellant is compressible (whereas a liquid propellant is largely incompressible). Therefore, in using the embodiment shown in FIG. 2 (which may normally be configured for use in a liquid or hybrid rocket engine system) in an air-breathing rocket engine system, some of the otherwise wasted pressurant exhaust (vented via exhaust conduit 34) may be used to pre-pressurize the propellant (compressible air) before fully pressurizing the propellant with the pressurant 20 obtained directly from the pressurant tank 18. FIG. 33 shows a top chamber separator 28 for a pressurizer 16 designed for such an air-breathing rocket engine (alternatively, the bottom chamber separator 30, or both, could have a similar design). The top chamber separator 28 has a pressurant entrance hole 156, a pressurant exit (or exhaust) hole 158, a high pre-pressurization channel 160 connecting a high pre-pressurization hole 162 and a high depressurization hole 164, and a low pre-pressurization channel 166 connecting a low pre-pressurization hole 168 and a low depressurization hole 170. The operation of a pressurizer 16 according to such an embodiment will now be described with reference to FIG. 33. A transfer chamber 42 (or 84 or 146) (not shown) begins underneath exhaust hole 158 (and above a corresponding propellant hole in the bottom chamber separator 30, which is not shown in FIG. 33), where the transfer chamber 42 fills with propellant. As the spindle 26 rotates in a counterclockwise direction as seen from a top view of the pressurizer 16, the transfer chamber 42 moves underneath the low pre-pressurization hole 168, where it achieves a fluid connection with a different transfer chamber 42 underneath the low depressurization hole 170 via low pre-pressurization channel 166. Because the latter transfer chamber 42 has residual pressurant 20 having a higher pressure than the former transfer chamber 42 (because the latter transfer chamber 42 has not yet been vented to ambient pressure and the former transfer chamber 42 has), some pressurant 20 flows from the latter transfer chamber 42 to the former transfer chamber 42. In fact, if the rotation of the spindle 26 is slow enough, a near pressure equilibrium will be established among the two transfer chambers 42 (although such an equilibrium need not be established for the pressurizer 16 described here to work properly). As the spindle 26 continues to rotate, the former transfer chamber 42 moves underneath the high pre-pressurization hole 162, where it achieves a fluid connection with a different transfer chamber 42 underneath the high depressurization hole 164 via high pre-pressurization channel 160. Again, because the latter transfer chamber 42 has residual pressurant 20 having a higher pressure than the former transfer chamber 42 (because the latter transfer chamber 42 has just been pressurized by the pressurant 20 via the pressurant entrance hole 156 while the former transfer chamber 42 has not), some pressurant 20 flows from the latter transfer chamber 42 to the former transfer chamber 42. As discussed previously, a pressure equilibrium may be established between the two transfer chambers 42. As will be apparent to one skilled in the art, the pressure in the high pre-pressurization channel 160 (and corresponding holes 162, 164) is higher than that in the low pre-pressurization channel 166 (and corresponding holes 168, 170). As the spindle 26 continues to rotate, the former transfer chamber 42 moves underneath the pressurant entrance hole 156, where the transfer chamber 42 is pressurized directly by the pressurant 20 from the pressurant tank 18. However, because the transfer chamber 42 had already been pre-pressurized by pressurant 20 (at lower pressures) via the high pre-pressurization hole 162 and low pre-pressurization hole 168, the amount of pressurant 20 (at full pressure) that is required to fully pressurize the propellant underneath the pressurant entrance hole 156 is less than if the pressurizer 16 had no such design (e.g., the design shown in FIG. 2). Finally, as the spindle 26 continues to spin, the transfer chamber 42 moves underneath the high depressurization hole 164 and low depressurization hole 170, sequentially, where some of the high-pressure pressurant 20 flows to the high pre-pressurization hole 162 and low pre-pressurization hole 168, respectively, before the remaining pressurant 20 in the transfer chamber 42 is exhausted via exhaust hole 158, and the cycle begins again. Of course, the top (or bottom) chamber separator 28 may have more or less pre-pressurization channels (and corresponding holes) than those shown.

In the embodiment shown in FIG. 32, both the propellant conduit 6 and exhaust conduit 34 are shown to have a fluid connection to the atmosphere, thus having approximately the same pressure (i.e., $\Delta p_{entrance}=0$). Therefore, no pressure differential is available to fill each transfer chamber 42 with the propellant (air). FIG. 34 shows an embodiment of a spindle 26 in which each differential transfer chamber 146 and corresponding piston 148 have a spring 172 configured to push the piston 148 upward to provide the necessary force to fill the transfer chamber 146 with propellant. The spring force is preferably overcome by the pressurant gas pressure in the low pre-pressurization channel 166, the high pre-pressurization channel 160, and the pressurant tank 18, allowing the pressurant 20 to compress the propellant as described previously. Other means of providing a lifting force to the pistons 148, besides a differential propellant/exhaust pressure (i.e., $\Delta p_{entrance}>0$) and/or a spring 172, will be apparent to one skilled in the art. Further, the use of springs 172 in transfer chambers 42, 84, 146 is not limited to the embodiment shown in FIG. 34. For example, springs 172 could be used to lift pistons 72 in the embodiment shown in FIG. 15 in addition to or in place of a differential propellant/exhaust pressure. For example, in the rocket engine system shown in FIG. 1, the propellant tank 10 may be at or near ambient pressure, in which case very little pressure (i.e., only the weight head) would be available to provide a differential propellant/exhaust pressure (to make $\Delta p_{entrance}>0$). In such a case, springs 172 could provide additional force to help the transfer chambers 42 fill more quickly with propellant 12.

Figure 35A:
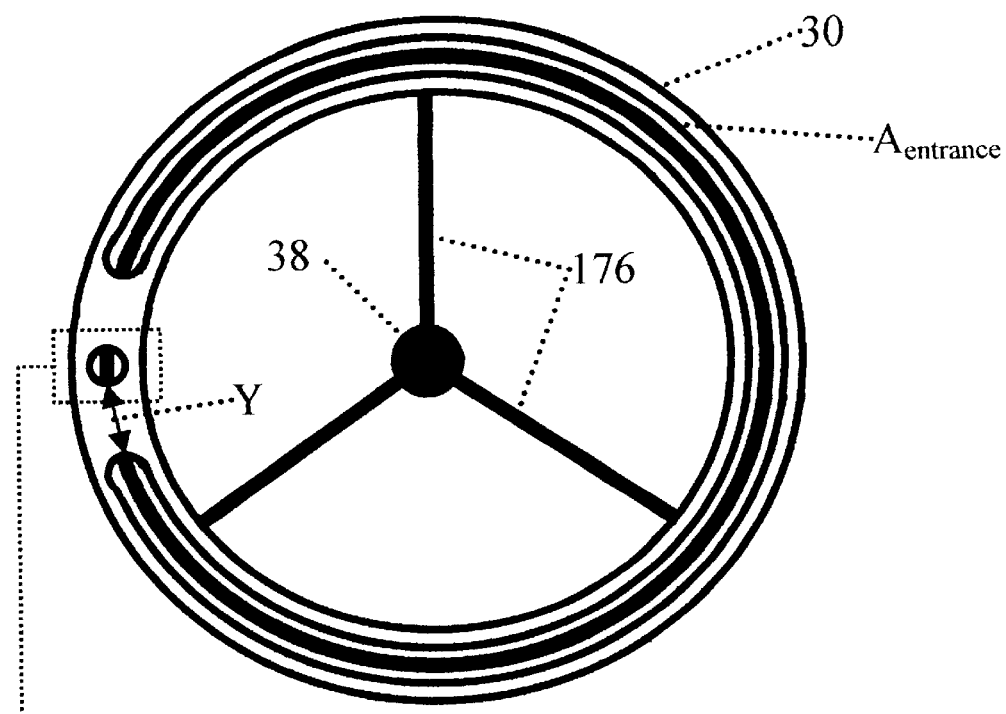
FIG. 35a shows a bottom view of a bottom chamber separator and a spindle according to another preferred embodiment, shown so that the spindle can only be seen through the holes in the bottom chamber separator.
Figure 35B:
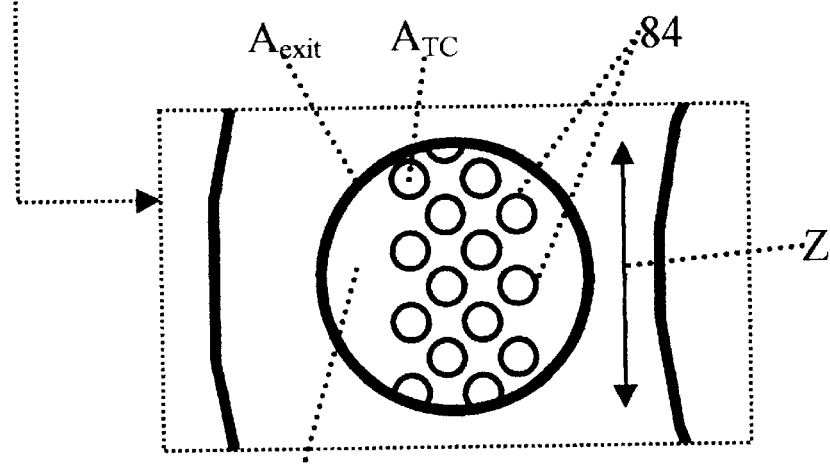

FIGS. 35a–b show another embodiment of the pressurizer 16. FIG. 35a shows a bottom view of a bottom chamber separator 30 with a spindle 26 on its other side so that the spindle 26 can only be seen through holes (defined by $A_{entrance}$ and $A_{exit}$) in the bottom chamber separator 30. The bottom chamber separator 30 is annular or disk-shaped, so that it is hollow within the annulus, except that it has spokes 176 connecting the center 38 to an inner surface of the bottom chamber separator 30. The spindle 26 may be similar to the spindle 26 shown in FIG. 16, except that it is hollow inside (like the bottom chamber separator 30 shown in FIG. 35a), thus having the shape of a ring or tube, where the wall of the tube is filled with transfer chambers 84. The spindle 26 may also have spokes (not shown) similar to spokes 176, connecting the center 40 (not shown) of the spindle 26 to an inner surface of the spindle 26. In a preferred embodiment, the characteristic length Z (as explained with reference to FIG. 26b) is substantially smaller than the dimension Y. For example, Z<Y/2 or Z<Y/5. In another embodiment, Y is larger than some fraction of a radius R of the spindle 26. For example, Y>R/2 or Y>R/5. A benefit to this embodiment is that a leakage path from a high-pressure area of the pressurizer 16 (such as the draining region between the spindle 28 and bottom chamber separator 30, and defined by $A_{exit}$) to a low-pressure area (such as the filling region between the spindle 28 and bottom chamber separator 30, and defined by $A_{entrance}$) is substantially larger than a leakage path from the high-pressure area to the atmosphere (ambient pressure). In other words, the leakage rate of pressurant 20 or propellant 12 from a high-pressure region to a low-pressure region is minimized. The embodiment shown in FIGS. 35a–b has many other advantages. For example, $A_{exit}$ may be made very small in comparison to $A_{entrance}$, as shown, which may allow for a very large ratio between $\Delta p_{exit}$ and $\Delta p_{entrance}$. As another example, the hollow cylindrical shape of the spindle 26 may lend itself to achieving the benefits of a flywheel (e.g., insensitivity or slow reaction time to fast variations in the rotation force on the spindle 26).

Most of the embodiments described herein have represented simple versions for clarity of explanation. Needless to say, many of the features of the embodiments described herein may be "mixed and matched" to satisfy individual design requirements regarding cost, complexity, size, type of propellant 12 and pressurant 20, desired flow rate, and other factors. As an example but not a limitation, the slanted transfer chambers 84 shown in FIG. 23 may also include bearings 118 as shown in FIG. 22a. Many other features may be mixed and matched, as would be apparent to one skilled in the art.

Further, the transfer chambers 42, 84 need not move with respect to the rest of the rocket engine system in order to implement many of the features described herein. (In other words, the existence of a rotatable spindle 26 having transfer chambers 42 is not necessary to obtain many of the benefits of the features described herein.) For example, the valved fluid transport system of Lanning may be modified by any of several of the features described herein to obtain certain advantages. For example, one skilled in the art will recognize that one of the beneficial features of the embodiment shown in FIGS. 26a–b is that the number of transfer chambers 84 that are available to drain in the draining region (defined by $A_{exit}$) at any given time is large (e.g., $A_{TC} \ll A_{exit}$), thus ensuring that if one or more transfer chambers 84 drains "prematurely" (in the embodiment shown in FIGS. 26a–b, a transfer chamber 84 drains prematurely when it fully drains before reaching the end of the draining region), other transfer chambers 84 are available to continue draining to provide a continuous flow of propellant 12 from the pressurizer 16. In other words, in the embodiment shown in FIGS. 26a–b, the draining region is able to be draining several transfer chambers 84 simultaneously. Therefore, the invention of Lanning could be modified by the present disclosure such that the draining means of Lanning is similarly configured to be able to be draining several storage tanks (e.g., at least three storage tanks) simultaneously. Thus, when one storage tank of Lanning is drained "prematurely" (caused by an open-close rate of the valves that is too slow to keep up with the draining rate of the storage tanks), at least one or two other storage tanks are available to continue draining to provide a continuous flow of propellant from the fluid transport system of Lanning.

As another example, one skilled in the art will recognize that another of the beneficial features of the embodiment shown in FIGS. 26a–b is that the number of transfer chambers 84 that are available to be filled in the filling region (defined by $A_{entrance}$) at any given time is large in comparison to the number of transfer chambers 84 that are simultaneously available to drain in the draining region (defined by $A_{exit}$) thus allowing a continuous flow rate through the pressurizer 16 even when the pressure differential between the pressurant tank 18 and the combustion chamber of the engine 2 is different from (e.g., much larger than) the pressure differential between the propellant tank 10 and ambient pressure. More particularly, as discussed with reference to FIGS. 26a–b, in a preferred embodiment, the ratio $(A_{entrance})/(A_{exit})$ is chosen to be approximately equal to $\sqrt{\Delta p_{exit}}/\sqrt{\Delta p_{entrance}}$, or at least approximately sqrt $(\Delta p_{exit})/\text{sqrt}(\Delta p_{entrance})$. Therefore, the invention of Lanning could be modified by the present disclosure such that the number of storage tanks that are being filled by the filling means is large (e.g., a factor of three higher) in comparison to the number of storage tanks that are simultaneously being drained by the draining means. This may ensure a continuous flow of propellant through the fluid transport system of Lanning when a pressure ratio of a pressure difference between a pressurant pressure and the high pressure (as disclosed in Lanning) to a pressure difference between the low pressure (as disclosed in Lanning) and ambient pressure is less than or equal to approximately three. Alternatively, the above-mentioned storage tank ratio could be set to be at least approximately the above-mentioned pressure ratio.

As another example, one skilled in the art will recognize that one of the beneficial features of the embodiment shown in FIG. 30 is that the pressurizer 16 can be used in a system where the pressurant 20 has a pressure that is less than or equal to the combustion pressure inside the engine 2, such as where combustion gases inside the engine 2 are used as the pressurant 20. Therefore, the invention of Lanning could be modified by the present disclosure to include differential storage tanks (having a differential structure similar to differential transfer chambers 146) and differential pistons (such as pistons 148), to allow combustion gases from the engine of Lanning to be used to pressurize and push the propellant into the engine.

I claim:

1. A pressurizer for pressurizing a fluid, comprising:
   a pressurant entrance configured for the introduction of a pressurant;
   a fluid entrance configured for the introduction of said fluid;
   a fluid exit configured for the expulsion of said fluid; and
   at least one transfer chamber movable in a cycle with respect to at least one of said pressurant entrance, said fluid entrance, and said fluid exit, wherein said pressurizer is configured so that for a portion of a cycle said pressurant exerts a force on said fluid inside said transfer chamber, and wherein said transfer chamber is configured to receive said pressurant via said pressurant entrance, receive said fluid via said fluid entrance, and expel said fluid via said fluid exit by the force exerted by said pressurant upon said fluid inside said transfer chamber.

2. The pressurizer as claimed in claim 1, wherein the pressurizer comprises at least three transfer chambers, configured so that while at least one transfer chamber is in fluid connection with said fluid entrance, at least one other transfer chamber is in fluid connection with said fluid exit and said pressurant entrance.

3. The pressurizer as claimed in claim 1, wherein at least one transfer chamber comprises: a movable piston configured to substantially separate said pressurant from said fluid inside said transfer chamber; and a limiter configured to prevent said piston from moving beyond a certain point inside said transfer chamber.

4. The pressurizer as claimed in claim 1, further comprising: a motor configured to move said transfer chamber at a cycle speed; a sensor configured to sense a quantity of propellant inside said transfer chamber; and a controller connected to said sensor and said motor, configured to adjust said cycle speed at least as a function of said quantity sensed by said sensor.

5. The pressurizer as claimed in claim 1, wherein a cross sectional area of said transfer chamber is less than 1/10 a cross sectional area of said fluid exit.

6. The pressurizer as claimed in claim 1, further comprising a rotatable spindle housing a plurality of transfer chambers, wherein, in a cross section of said spindle, a distance between corresponding points of two transfer chambers is less than ½ a maximum characteristic length of said fluid exit along a direction of rotation of said spindle.

7. The pressurizer as claimed in claim 1, further comprising a rotatable spindle housing a plurality of transfer chambers, wherein, in a cross section of said spindle, a dimension of said transfer chamber along a path taken by said transfer chamber is less than a minimum distance between said pressurant entrance and said pressurant exit along a path taken by said transfer chamber.

8. The pressurizer as claimed in claim 1, further comprising a rotatable spindle housing a plurality of transfer chambers, wherein, in a cross section of said spindle, a maximum characteristic length of said fluid exit along a direction of rotation of said spindle is less than ½ of a minimum distance between said pressurant entrance and said pressurant exit along a path taken by at least one transfer chamber.

9. The pressurizer as claimed in claim 1, further comprising a pressurant exit configured for the expulsion of a pressurant exhaust, wherein said pressurizer is configured to be able to provide a continuous stream of said fluid from said fluid exit throughout at least one complete cycle at least when $\mathrm{sqrt}(\Delta p_{entrance})*(A_{entrance}) < \mathrm{sqrt}(\Delta p_{exit})*(A_{exit})$, where $\Delta p_{entrance}$ is a pressure drop between said fluid entrance and said pressurant exit, $A_{entrance}$ is a cross sectional area of said fluid entrance, $\Delta p_{exit}$ is a pressure drop between said pressurant entrance and said fluid exit, and $A_{exit}$ is a cross sectional area of said fluid exit.

10. The pressurizer as claimed in claim 1, wherein a cross sectional area of said fluid exit is less than ½ a cross sectional area of said fluid entrance.

11. The pressurizer as claimed in claim 1, wherein said pressurizer comprises a plurality of transfer chambers each having a dimension less than 1 mm.

12. The pressurizer as claimed in claim 1, further comprising a rotatable spindle housing a plurality of transfer chambers, wherein said pressurizer is configured so that said spindle is rotated by an expansion of said pressurant.

13. The pressurizer as claimed in claim 12, wherein said transfer chamber comprises at least one jet hole configured to provide a substantially continuous flow of said pressurant from said transfer chamber via said jet hole in a direction substantially opposite a direction of motion of said transfer chamber to provide an impulse reaction force to said transfer chamber.

14. The pressurizer as claimed in claim 1, further comprising:

a first rotatable spindle housing a plurality of said transfer chambers;

a second pressurant entrance configured for the introduction of said pressurant;

a second fluid entrance configured for the introduction of said fluid;

a second fluid exit configured for the expulsion of said fluid; and a second rotatable spindle housing a plurality of second transfer chambers that are each movable in a cycle with respect to at least one of said second pressurant entrance, said second fluid entrance, and said second fluid exit, wherein each of said second transfer chambers is configured to receive said pressurant via said second pressurant entrance, receive said fluid via said second fluid entrance, and expel said fluid via said second fluid exit, and wherein said fluid entrance is connected to said second fluid exit.

15. The pressurizer as claimed in claim 1, wherein said pressurizer comprises at least one differential transfer chamber having a first region having a first cross sectional area and a second region having a second cross sectional area smaller than said first cross sectional area, wherein said differential transfer chamber further comprises a differential piston, movable inside said differential transfer chamber, having a first piston portion having a first piston cross sectional area approximately equal to said first cross sectional area and a second piston portion having a second piston cross sectional area approximately equal to said second cross sectional area.

16. The pressurizer as claimed in claim 1, further comprising: a pressurant exit configured for the expulsion of a pressurant exhaust; at least one pre-pressurization entrance between said pressurant entrance and said pressurant exit; and at least one depressurization exit, connected to said pre-pressurization entrance, between said pressurant entrance and said pressurant exit, wherein said pressurizer is configured so that, during a cycle, said transfer chamber sequentially receives said pressurant at a medium pressure via said pre-pressurization entrance, receives said pressurant at a high pressure via said pressurant entrance, expels said pressurant at another medium pressure via said depressurization exit, and expels said pressurant at a low pressure via said pressurant exit.

17. The pressurizer as claimed in claim 1, wherein said transfer chamber comprises: a piston configured to separate said pressurant from said propellant inside said transfer chamber; and a spring configured to provide a force on said piston relative to said transfer chamber.

18. The pressurizer as claimed in claim 1, further comprising: a rotatable spindle housing a plurality of transfer chambers; and a lubricant injector configured to inject a sealing lubricant between said pressurant entrance and said spindle.

19. An impulse reaction engine system, comprising:
    a pressurant container configured to contain a pressurant;
    a propellant container configured to contain a propellant;
    an impulse reaction engine configured to receive said propellant; and
    at least one transfer chamber movable in a cycle with respect to at least one of said pressurant container, said propellant container, and said engine,
    wherein said engine system is configured so that for a portion of a cycle said pressurant exerts a force on said propellant inside said transfer chamber, and
    wherein said transfer chamber is configured to receive said pressurant from said pressurant container, receive said propellant from said propellant container, and expel said propellant to said engine by the force exerted by said pressurant upon said propellant inside said transfer chamber.

20. The impulse reaction engine system as claimed in claim 19, further comprising a gas generator configured to generate said pressurant.

21. The impulse reaction engine system as claimed in claim 20, further comprising a heat exchanger configured to transfer heat from said pressurant generated by said gas generator to said propellant.

22. The impulse reaction engine system as claimed in claim 19, further comprising an engine conduit between said transfer chamber and said engine and a propellant conduit between said transfer chamber and said propellant container, wherein said system is configured to be able to provide a continuous stream of said propellant to said engine throughout at least one complete cycle at least when $\text{sqrt}(\Delta p_{entrance}) * (A_{entrance}) < \text{sqrt}(\Delta p_{exit}) * (A_{exit})$, where $\Delta p_{entrance}$ is a pressure drop between said propellant container and a pressurant exhaust, $A_{entrance}$ is a cross sectional area of said propellant conduit, $\Delta p_{exit}$ is a pressure drop between said pressurant container and said engine, and $A_{exit}$ is a cross sectional area of said engine conduit.

23. An impulse reaction engine system, comprising:
    an impulse reaction engine configured to receive a propellant and further configured to generate a pressurant; and
    at least one transfer chamber connected to and movable in a cycle with respect to said engine,
    wherein said engine system is configured so that for a portion of a cycle said pressurant exerts a force on said propellant inside said transfer chamber, and
    wherein said transfer chamber is configured to receive said pressurant from said engine and expel said propellant to said engine by the force exerted by said pressurant upon said propellant inside said transfer chamber.

24. The impulse reaction engine system as claimed in claim 23, wherein said engine system comprises at least one differential transfer chamber having a first region having a first cross sectional area and a second region having a second cross sectional area smaller than said first cross sectional area, wherein said differential transfer chamber further comprises a differential piston, movable inside said differential transfer chamber, having a first piston portion having a first piston cross sectional area approximately equal to said first cross sectional area and a second piston portion having a second piston cross sectional area approximately equal to said second cross sectional area.

25. The impulse reaction engine system as claimed in claim 23, further comprising a propellant container configured to contain a propellant, wherein said transfer chamber is configured to receive said propellant from said propellant container.

26. The impulse reaction engine system as claimed in claim 23, wherein said propellant is in a gas state.

27. The impulse reaction engine system as claimed in claim 23, wherein said transfer chamber comprises: a piston configured to separate said pressurant from said propellant inside said transfer chamber; and a spring configured to provide a force on said piston relative to said transfer chamber.

28. The impulse reaction engine system as claimed in claim 23, further comprising a heat exchanger configured to transfer heat from said pressurant generated by said engine to said propellant.

29. A fluid transport system for transferring fluid from a low pressure reservoir to an outlet at high pressure in a continuous stream, comprising:
    a plurality of storage tanks, each of said storage tanks being capable of confining fluid at high pressure;
    draining means for draining fluid from each of said plurality of storage tanks in sequential order to said outlet, said draining means draining each of said plurality of tanks in sequence such that a continuous stream of fluid is supplied to said outlet at high pressure; and
    filling means for supplying fluid from said low pressure reservoir to each of said drained storage tanks in sequential order to fill said respective tanks with said fluid;
    said sequential order of each of said draining means and said filling means being out of phase with each other such that as one storage tank in said plurality is being drained by said draining means, at least another of said storage tanks is being filled by said filling means,
    wherein said draining means is configured to be able to be draining at least three storage tanks simultaneously.

30. A fluid transport system for transferring fluid from a low pressure reservoir to an outlet at high pressure in a continuous stream, comprising:
    a plurality of storage tanks, each of said storage tanks being capable of confining fluid at high pressure;
    draining means for draining fluid from each of said plurality of storage tanks in sequential order to said outlet, said draining means draining each of said plurality of tanks in sequence such that a continuous stream of fluid is supplied to said outlet at high pressure; and
    filling means for supplying fluid from said low pressure reservoir to each of said drained storage tanks in sequential order to fill said respective tanks with said fluid;
    said sequential order of each of said draining means and said filling means being out of phase with each other such that as one storage tank in said plurality is being drained by said draining means, at least another of said storage tanks is being filled by said filling means,
    wherein said system is configured so that a ratio of a number of storage tanks that are being filled by said filling means to a number of storage tanks that are simultaneously being drained by said draining means is at least three.

31. The fluid transport system as claimed in claim 30, further comprising a pressurant having a pressurant pressure, wherein said ratio is set to be at least approximately a square root of a ratio of a pressure difference between said pressurant pressure and said high pressure to a pressure difference between said low pressure and ambient pressure.

32. A fluid transport system for transferring fluid from a low pressure reservoir to an outlet at high pressure in a continuous stream, comprising:

a plurality of storage tanks, each of said storage tanks being capable of confining fluid at high pressure;

draining means for draining fluid from each of said plurality of storage tanks in sequential order to said outlet, said draining means draining each of said plurality of tanks in sequence such that a continuous stream of fluid is supplied to said outlet at high pressure; and filling means for supplying fluid from said low pressure reservoir to each of said drained storage tanks in sequential order to fill said respective tanks with said fluid;

said sequential order of each of said draining means and said filling means being out of phase with each other such that as one storage tank in said plurality is being drained by said draining means, at least another of said storage tanks is being filled by said filling means, wherein said fluid transport system comprises at least one differential differential storage tank having a first region having a first cross sectional area and a second region having a second cross sectional area smaller than said first cross sectional area, wherein said differential storage tank further comprises a differential piston, movable inside said differential storage tank, having a first piston portion having a first piston cross sectional area approximately equal to said first cross sectional area and a second piston portion having a second piston cross sectional area approximately equal to said second cross sectional area.

33. The pressurizer as claimed in claim 1, further comprising a pressurant exit configured for the expulsion of a pressurant exhaust, wherein a cross sectional area of said fluid entrance ($A_{entrance}$) and a cross sectional area of said fluid exit ($A_{exit}$) are chosen so that sqrt($\Delta p_{entrance}$)*($A_{entrance}$) is at least approximately sqrt($\Delta p_{exit}$)*($A_{exit}$), where $\Delta p_{entrance}$ is a pressure drop between said fluid entrance and said pressurant exit, and $\Delta p_{exit}$ is a pressure drop between said pressurant entrance and said fluid exit.

* * * * *